US012667081B2

(12) United States Patent
Mu

(10) Patent No.: US 12,667,081 B2
(45) Date of Patent: Jun. 30, 2026

(54) PET PAW WASHING ARRANGEMENT AND HAND-WEARABLE PAW WASHING DEVICE AND WASHING METHOD THEREOF

(71) Applicant: TAN GROW INC., Blue Island, IL (US)

(72) Inventor: Mengmeng Mu, Blue Island, IL (US)

(73) Assignee: TAN GROW INC., Blue Island, IL (US)

( * ) Notice: Subject to any disclaimer, the term of this patent is extended or adjusted under 35 U.S.C. 154(b) by 150 days.

(21) Appl. No.: 18/381,159

(22) Filed: Oct. 17, 2023

(65) Prior Publication Data

US 2024/0130328 A1    Apr. 25, 2024
US 2024/0224936 A9    Jul. 11, 2024

(30) Foreign Application Priority Data

Oct. 21, 2022    (CN) .......................... 202211297927.7
Oct. 25, 2022    (CN) .......................... 202211308778.X
Sep. 28, 2023    (CN) .......................... 202311284061.0

(51) Int. Cl.
A01K 13/00        (2006.01)

(52) U.S. Cl.
CPC .................................. A01K 13/001 (2013.01)

(58) Field of Classification Search
CPC .............................. A01K 13/00; A01K 13/001
See application file for complete search history.

(56) References Cited

U.S. PATENT DOCUMENTS

| | | | | |
|---|---|---|---|---|
| 1,530,327 | A | * | 3/1925 | Redlick ................... A47L 13/19 D2/614 |
| 5,169,251 | A | * | 12/1992 | Davis .................. A61M 35/003 401/266 |
| 5,722,349 | A | * | 3/1998 | Wolgamuth ....... A41D 19/0079 119/632 |
| 6,109,214 | A | * | 8/2000 | Rampersad .............. A46B 5/04 401/7 |
| 6,257,785 | B1 | * | 7/2001 | Otten ........................ A47K 7/03 401/7 |
| 6,718,913 | B1 | * | 4/2004 | Stupar .................. A01K 13/002 119/664 |
| 2010/0282182 | A1 | * | 11/2010 | Moinester ............ A01K 13/001 119/665 |
| 2016/0073611 | A1 | * | 3/2016 | Hightower ........... A01K 13/003 119/603 |
| 2019/0239478 | A1 | * | 8/2019 | Bennett ............... A01K 13/001 |
| 2022/0000072 | A1 | * | 1/2022 | Cheung ............... A46B 11/066 |

* cited by examiner

*Primary Examiner* — Kimberly S Berona
*Assistant Examiner* — Katherine June Walter
(74) *Attorney, Agent, or Firm* — Che-Yang Chen

(57) ABSTRACT

A pet paw washing arrangement includes a water storing container, a water supply pipeline and a hand-wearable paw washing device, wherein the hand-wearable paw washing device includes a wearing body for being worn on a user's hand, and a spraying head which is used for connecting to the water storing container through the water supply line, so as to eject water through the spraying head for washing and cleaning the pet's paw, so that the pet paw washing arrangement is suitable for washing the pet's paw at the door of the home or before the pet enters the vehicle.

6 Claims, 30 Drawing Sheets

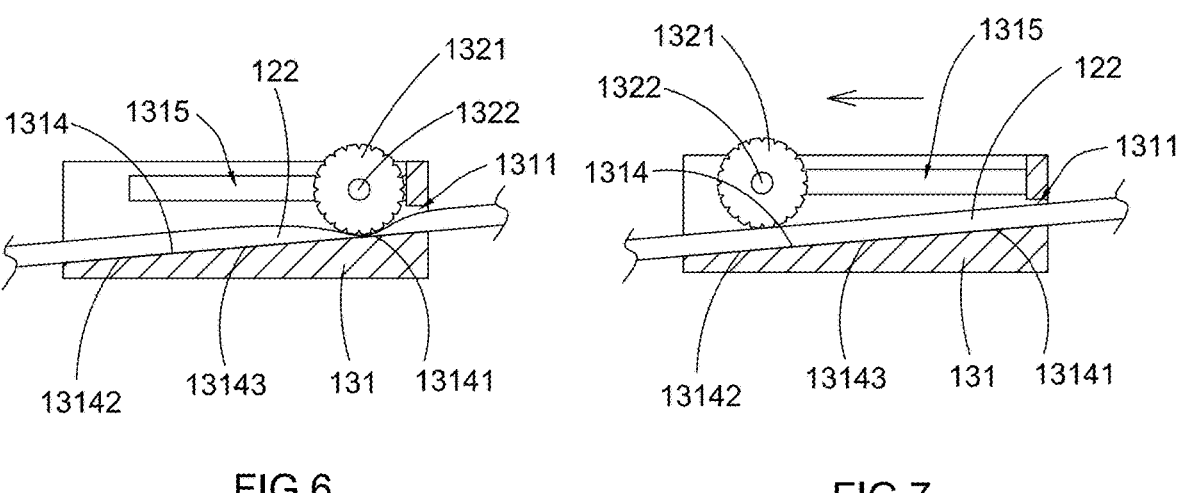
FIG.6                    FIG.7
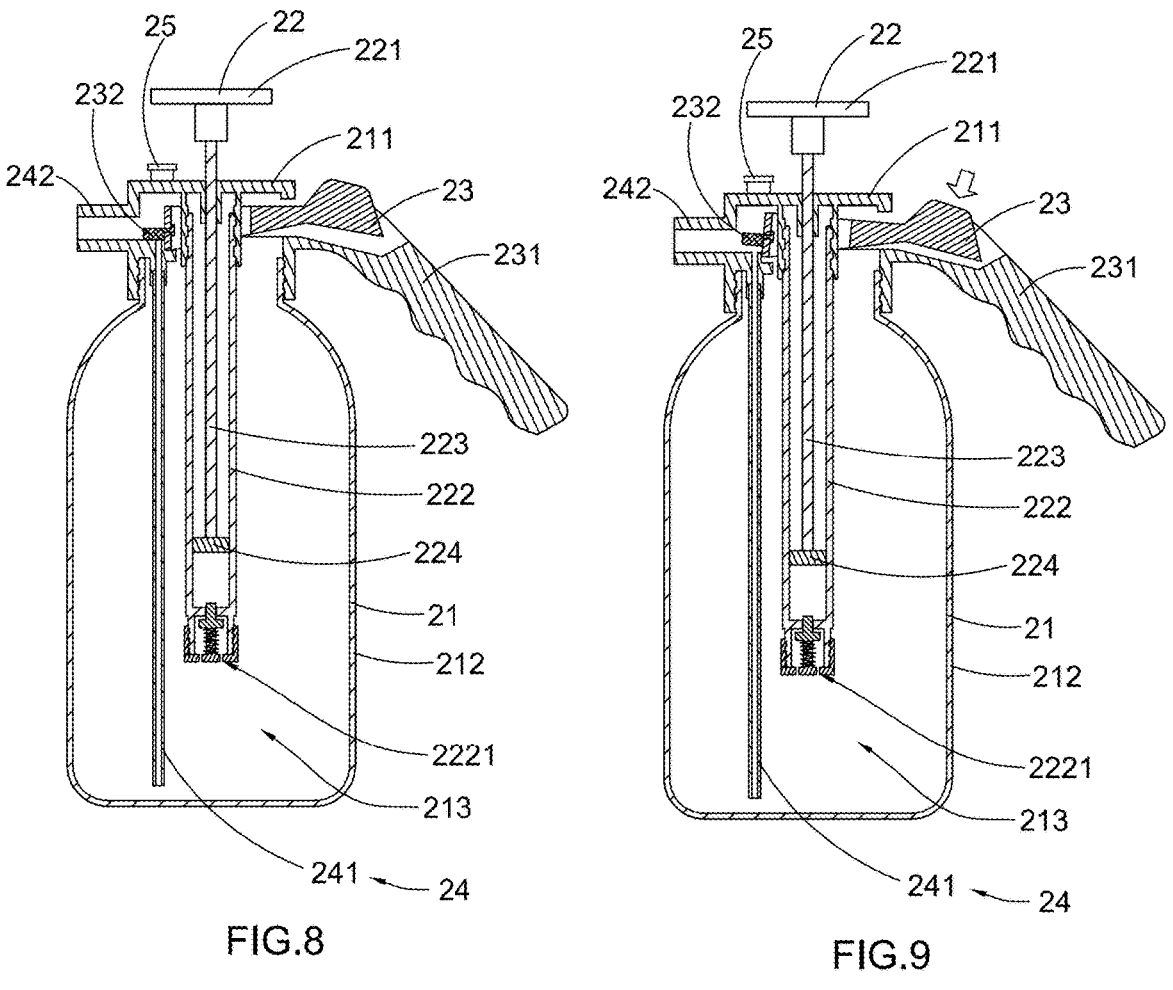
FIG.8                    FIG.9

1

PET PAW WASHING ARRANGEMENT AND HAND-WEARABLE PAW WASHING DEVICE AND WASHING METHOD THEREOF

CROSS REFERENCE OF RELATED APPLICATION

This application is a non-provisional application that claims priority under 35 U.S.C. § 119 to China application number CN202211297927.7, filing date Oct. 21, 2022, China application number CN202211308778.X, filing date Oct. 25, 2022, and China application number CN202311284061.0, filing date Sep. 28, 2023, wherein the entire content of which is expressly incorporated herein by reference.

BACKGROUND OF THE PRESENT INVENTION

Field of Invention

The present invention relates to pet cleaning supplies, and more particularly to a pet paw washing arrangement and hand-wearable paw washing device and washing method thereof.

Description of Related Arts

Nowadays, more and more people prefer to keep a pet such as cat or dog, and the pet brings a lot of fun to people's lives. However, the pet often need to be taken outdoor for a walk, so the pet's paws will inevitably get dirty with dust, mud and debris, and when the pet is brought home, its paws should be cleaned to avoid their feet to contaminate home. In addition, when the pet is taken out to play, for example when the pet need to be taken into a vehicle such as a car, their feet also need to be cleaned. Simply using a paper towel won't completely wipe and clean the pet's paws.

Referring to FIG. 1, US Patent Publication No. US20200015581 has disclosed a conventional pet washing device which is a palm attachable shower including a connector 1 and a shower head 2 having a plurality of silicone protrusions 3 arranged in an array on a cleaning surface thereof and has a plurality of water outlets 4. When in use, the connector 1 is connected to a faucet, and the shower head 2 can be worn on a palm of a hand of a user. Then, the pet's fur can be washed through water from these water outlets 4 and the pet's fur can be brushed through these silicone protrusions 3.

However, the palm attachable shower shown in FIG. 1 is mainly used for bathing and cleaning the whole body of the pet. Because a large amount of water supply is required, it is generally suitable for use in a domestic bathroom or a pet care center, so that it is convenient for the palm attachable shower to be connected to the faucet, and thus the palm attachable shower is not portable and is not convenient to use in outdoors. In addition, in order to facilitate the cleaning of the pet's whole body, the shower head 2 is suitably designed to have a relatively large washing operation area, so the shower head 2 is provided with a plurality of water outlets 4 arranged in an array. However, the palm attachable shower shown in FIG. 1 emits water through a plurality of water outlets 4 to wash the fur of a pet with a relatively large area at the same time. Thus, the water pressure from each water outlet is relatively small, so that it is not suitable for cleaning the debris hidden in the toe clearances of the pet paw.

Referring to FIG. 2, US Patent Publication No. US20190029224 has disclosed a conventional pet paw washer cup which comprises a cup body 5 and a silicone brush 6 detachably assembled in the cup body 5 for cleaning a pet's paw. During use, the cup body 5 is filled with water, then the pet's paw is put into the cup body 5, and the cup body 5 is rotated to use the bristles of the silicone brush 6 to clean the pet's paw. However, this kind of paw washing cup that relies on the silicone brush 6 to wash the pet's paw cannot completely clean the pet's paw, and the pet's paw is need to be fully inserted into the cup body 5, which will cause the pet to feel uncomfortable because of fear and water may spread everywhere on the ground. In addition, when using this pet paw washer cup to wash a next paw of the pet after finishing the cleaning of one paw, the water in the cup already becomes dirty, so that the next paw of the pet has to be washed using dirty water, and thus the next paw actually cannot be cleaned, and if using new clean water to clean the next paw, the water in the cup body 5 needs to be replaced every time when each one paw is washed, so that is very inconvenient to use.

SUMMARY OF THE PRESENT INVENTION

The invention is advantageous in that it provides a pet paw washing arrangement and hand-wearable paw washing device and washing method thereof, wherein the hand-wearable paw washing device of the pet paw washing arrangement is suitable to be worn on a user's hand to clean a pet's paw.

Another advantage of the present invention is to provide a pet paw washing arrangement and hand-wearable paw washing device and washing method thereof, wherein the pet paw washing arrangement is suitable for cleaning the pet's paw at the door of a home or before the pet enters a vehicle.

Another advantage of the present invention is to provide a pet paw washing arrangement and hand-wearable paw washing device and washing method thereof, wherein the pet paw-washing arrangement is provided with a water storing container and the hand-wearable washing device, thereby it is convenient for carrying, so that the user can clean the pet's paw when needed.

Another advantage of the present invention is to provide a pet paw washing arrangement and hand-wearable paw washing device and washing method thereof, wherein the pet paw washing arrangement can adjust the water pressure of a nozzle of the hand-wearable paw washing device, so that the water rejected from the nozzle has a sufficient water pressure to rinse and clean the pet's paw.

Another advantage of the present invention is to provide a pet paw washing arrangement and hand-wearable paw washing device and washing method thereof, wherein the pet paw washing arrangement enables a user to use one hand to wash the pet's paw and the other hand to hold or comfort the pet, so that the pet can be more cooperative with the cleaning process.

Another advantage of the present invention is to provide a pet paw washing arrangement and hand-wearable paw washing device and washing method thereof, wherein multiple paws of a pet can always be washed with clean water provided by the pet paw washing arrangement, and thus the multiple paws of the pet are easier to be cleaned.

Another advantage of the present invention is to provide a pet paw washing arrangement and hand-wearable paw washing device and washing method thereof, wherein the hand-wearable paw washing device is adapted to be worn on a user's hand to enable a single hand operation for completing the cleaning of the pet's paw.

Another advantage of the present invention is to provide a pet paw washing arrangement and hand-wearable paw washing device and washing method thereof, wherein when the hand-wearable paw washing device is worn on the user's hand, the water pressure regulating device thereof is located between an index finger and a thumb of the user, so that it is convenient for the user to use the thumb to operate the water pressure adjusting device to adjust the water pressure of the nozzle.

Another advantage of the present invention is to provide a pet paw washing arrangement and hand-wearable paw washing device and washing method thereof, wherein the hand-wearable paw washing device is worn on the user's hand, it is suitable for the user to hold the pet's paw in his or her hand and rinse the pet's paw from an underside of the pet's paw.

Another advantage of the present invention is to provide a pet paw washing arrangement and hand-wearable paw washing device and washing method thereof, wherein after the water storing container of the pet paw washing arrangement is operated to increase an air pressure in the water storing container, the water in the water storing container is automatically delivered to the hand-wearable paw washing device for convenient use.

Another advantage of the present invention is to provide a pet paw washing arrangement and hand-wearable paw washing device and washing method thereof, wherein when a user wears the hand-wearable paw washing device to wash and clean the pet's paw, the air pressure in the water storing container of the pet paw washing arrangement can be increased by a pressure increasing step through a hand operation process or a foot stepping process, so as to allow the water in the water storing container to be continuously supplied to the hand-wearable paw washing device tor the user to continuously clean the multiple paws of the pet.

Another advantage of the present invention is to provide a pet paw washing arrangement and hand-wearable paw washing device and washing method thereof, wherein water in the water storing container of the pet paw washing arrangement can be used to wash and clean the pet's paws, or can be used for pet drinking.

Additional advantages and features of the invention will become apparent from the description which follows, and may be realized by means of the instrumentalities and combinations particularly pointing out in the appended claims.

According to the present invention, the foregoing and other objects and advantages are attained by a hand-wearable paw washing device which is adapted for being worn on a hand of user and for being connected to a water storing container, comprising:

a wearing body for being worn on the hand of the user; and a spraying head connected to the wearing body and is used for being connected to the water storing container, so as to eject water through the spraying head to rinse a pet's paw when the water storing container supplies water to the spraying head.

According to some embodiments, the wearing body comprises a glove, wherein the spraying head is assembled to the glove.

According to some embodiments, the wearing body comprises a ring-shaped wearing element which is one of a finger ring and an annular hand band, wherein the spraying head is connected to the ring-shaped wearing element.

According to some embodiments, the wearing body comprises a cap wearing element for wearing on one or more fingers of the user, wherein the spraying head is connected to the cap wearing element.

According to some embodiments, the hand-wearable paw washing device further comprises a switch assembly, wherein the spraying head comprises a nozzle assembly, wherein the switch assembly is used to control on and off connection between the nozzle assembly and the water storing container.

According to some embodiments, the switch assembly is configured to adjust water pressure into the nozzle assembly.

According to some embodiments, when the wearing body is worn on the hand of the user, the switch assembly is located between the user's thumb and index finger.

According to some embodiments, the glove comprises a thumb wearing portion and an index finger wearing portion, wherein the hand wearable paw washing device further comprises a switch assembly which is located between the thumb wearing portion and the index finger wearing portion.

According to some embodiments, the glove further comprises a palm body wearing portion, wherein the switch assembly is assembled on a side of the index finger wearing portion or a side of the palm body wearing portion facing toward the thumb wearing portion, or the switch assembly is assembled along the side of the index finger wearing portion and the palm body wearing portion facing toward the thumb wearing portion, so that a thumb of the user which is accommodated in the thumb wearing portion is easy to operate the switch assembly.

According to some embodiments, the switch assembly comprises a switch housing and a control switch assembled to the switch housing, wherein the control switch is located adjacent to a transition area between the index finger wearing portion and the palm body wearing portion to allow the thumb of the user accommodated in the thumb wearing portion to conveniently operate the control switch of the switch assembly.

According to some embodiments, the switch housing comprise two side walls and a bottom wall, and has a through hole and a mounting groove formed in the switch housing between the two side walls and the bottom wall of the switch housing, wherein each of the side walls of the switch housing has a sliding groove, wherein the control switch is installed in the installation groove, wherein the control switch comprises a control wheel and a rotating shaft is mounted between the two side walls of the switch housing and is slidable along the sliding groove, wherein the control wheel is mounted to the rotating shaft.

According to some embodiments, the spraying head comprises a nozzle assembly and a water feeding pipeline connected to the nozzle assembly, wherein the switch assembly is arranged on the water feeding pipeline, wherein the bottom wall of the switch housing is one of an inclined surface and a curved surface, wherein the control wheel rotates along the bottom wall of the switch housing so that a part of the water feeding pipeline between the bottom wall of the switch housing and the control wheel is deformed to open and close the switch assembly and control the water pressure entering the nozzle assembly.

According to some embodiments, the spraying head comprises a nozzle assembly comprising a nozzle and is configured in such a manner: when the wearing body is worn by the user and the pet's paw is held by a palm of the user at an underside of the pet's paw, the nozzle ejects water toward an upper side of the user's palm for washing the pet's paw.

According to some embodiments, the spraying head comprises a nozzle assembly comprising a nozzle and is configured in such a manner: when the wearing body is worn by the user, the nozzle ejects water toward a front side of the user's finger.

According to some embodiments, the spraying head comprises a nozzle assembly and a water feeding pipeline connected to the nozzle assembly wherein the nozzle assembly comprises a nozzle and a connecting head connected to the nozzle, wherein the connecting head comprises a first connecting duct and a second connecting duct transversely extended from the first connecting duct, wherein the first connecting duct is connected to the water feeding pipeline, wherein the second connecting duct is connected to the nozzle, wherein the glove comprises a palm surface and a back surface at an opposite side of the palm surface, wherein the first connecting duct is connected to the back surface of the glove, wherein a position of the nozzle is configured in such a manner: when the glove is worn by the user and the pet's paw is held by a palm of the user at an underside of the pet's paw, the nozzle ejects water toward an upper side of the user's palm for washing the pet's paw.

According to some embodiments, the connecting head further comprises a water outlet head disposed on the second connecting duct, wherein a plurality of outlets is formed along a circumferential direction of the water outlet head, wherein when the nozzle and the second connecting duct are screwed together, an inner cavity is formed between the nozzle and the water outlet head of the connecting head, wherein water entering the connecting head flows from the second connecting to the inner cavity through the plurality of outlets, and then water enters the nozzle and then ejects out from the nozzle, wherein water pressure in the inner cavity is adjusted by rotating the nozzle to change water ejection patterns.

According to another aspect of the present invention, the present invention further provides a pet paw washing arrangement for washing and cleaning a pet's paw, comprising:

a water storing container; and
a hand-wearable paw washing device comprising:
a wearing body for being worn on a hand of a user; and
a spraying head connected to the wearing body and is used for being connected to the water storing container, wherein the spraying head ejects water to rinse the pet's paw when the water storing container supplies water to the spraying head.

According to some embodiments, the pet paw washing arrangement further comprises a water supply pipeline, wherein the water storing container comprises a container body having a storing cavity for storing water, a pressurizing assembly, and a water delivering pipe, wherein the water supply pipeline is extended between the spraying head and the water delivering pipe, wherein the pressurizing assembly is used to pressurize the storing cavity to increase an air pressure in the storing cavity so as to allow water to automatically flow from the container body to the spraying head of the hand-wearable paw washing device through the water supply pipeline.

According to some embodiments, the container body comprises a lid body and a storing body which are assembled to form the storing cavity, wherein the pressurizing assembly, which is assembled to the lid body, comprises an operating handle, a pump cylinder, a connecting rod and a piston, wherein the connecting rod passes through the lid body of the container body and connected between the operating handle and the piston, wherein the piston is located in the pump cylinder, wherein an end of the pump cylinder has one or more air inlets, wherein when the operating handle is operated to drive the connecting rod to slide in the pump cylinder, the piston slides in the pump cylinder so that the air enters the pump cylinder and enters the storing cavity of the container body through the one or more air inlet of the pump cylinder, so as to increase the air pressure in the storing cavity of the container body.

According to some embodiments, the water storing container further comprises a switch element which comprises a control element and a valve element, wherein the water delivering pipe comprises a first part of pipe extending into the storing cavity of the container body and a second part of pipe extending out of the container body, wherein the water supply pipeline is connected to the second part of pipe, wherein the valve element moves under action of the control element to control on and off between the first part of pipe and the second part of pipe.

According to some embodiments, the pet paw washing arrangement further comprises a water supply pipeline, wherein the water storing container comprises a water storing tank, a foot pedaling pressurizing assembly and a water delivering pipe, wherein the water supply pipeline is extended between the spraying head of the hand-wearable paw washing device and the water delivering pipe of the water storing container, wherein the water storing tank has a storing cavity for storing water, wherein the foot pedaling pressurizing assembly is used to increase an air pressure in the storing cavity under action of foot pedaling of the user, so that water automatically enters spraying head of the hand-wearable paw washing device from the water storing tank through the water supply pipeline.

According to some embodiments, the foot pedaling pressurizing assembly comprises a foot pedal, one or more piston assemblies, one or more air cylinders, an air intake pipe, a bracket, and a reset assembly, wherein the foot pedal is pivotally connected to the bracket and automatically resets under action of the reset assembly, wherein when the foot pedal is stepped on by a foot of the user, the one or more piston assemblies are driven to slide in the corresponding one or more air cylinders, so as to pump air into the air intake pipe, so that air enters the water storing tank from the air intake pipe, thereby increasing the air pressure in the storing cavity of the water storing tank.

According to some embodiments, the water storing container comprises a flexible water storing bag which is connected to a water supply pipeline extended between the spraying head and the water storing container or the flexible water storing bag is connected to the spraying head.

The present invention further provides a pet paw washing method, comprising a step of ejecting water from a spraying head connected to a wearing body of a hand-wearable paw washing device which is supplied with water from a water storing container for washing the pet paw.

According to some embodiments, the method further comprises the steps of:
keeping a switch element of the storing container in a closed state;
increasing an air pressure in a storing cavity of the water storing container via a pressurizing assembly; and
automatically feeding water from the water storing container to the spraying head through a water supply pipeline when the switch element is in an open state.

According to some embodiments, the method further comprises the steps of:

keeping a switch assembly provided at the spraying head of the hand-wearable paw washing device in a closed state;

increasing an air pressure in a storing cavity of the water storing container via a pressurizing assembly; and automatically feeding water from the water storing container to the spraying head through a water supply pipeline when the switch element is in an open state.

According to some embodiments, in the above method, the pressurizing assembly, which is configured with an operating handle, function as a manual pressurizing device, so as to facilitate the user's manual push and pull operation to increase the air pressure in the water storing container.

According to some embodiments, in the above method, the pressurizing assembly, which is configured with a foot pedal, serve as a foot pedaling pressurizing assembly, so as to facilitate the user's footstep operation to increase the air pressure in the water storing container.

According to some embodiments, the method further comprises a step of controlling water ejection of the spraying head via a switch assembly disposed between a thumb wearing portion and an index finger wearing portion of a glove of the wearing body, so as to facilitate a single hand control operation of water ejection of the spraying head.

According to some embodiments, the method further comprises a step of adjusting water pressure entering the spraying head via the switch assembly.

According to some embodiments, the method further comprises a step of configuring a nozzle of the spraying head in such a manner that when the wearing body is worn by the user and the pet paw is held by a palm of the user at an underside of the pet paw, the nozzle ejects water toward an upper side of the user's palm for washing the pet paw.

According to some embodiments, the method further comprises a step of configuring a nozzle of the spraying head in such a manner that when the wearing body is worn by the user, the nozzle ejects water toward a front side of the user's finger.

According to some embodiments, in the above method, the wearing body of the hand-wearable paw washing device is selected from the group consisting of a glove, a ring-shaped wearing element and a cap wearing element.

The invention is advantageous in that is provides a pet paw washing arrangement that is convenient to carry and suitable for cleaning the pet paws in front of the home or before the pet enters a transportation vehicle.

Another advantage of the present invention is to provide a pet paw washing arrangement that is suitable for handheld or finger-worn use to clean the pet paws.

Another advantage of the present invention is to provide a pet paw washing arrangement which is provided with a water storage container that is convenient for carrying and can automatically supply cleaning water to the paw washing device.

Another advantage of the present invention is to provide a pet paw washing arrangement, wherein the paw washing device, when worn on the user's finger, sprays water to the paw of the user at an inner inner side of the finger and allows the finger to move flexibly for scrubbing the pet paw.

Another advantage of the present invention is to provide a pet paw washing arrangement, wherein when the paw washing device is worn on the user's finger, and the water outlet is located adjacent to the user's wearing finger, and moves along with the user's wearing finger, so that the user can conveniently wash the pet paw by employing the water outlet for spraying water while using the wearing finger to rub and wash the pet paw.

Another advantage of the present invention is to provide a pet paw washing arrangement, wherein the paw washing device, when worn on the user's finger, sprays water around the user's wearing finger or from a position between the two wearing fingers, so that it is convenient to achieve the clean operation because water is sprayed from the water outlet and can reach a position between the wearing fingers and the pet paw for washing the pet paw.

Another advantage of the present invention is to provide a pet paw washing arrangement, wherein a brush is arranged on a paw washing head of the paw washing device to allow the user's finger to scrub the pet paw with the brush, thereby making it easier to clean the pet paw.

Another advantage of the present invention is to provide a pet paw washing arrangement, wherein the brush of the paw washing device is arranged near its paw washing head, so that the pet paw can be cleaned while water is being sprayed and the brush is being used.

Another advantage of the present invention is to provide a pet paw washing arrangement, wherein the paw washing device is suitable for a single-handed operation, so that the user's other hand can be used to comfort the pet.

Another advantage of the present invention is to provide a pet paw washing arrangement, wherein the water pressure of the paw washing device is adjustable, so as to wash the pet paw with an appropriate water volume and a water pressure as needed.

Another advantage of the present invention is to provide a pet paw washing arrangement, wherein the switch of the paw washing device is conveniently operated by the user's finger, so that the user can start and stop the water spraying operation of the paw washing device as needed during the process of cleaning the pet paw with the paw washing device.

Another advantage of the present invention is to provide a pet paw washing arrangement, wherein the paw washing device provides a plurality of nozzles, thereby providing different water spray styles for users to choose from.

Another advantage of the present invention is to provide a pet paw washing arrangement, wherein the water storage container is a foldable structure, so that it can be in a folded state and have a smaller size when not storing water, and thus is convenient to carry.

Another advantage of the present invention is to provide a pet paw washing arrangement, wherein the water storage container can provide detergent, so that the pet paw can be cleaned with foaming detergent when needed.

Another advantage of the present invention is to provide a pet paw washing arrangement, wherein the paw washing device and the water storage container can be conveniently stored when not in use.

According to another aspect of the present invention, the present invention provides a pet paw washing arrangement comprising a paw washing device and a water storage container, wherein the water storage container is arranged to supply water to the paw washing device for cleaning the pet paw.

According to some embodiments, the paw washing device integrates a handheld paw washing function and a finger-wearable paw washing function.

According to some embodiments, the paw washing device comprises a paw washing head which comprises a first end portion having one or more water outlets, wherein the first end portion is suitable for wearing on one or more fingers of the user.

According to some embodiments, the paw washing head further comprises a second end portion, wherein each of the first end portion and the second end portion comprises a brush for brushing the pet paw.

According to some embodiments, the first end portion and the second end portion are suitable for being worn on different fingers of the user at the same time.

According to some embodiments, the paw washing head is made of flexible material.

According to some embodiments, the paw washing head comprises a base, wherein a wearing chamber is formed between the first end portion of the paw washing head and the base for the user to wear by one or more fingers, wherein the second end portion has a wearing cavity for the user to wear another one or more fingers.

According to some embodiments, the first end portion of the paw washing head forms a wearing chamber for the user to wear by one or more fingers, wherein the second end portion has a wearing cavity for the wearer to wear another one or more fingers.

According to some embodiments, the paw washing device further comprises a holding element, wherein the paw washing head is connected to the holding element.

According to some embodiments, the paw washing device further comprises a holding element which has a storing cavity, wherein the first end portion and the second end portion of the paw washing head is capable of being pivoted in or out.

According to some embodiments, the paw washing device comprises a wearing body and a spraying head, wherein water in the water storage container is supplied to the spraying head, and the spraying head has at least one water outlet, wherein when the wearing body is worn on a wearing hand of the user, the water outlet is located near fingers of the wearing hand of the user.

According to some embodiments, the wearing body comprises one or more finger wearing components for the user's fingers to wear, and the water outlet of the spraying head is located near the one or more finger wearing components.

According to some embodiments, the water outlet of the spraying head is located in front of, behind, or in the same plane as a bottom surface of the one or more finger wearing components.

According to some embodiments, the wearing body comprises two finger wearing components, and the water outlet of the nozzle is located between the said two finger wearing components.

According to some embodiments, the wearing body further comprises a scrubbing component connected to the one or more finger wearing components, wherein each of the scrubbing component and the one or more finger wearing components is provided with a brush layer, and the scrubbing component corresponds to a palm position of the user.

According to some embodiments, each of the one or more finger wearing components comprises a ring-shaped wearing body to form a wearing channel, and the paw washing head further comprises a housing component, wherein the ring-shaped wearing body is connected to the housing component.

According to some embodiments, the paw washing head comprises a positioning pin that connects the scrubbing component to the housing component, wherein the positioning pin is adapted to be clamped between the user's two fingers when the user wears the wearing body.

According to some embodiments, the spraying head comprises a plurality of nozzles to correspondingly provide a plurality of the water outlets, and the plurality of nozzles is configured to provide different water spray patterns through the corresponding plurality of water outlets.

According to some embodiments, the paw washing device comprises a housing component, and the spraying head is connected to the housing component, wherein the housing component is provided with a water delivery pipeline communicated to the water storage container, and the housing component is equipped with a water control switch to control the opening and closing of the water delivery pipeline.

According to some embodiments, the water control switch comprises a control member, a driving member, and a biasing member, wherein when the control member is operated by the user, the driving member is driven by the control member to drive the biasing member to move closer or move away from the water delivery pipeline to control a water flow of the water delivery pipeline.

According to some embodiments, the paw washing device comprises a housing component, and the spraying head is connected to the housing component, wherein a plurality of water guiding pipelines is arranged in the housing component, and the housing component is equipped with a selecting switch, wherein the spraying head comprises a plurality of nozzles forming a plurality of the water outlets, wherein the plurality of nozzles is configured to provide different water spray patterns through the corresponding plurality of water outlets, wherein the plurality of nozzles is respectively connected to the corresponding plurality of water guiding pipelines, wherein the selecting switch is used to allow one of the water guiding pipelines to be in a connected state for water supply.

According to some embodiments, the spraying head comprises two the nozzles, wherein the selecting switch comprises a control part and a driving part, wherein the control part comprises a knob and a connecting arm, wherein the driving part comprises a driving part body and two pressing parts which are extended from the driving part body, wherein the connecting arm is operatively connected to the driving part body, wherein the driving part is movably disposed between the two water guiding pipelines, wherein when the knob of the control part is rotated, the connecting arm is driven to rotate, thereby synchronously driving the driving part to rotate, so as to drive the two pressing parts to rotate to act on one of the water guiding pipelines and press the corresponding water guiding pipeline to be in a closed state.

According to some embodiments, the water storage container comprises a container body in form of a water bag, and comprises a controller for pumping water from the container body into the paw washing device.

According to some embodiments, the water storage container comprises a container body and a water pump, wherein the paw washing device comprises water feeding pipeline, wherein the paw washing head is connected to the container body via the water feeding pipeline, and the water pump is used to pump water from the container body to the paw washing device.

According to some embodiments, the water storage container further comprises a detergent supply device provided on the container body, and the container body comprises a plurality of foldable segments to form a foldable structure.

According to some embodiments, the water storage container has a positioning groove for detachably installing the paw washing device.

According to some embodiments, the water storage container comprises a container body and a pressurization device, wherein the pressurization device is arranged to increase water pressure in the container body, thereby automatically delivering water in the container body to the paw washing device.

According to another aspect of the present invention, the present invention provides a paw washing device comprising a holding element and a water spraying assembly which is connected to the holding element and comprises a paw washing head, wherein the paw washing head has a wearing chamber for one or more fingers of a user to wear, and the paw washing head has one or more water outlets for spraying water to clean the pet paw when the water spraying assembly is supplied with water, wherein the paw washing device allows the user to select a handheld paw washing mode and a finger-wearable paw washing mode to clean the pet paw.

According to another aspect of the present invention, the present invention provides a paw washing device comprising a paw washing head which comprises a first end portion and a second end portion, wherein the first end portion forms a wearing chamber and has one or more water outlets, and the second end portion has a wearing cavity, wherein the wearing chamber and the wearing cavity are respectively for wearing by different fingers of a user.

According to some embodiments, the paw washing head is made of flexible material, wherein the first end portion comprises a first brush, and the second end portion comprises a second brush, and the first end portion and the second end portion are bendable to facilitate brushing and washing of the pet paw with the first brush and the second brush.

According to another aspect of the present invention, the present invention provides a paw washing device comprising a wearing body for wearing on a hand of a user and a spraying head, wherein the spraying head has at least one water outlet, wherein when the wearing body is worn on the hand of the user, the at least one water outlet is located near a finger of the hand of the user.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 6 is a sectional view illustrating a switch assembly of the hand-wearable paw washing device of the pet paw washing arrangement being in a closed state according to the above first preferred embodiment of the present invention.

FIG. 7 is a sectional view illustrating the switch assembly of the hand-wearable paw washing device of the pet paw washing arrangement being in an operation state for adjusting the water pressure of the water ejected from the spraying head according to the above first preferred embodiment of the present invention.

FIG. 8 is a sectional view illustrating a water storing container of the pet paw washing arrangement according to the above first preferred embodiment of the present invention.

FIG. 9 is a sectional view illustrating the water storing container of the pet paw washing arrangement being in a operation state according to the above first preferred embodiment of the present invention.

FIG. 10A is a perspective view illustrating the switch assembly being operated to adjust water ejection patterns of water ejected from the spraying head of the hand-wearable paw washing device of the pet paw washing arrangement according to the above first preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. that indicate relations of directions or positions are based on the relations of directions or positions shown in the appended drawings, which are only to facilitate descriptions of the present invention and to simplify the descriptions, rather than to indicate or imply that the referred device or element is limited to the specific direction or to be operated or configured in the specific direction. Therefore, the above-mentioned terminologies shall not be interpreted as confine to the present invention.

It is understandable that the term "a" or "an" should be understood as "at least one" or "one or more". In other words, in some embodiments, the number of an element can be one and in other embodiment the number of the element can be more than one. The term "a" or "an" is not construed as a limitation of quantity.

Referring to FIGS. 3 to 11, a pet paw washing arrangement according to the first preferred embodiment of the present invention comprises a hand-wearable paw washing device 10, a water storing container 20 and a water supply pipeline 30. The hand-wearable paw washing device 10 is used to be worn on the user's hand, the water storing container 20 is used to store water or a cleaning solution formed by mixing cleaning agent and water, and the water storing container 20 is used for supply water to the hand-wearable paw washing device 10 through the water supply pipeline 30, so that the user can wash and clean the pet's paw through the hand-wearable paw washing device 10.

Figure 1:
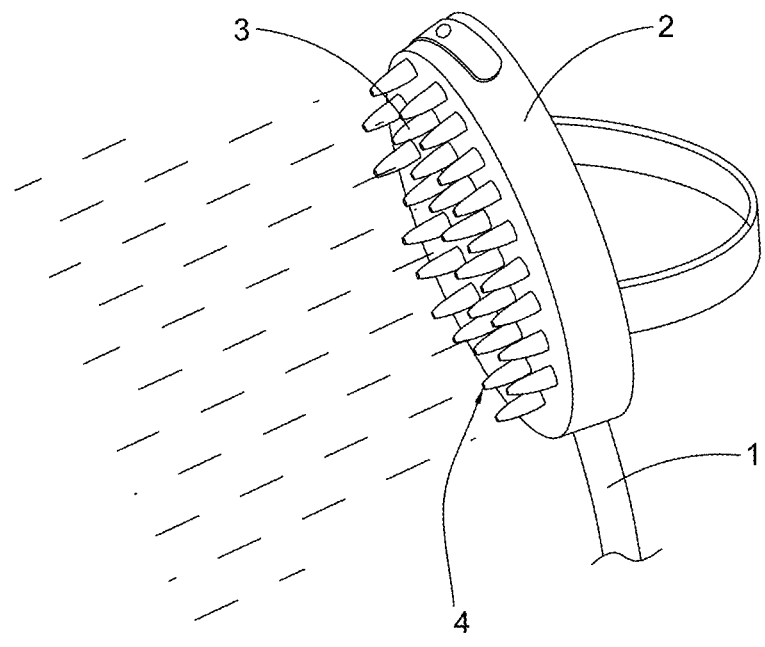
FIG. 1 is a perspective view of a conventional pet washing device.
Figure 2:
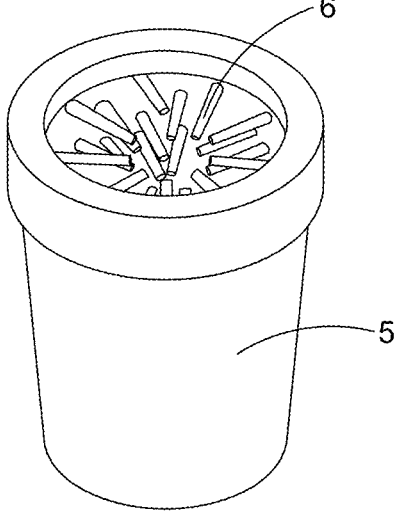
FIG. 2 is a perspective view of a conventional pet paw washer cup.
Figure 3:
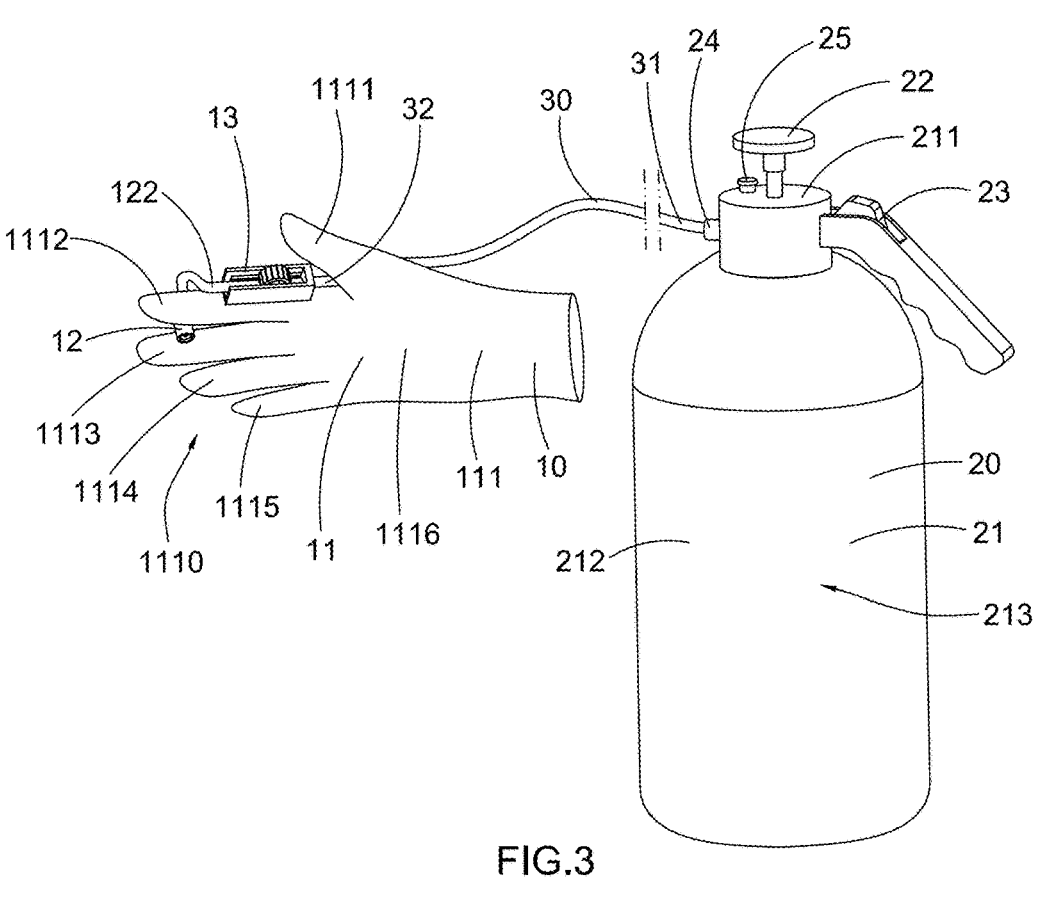
FIG. 3 is a perspective view of a pet paw washing arrangement and its hand-wearable paw washing device according to a first preferred embodiment of the present invention.
Figure 4:
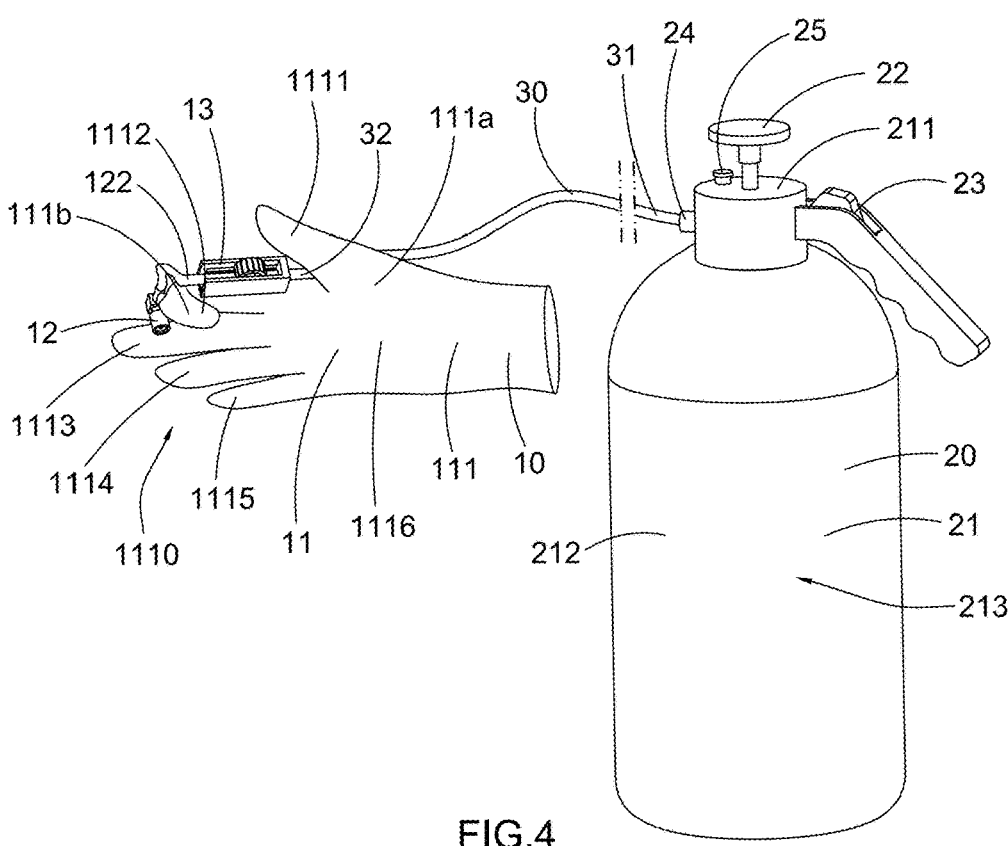
FIG. 4 is a perspective view illustrating a spraying head being mounted to a glove of the hand-wearable paw washing device of the pet paw washing arrangement according to the above first preferred embodiment of the present invention.
Figure 5:
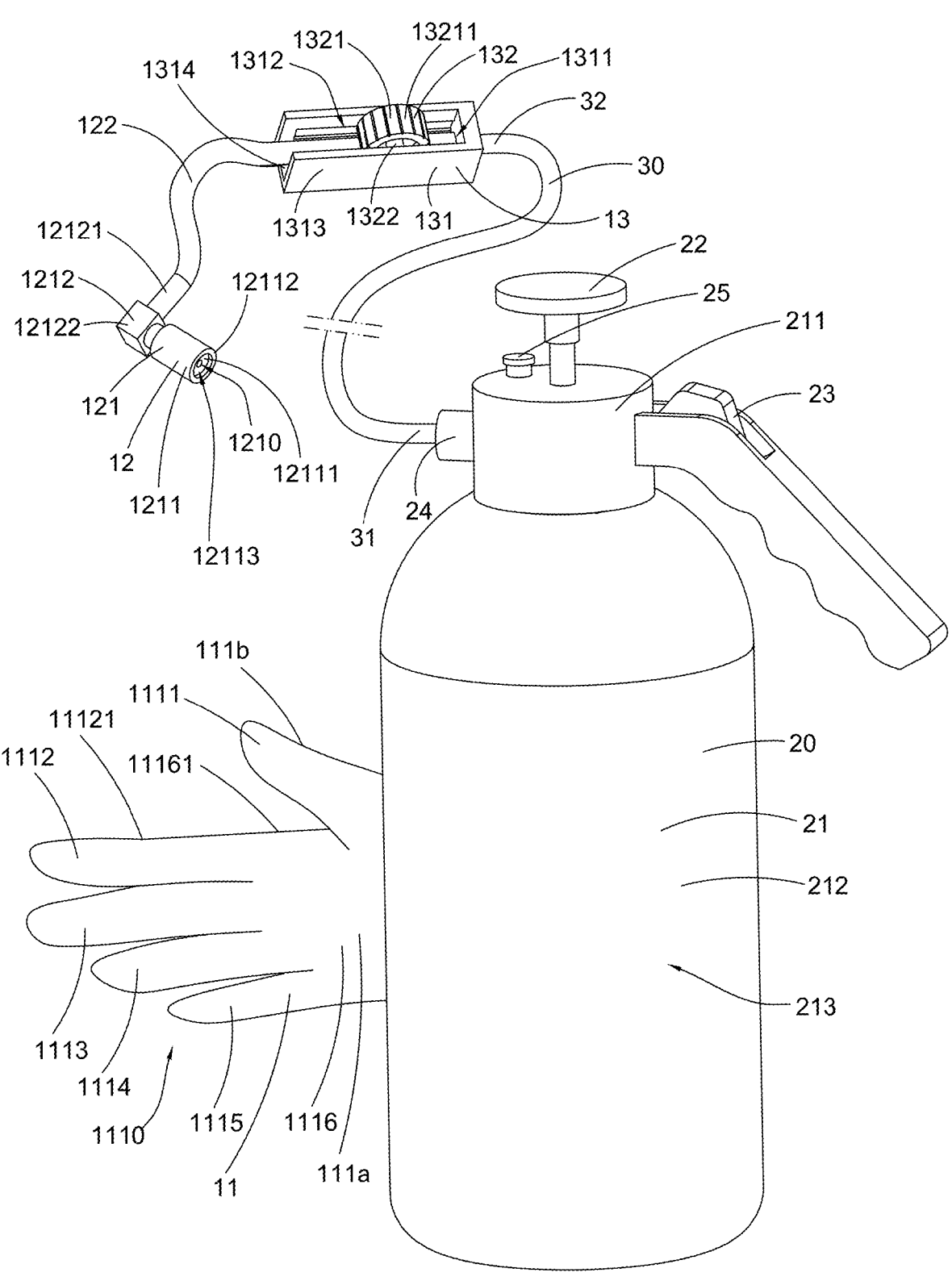
FIG. 5 is an enlarged exploded view of the pet paw washing arrangement according to the above first preferred embodiment of the present invention.

More specifically, as shown in FIGS. 3 to 5, the hand-wearable paw washing device 10 comprises a wearing body 11 and a spraying head 12, and the wearing body 11 comprises a glove 111 in this embodiment which is suitable for being worn on the user's hand, the spraying head 12 is directly or indirectly connected to the wearing body 11 to eject water for cleaning the pet's paw. Preferably, the hand-wearable paw washing device 10 further comprises a switch assembly 13 which controls the water ejection operation of the spraying head 12 by switching between on and off states.

As shown in FIG. 5, the spraying head 12 comprises a nozzle assembly 121 and a water feeding pipeline 122. The nozzle assembly 121 is connected to the water feeding pipeline 122 and assembled to the glove 111 of the wearing body 11. The nozzle assembly 121 has a water outlet 1210, and the water in the water feeding pipeline 122 can be ejected out through the water outlet 1210. The switch assembly 13 is arranged on the water feeding pipeline 122 and is used to communicate the water feeding pipeline 122 with the water supply pipeline 30 when it is in an open state, so that the water in the water supply pipeline 30 can enter the water feeding pipeline 122 and is further ejected out from the water outlet 1210 of the nozzle assembly 121. When the switch assembly 13 is in its closed state, the water feeding pipeline 122 is not communicated to the water supply pipe 30, and the water in the water supply pipeline 30 cannot enter the water feeding pipeline 122.

It can be understood that, in this embodiment of the present invention, after the hand-wearable paw washing device 10 is worn on the user's hand, when the nozzle assembly 121 is in a working state, the water outlet 1210 ejects out a water jet to rinse pet's paw. In this embodiment, the nozzle assembly 121 comprises a nozzle 1211 and a connecting head 1212, and the nozzle 1211 is connected to the connecting head 1212 which is connected to the water feeding pipeline 122.

As shown in FIG. 5, the connecting head 1212 in this embodiment comprises a first connecting duct 12121 and a second connecting duct 12122 transversely extended from the first connecting duct 12121, the first connecting duct 12121 is connected to the water feeding pipeline 122, the second connecting duct 12122 is connected to the nozzle 1211. That is, in this embodiment, the second connecting duct 12122 of the connecting head 1212 and the first connecting duct 12121 are extended to define an comprised angle therebetween, and the comprised angle can be a right angle. The second connecting duct 12122 is used to change the water ejecting direction and the position of the water outlet 1210.

As shown in FIG. 3 to FIG. 5, the glove 111 has a palm surface 111a and a back surface 111b. In this embodiment, the first connecting duct 12121 of the connecting head 1212 is extended along the back surface o111b of the glove 111, and the second connecting duct 12122 of the connecting head 1212 is extended vertically from the first connecting duct 12121, so that when the glove 111 is worn on the user's hand and the user holds the pet's paw at the bottom side of the pet's paw, the second connecting duct 12122 and the nozzle 1211 are configured to eject water toward the top side of the palm surface 111a of the glove 111 to rinse and clean the pet's paw, thereby it is convenient to wash and clean the pet's paw, especially the bottom of the pet's paw.

As shown in FIGS. 3 and 4, the second connecting pipe 12122 and the nozzle 1211 and the palm surface 111a of the glove 111 may form an comprised angle, and the comprised angle may be an acute angle. Preferably, the comprised angle may be a right angle. That is, the second connecting pipe 12122 and the nozzle 1211 are kept perpendicular to the palm surface 111a of the glove 111, which facilitates controlling the angle of washing the pet's paws and soles from the water outlet 1210 of the nozzle 1211.

More specifically, as shown in FIG. 3 to FIG. 5, the glove 111 comprises a plurality of finger wearing portions 1110 which specifically comprise a thumb wearing portion 1111, an index finger wearing portion 1112, a middle finger wearing portion 1113, a ring finger wearing portion 1114, and a pinky finger wearing portion 1115, and the glove 111 further comprises a palm body wearing portion 1116. In this embodiment, the switch assembly 13 is mounted on the glove 111, and preferably it is located between the thumb wearing portion 1111 and the index finger wearing portion 1112, so that when the glove 111 is worn on the user's hand, the thumb of the user's wearing hand accommodated in the thumb wearing portion 1111 can conveniently operate the switch assembly 13, so as to control the water ejection operation and stop the water spraying of the nozzle 1211.

The second connecting duct 12122 and the nozzle 1211 may be located between two adjacent finger wearing portions 1110 of the glove 111, that is, between the thumb wearing portion 1111 and the index finger wearing portion 1112, or between the index finger wearing portion 1112 and the middle finger wearing portion 1113, or between the middle finger wearing portion 1113 and the ring finger wearing portion 1114, or between the ring finger wearing portion 1114 and the pinky finger wearing portion 1115. Preferably, the second connecting duct 12122 and the nozzle 1211 may be located between the index finger wearing portion 1112 and the middle finger wearing portion 1113 of the glove 111 or between the middle finger wearing portion 1113 and the ring finger wearing portion 1114, so that when the hand-wearable paw washing device 10 is worn by the user's hand, the water outlet 1210 is located in the substantially central area of the palm surface 111*a* of the glove 111, so as to facilitate the user to move the glove 111 to adjust the position of the water outlet 1210, so as to wash the pet's paw.

As shown in FIG. 5, the nozzle assembly 121 is connected to the glove 111, for example, it can be assembled to the back surface 111*b* of the glove 111 through the first connecting duct 12121 of the connecting head 1212. Alternatively, the nozzle 1211 or the second connecting duct 12122 is assembled to one of the finger wearing portions 1110 of the glove 111, and the assembly method may be welding or bonding.

The nozzle 1211 has a water outlet surface 12111, and the water outlet 1210 is located in the water outlet surface 12111. The nozzle 1211 also has an annular peripheral wall 12112 extending from the water outlet surface 12111 to form a groove 12113 between the peripheral wall 12112 and the water outlet surface 12111. In other words, the position of the water outlet surface 12111 is lower than the top surface of the peripheral wall 12112, so as to prevent the water outlet 1210 from being blocked up by the foot of the pet when the user wears the glove 111 and uses the hand-wearable paw washing device 10 to clean the pet's paw.

The position of the water outlet surface 12111 of the nozzle 1211 and a plane of the palm surface 111*a* of the glove 111 may be approximately in the same plane, that is, the water outlet surface 12111 of the nozzle 1211 may be the parallel with the plane of the palm surface 111*a* of the glove 111. Alternatively, the position of the water outlet surface 12111 of the nozzle 1211 is slightly lower than, or slightly higher than the plane of the palm surface 111*a* of the glove 111. Preferably, the water outlet surface 12111 of the nozzle 1211 may be substantially in the same plane with the plane of the palm surface 111*a* of the glove 111 or slightly higher than the plane of the palm surface 111*a* of the glove 111. In this way, when the user's hand is wearing the glove 111 and the nozzle 1211 is located between the two adjacent finger wearing portions 1110, it can prevent the two adjacent finger wearing portions 1110 of the glove 111 to press toward each other to block the water outlet 1210 of the nozzle 1211.

The glove 111 is preferably made of a flexible waterproof material, such as latex, nitrile rubber, rubber, polyethylene (PE), PVC (polyvinyl chloride), PVA (polyvinyl alcohol), polybutadiene rubber, butyl rubber, leather, etc., so as to be convenient to wear on the user's hand and allow free movement of the user's hand.

Figure 11:
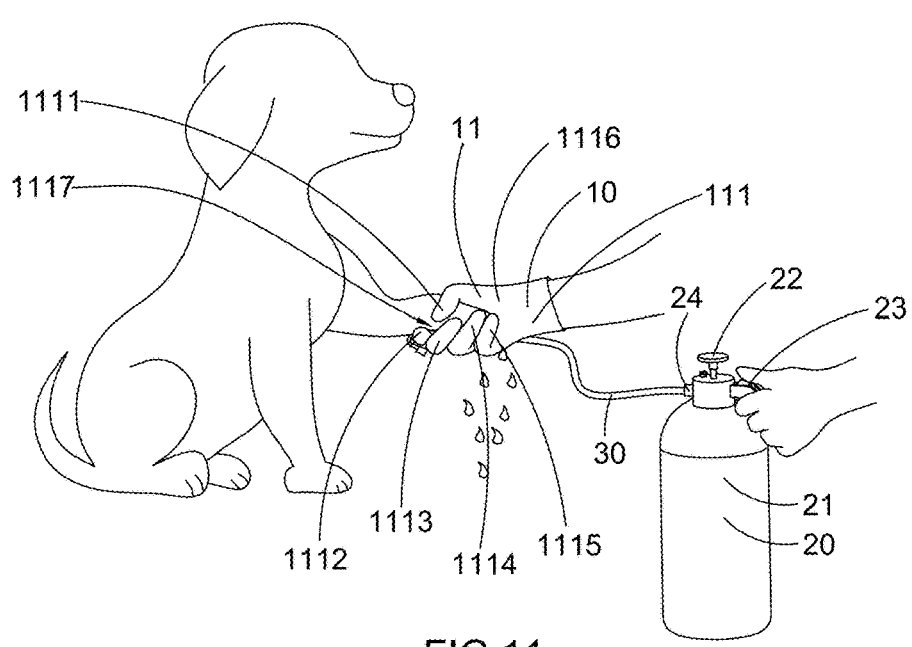
FIG. 11 is a perspective view illustrating the pet paw washing arrangement being in a operation state to washing and cleaning the pet's paw according to the above first preferred embodiment of the present invention.

As shown in FIG. 11 of the drawings, when the user's hand wears the hand-wearable paw washing device 10, the user's palm accommodated in the palm body wearing portion 1116 can be used to hold the pet's paw, the fingers of the user accommodated in the finger wearing portions 1110 of the glove 111 can be bent so that the thumb wearing portion 1111, the index finger wearing portion 1112, the middle finger wearing portion 1113, the ring finger wearing portion 1114 and the pinky finger wearing portion 1115 are also bent, and the pet's paw can be held on the palm surface 111*a* of the curved surface of the glove 111, so that a cleaning chamber 1117 is formed between the palm surface 111*a* of the glove 111 and the pet's sole, and thus water is ejected from the water outlet 1210 of the nozzle assembly 121 to the pet's paw and enters the cleaning chamber 1117 to further soak and wash the pet's paw.

When the water storing container 20 continuously delivers water to the water feeding pipeline 122 of the hand-wearable paw washing device 10 through the water supply pipeline 30, the nozzle assembly 121 of the spraying head 12 of hand-wearable paw washing device 10 can be used to sequentially wash a plurality of paws of the pet.

When cleaning the pet's paw, since the switch assembly 13 is disposed between the thumb wearing portion 1111 and the index finger wearing portion 1112, it is convenient for the user to use his or her thumb accommodated in the thumb wearing portion 1111 to turn on the switch assembly 13 to allow the water in the water supply pipeline 30 to enter the water outlet line 122, so as to rinse the pet's paw through the water outlet 1210 of the nozzle 1211 of the nozzle assembly 121 of the spraying head 12. After finishing the wash of one paw of the pet, the hand of the user wearing the hand-wearable paw washing device 10 can go on to hold the next paw of the pet and rinse the next paw. In order not to waste water, the user can also conveniently close the switch assembly 13 between the thumb wearing portion 1111 and the index finger wearing portion 1112 through the thumb of the user accommodated in the thumb wearing portion 1111, so as to stop the water flow from the water supply pipeline 30 to the water feeding pipeline 122. When the hand of the user wearing the hand-wearable paw washing device 10 holds the next paw of the pet and is ready to wash, the user's thumb held in the thumb wearing portion 1111 can open the switch assembly 13 to start the operation of washing the pet's next paw. After the cleaning operation of all the paws of the pet is completed, the user can also turn off the switch assembly 13 in time through the user's thumb accommodated in the thumb wearing portion 1111, so that the water outlet 1210 of the nozzle 1211 of the nozzle assembly 121 stops water ejection, so as to reduce waste of water.

As shown in FIGS. 3 to 5, preferably, the switch assembly 13 is assembled on a side surface 11121 of the index finger wearing portion 1112 or a side surface 11161 of the palm wearing portion 1116 facing toward the thumb wearing portion 1111, or the switch assembly 13 is assembled along the side surface 11121 of the index finger wearing portion 1112 and the side surface 11161 of the palm body wearing portion 1116 facing toward the thumb wearing portion 1111, and is located between the index finger wearing portion 1112 and the thumb wearing portion 1111, so that the thumb of the user accommodated in the thumb wearing portion 1111 can conveniently operate the switch assembly 13.

The switch assembly 13 can be implemented as a component with a valve body which can be various types of valves, so as to control the on-off between the water supply pipeline 30 and the water feeding pipeline 122. In this embodiment, the switch assembly 13 is not only a switch, but also a water pressure regulating assembly. More specifically, as shown in FIG. 5, the switch assembly 13 comprises a switch housing 131 and a control switch 132, the switch housing 131 has a through hole 1311 and an installation groove 1312 formed tween two side walls 1313 and a bottom wall 1314 of the switch housing 131, each of the side walls 1313 of the switch housing 131 is further formed with a sliding groove 1315. The control switch 132, which is installed in the installation slot 1312 comprises a control wheel 1321 and a rotating shaft 1322 in this embodiment. The rotating shaft 1322 is installed between the two side walls 1313 of the switch housing 131 and can move along the sliding groove 1315, the control wheel 1321 is rotatably installed on the rotating shaft 1322 to act on the water feeding pipeline 122 to complete opening and closing of a water outlet of the water feeding pipeline 122 and adjusting the water pressure in the water feeding pipeline 122.

The switch assembly 13 is assembled between the index finger wearing portion 1112 and the thumb wearing portion 1111, and the control wheel 1321 is located adjacent to a transition area between the index finger wearing portion 1112 and the palm body wearing portion 1116, so that it is convenient for an end portion of the thumb of the user accommodated in the thumb wearing portion 1111 to operate the control wheel 1321 of the switch assembly 13.

It can be understood that, in this embodiment, the pipeline between the switch assembly 13 and the water storing container 20 is defined as the water supply pipeline 30, the pipeline between the position corresponding to the switch assembly 13 and the position corresponding to the nozzle assembly 121 is defined as the water feeding pipeline 122. The water supply pipeline 30 and the water feeding pipeline 122 may be an integral pipeline, which may be a flexible pipeline, such as a transparent pipeline made of PVC (polyvinyl chloride). The flexible integral pipeline facilitates the free movement of the user's wearing hand to adjust the position of the hand-wearable paw washing device 10.

That is to say, the water feeding pipeline 122 is a flexible pipe, and the control wheel 1321 can be operated by the user's hand to act on the flexible water feeding pipeline 122, so as to realize the on and off of the water supply to the water feeding pipeline 122.

As shown in FIGS. 5 to 7, the bottom wall 1314 of the switch housing 131, which may be an inclined surface or a curved surface such as an arc surface, has a peak position 13141, a valley position 13142 and a transition surface 13143 between the peak position 13141 and the valley point position 13142, the surface of the control wheel 1321 has a plurality of threads 13211 to facilitate the user's rotating operation.

More specifically, when the control wheel 1321 is rotated by the thumb of the user accommodated in the thumb wearing portion 1111, so that it slides along the sliding groove 1315 in the mounting groove 1312 until the peak position 13141 of the bottom wall 1314 of the casing 131 to be in contact with the water feeding pipeline 122 and the water feeding pipeline 122 is pressed between the control wheel 1321 and the peak position 13141 of the bottom wall 1314 of the switch housing 131, the water in the water supply pipeline 30 cannot enter the water feeding pipeline 122, thereby cutting off the water supply between the water supply pipeline 30 and the water feeding pipeline 122. In this way, the switch assembly 13 is in a closed state, and the nozzle assembly 121 has no water supply, so that water cannot be discharged for cleaning the pet's paw, as shown in FIG. 6.

When the control wheel 1321 is rotated and a part of the water feeding pipeline 122 located between the control wheel 1321 and the bottom wall 1314 of the switch housing 131 and the switch housing 131, a contact position of the bottom wall 1314 with the water feeding pipeline 122 changes from the peak position 13141 along the transition surface 13143 to allow the communication between the water supply pipeline 30 and the water feeding pipeline 122 so that the switch assembly 13 is in the open state, and the control wheel 1321 is toggled to adjust the distance between the control wheel 1321 and the bottom wall 1314 of the switch housing 131, so as to adjust the pressure and flow rate of water entering the water feeding pipeline 122, so that the nozzle 1211 of the nozzle assembly 121 ejects water flow from the water outlet 1210 at a suitable pressure and flow rate for washing the pet's paw.

It can be understood that the transition surface 13143 of the control wheel 1321 is an inclined surface or a curved surface such as an arc surface. When the contact position of the part of the water feeding pipeline 122 between the bottom wall 1314 of the switch housing 131 changes from the peak position 13141 along the transition surface 13143, the pressure of the water in the water feeding pipeline 122 gradually decreases, and the flow rate gradually increases, and the control wheel 1321 is convenient for the user to adjust the pressure and flow rate of the water entering the water feeding pipeline 122 in a stepless control manner, so as to facilitate the user control. When the contact position between bottom wall 1314 of the switch housing 131 and the water feeding pipeline 122 changes to the valley point position 13142, as shown in FIG. 7, the pressure of the water entering the water feeding pipeline 122 reaches the minimum value and the flow rate reaches the maximum value.

It can be understood that, in a possible alternative mode, the switch assembly 13 may only control the on-off between the water feeding pipeline 122 and the water supply pipeline 30, and another independent pressure regulators may be used to control the water pressure entering the spraying head 12. The independent pressure regulator may be provided at the spraying head 12 or in the water supply pipeline 30.

As shown in FIG. 8 to FIG. 9, the water storing container 20, which is used for supplying water to the hand-wearable paw washing device 10, can manually or electrically drive the water in the water storing container 20 to pass through the water supply pipeline 30 and enter the water feeding pipeline 122 and the nozzle 121 of the spraying head 12 of the hand-wearable paw washing device 10.

In this embodiment, the water storing container 20 comprises a container body 21, a pressurizing assembly 22, a switch element 23, and a water delivering pipe 24. A water inlet end 31 at one end of the water supply pipe 30 is connected to the water delivering pipe 24 of the water storing container 20, and a water outlet end 32 at the other end thereof is connected to the water feeding pipeline 122 of the spraying head 12 of the hand-wearable paw washing device 10. The container body 21 comprises a lid body 211 and a storing body 212 which are assembled to form a storing cavity 213 for storing water. The pressurizing assembly 22 is used for pressurizing the storing cavity 213 to increase the air pressure in the storing cavity 213, and the switching element 23 is used for opening and closing the water supply from the water delivering pipe 24 to the water supply pipeline 30 The water storing container 20 may further comprises a pressure relief valve 25 which is arranged on the lid body 211, so that after the water storing container is not in use, the pressure relief valve 25 is opened to restore a normal pressure in the storing cavity 213.

In other words, in this embodiment of the present invention, the user can increase the air pressure in the water storing container 20 by manually operating the pressurizing assembly 22, so that because the water storing container 20 has a relatively high pressure. when the switch element 23 of the water storing container 20 and the switch assembly 13 of the hand-wearable paw washing device 10 are both in the open state, under the action of the relatively large air pressure in the storing cavity 213, the water in the water storing container 20 will automatically flow from the water storing container 20 to the spraying head 12 of the hand-wearable paw washing device 10 through the water supply pipeline 30.

The water delivering pipe 24 is assembled to the lid body 211 of the container body 21 and comprises a first part of the pipe 241 and a second part of the pipe 242, wherein the first part of the pipe 241 is extended into the storing cavity 213 of the container body 21, the second part of the pipeline 242 is extended to the outside of the lid body 211 of the container body 21, so as to be connected with the water inlet end 32 of the water supply pipeline 30, so that when there is sufficient water stored in the storing cavity 213 of the container body 21, water can enter the second part of the pipeline 242 through the first part of the pipeline 241 of the water outlet pipeline 24, and then enter the water supply pipeline 30.

The switch element 23 can be disposed to the second part of the pipe 242 of the water delivering pipe 24, and it be various suitable valves, so as to control the on and off between the second part of the pipe 242 of the water delivering pipe 24 and the water supply pipelines 30.

For example, in this embodiment, as shown in FIGS. 8 and 9, the switch element 23 includes a control element 231 and a valve element 232. When the switch element 23 is in a closed state, the valve element 232 will block an inlet of the second part of pipe 242, so that water cannot enter the second part of pipe 242 through the first part of pipe 241 of the water delivering pipe 24. When the control element 231 is operated by the user such as pressing, the valve element 232 is driven by the control element 231 to move to be in an open state, so that the first part of pipe 241 of the water delivering pipe 24 and the second part of the pipe 242 is in a communicated state, so that the water in the storing cavity 213 of the container body 21 can enter the second part of the pipe 242 from the first part of the pipe 241 of the water delivering pipe 24 and further reach the water supply pipeline 30, so that water can be supplied to the spraying head 12 of the hand-wearable paw washing device 10.

The Pressurizing assembly 22, which is assembled to the lid body 211 of the container body 21, comprises an operating handle 221, a pump cylinder 222, a connecting rod 223 and a piston 224, wherein the operating handle 221 is connected to the connecting rod 223, the piston 224 is connected to the connecting rod 223. Accordingly, the connecting rod 223 passes through the lid body 211 of the container main body 21 and is connected to the operating handle 221 at one end thereof and connected to the piston 224 at the other end thereof. The piston 224 is located in the pump cylinder 222, the end of the pump cylinder 222 has one or more air inlets 2221, when the operating handle 221 is operated to drive the connecting rod 223 to slide in the pump cylinder 222, the piston 224 slides in the pump cylinder 222 to allow air to enter the pump cylinder 222 and fill air into the storing cavity 213 of the container body through the air inlet 2221 of the pump cylinder 222, so that the air pressure in the storing cavity 213 of the container body 21 is increased.

It can be understood that, the user can easily pump air into the storing cavity 213 of the container body 21 by manually holding the operating handle 221 of the Pressurizing assembly 22 and repeatedly pushing and pulling so as to raise the air pressure in the storing cavity 213 of the container body 21. After the storing cavity 213 of the container body 21 is pressurized by the Pressurizing assembly 22, when the switch element 23 of the water storage container 20 and the switch assembly 13 of the hand-wearable paw washing device 10 are turned on, the water in the water storage container 20 will automatically flow from the water storing container 20 to the spraying head 12 of the hand-wearable paw washing device 10 via the water supply pipeline 30.

Correspondingly, the present invention provides a washing method for cleaning the pet paw using the pet paw washing arrangement, the method comprises the steps of pressurizing the water storing container 10, wearing the hand-wearable paw washing device 10, and washing of the pet paw.

During the pressurizing step of the water storing container 20, the switch element 23 is kept in a closed state, and the air pressure in the storing cavity 213 of the water storing container 20 is increased by the Pressurizing assembly 22.

In the wearing step of the hand-wearable paw washing device 10, one wearing hand of the user is accommodated in the glove 111 of the hand-wearable paw washing device 10.

In the washing and cleaning step of the pet's paw, the user holds one paw of the pet with the wearing hand on which the hand-wearable paw washing device 10 is worn, and the user can operate the water storing container 20 with one free hand. The control element 231 of the switch element 23 on the hand-wearable paw washing device 10 is operated by the thumb of the user's wearing hand to operate the control wheel 1321 of the switch assembly 13 of the hand-wearable paw washing device 10 to switch the switch assembly 13 from the closed state to the open state. At then, the water storing container 20 after the pressurization step automatically transports water to the hand-wearable paw washing device 10 through the water supply pipeline 30, so that the washing head 12 is used to rinse and wash the pet's paw.

Figure 10A:
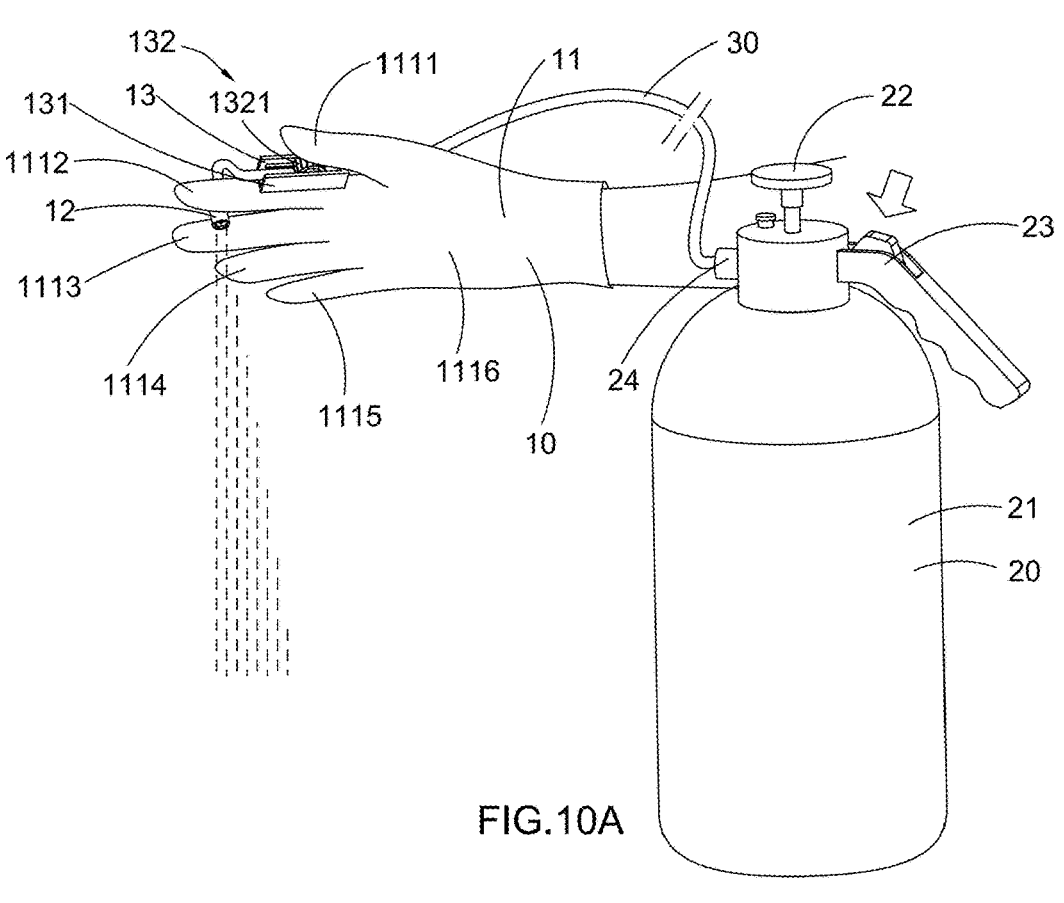
FIG. 10A is a perspective view illustrating the switch assembly being operated to allow the spraying head of the hand-wearable paw washing device of the pet paw washing arrangement to eject water according to the above first preferred embodiment of the present invention.
Figure 10B:
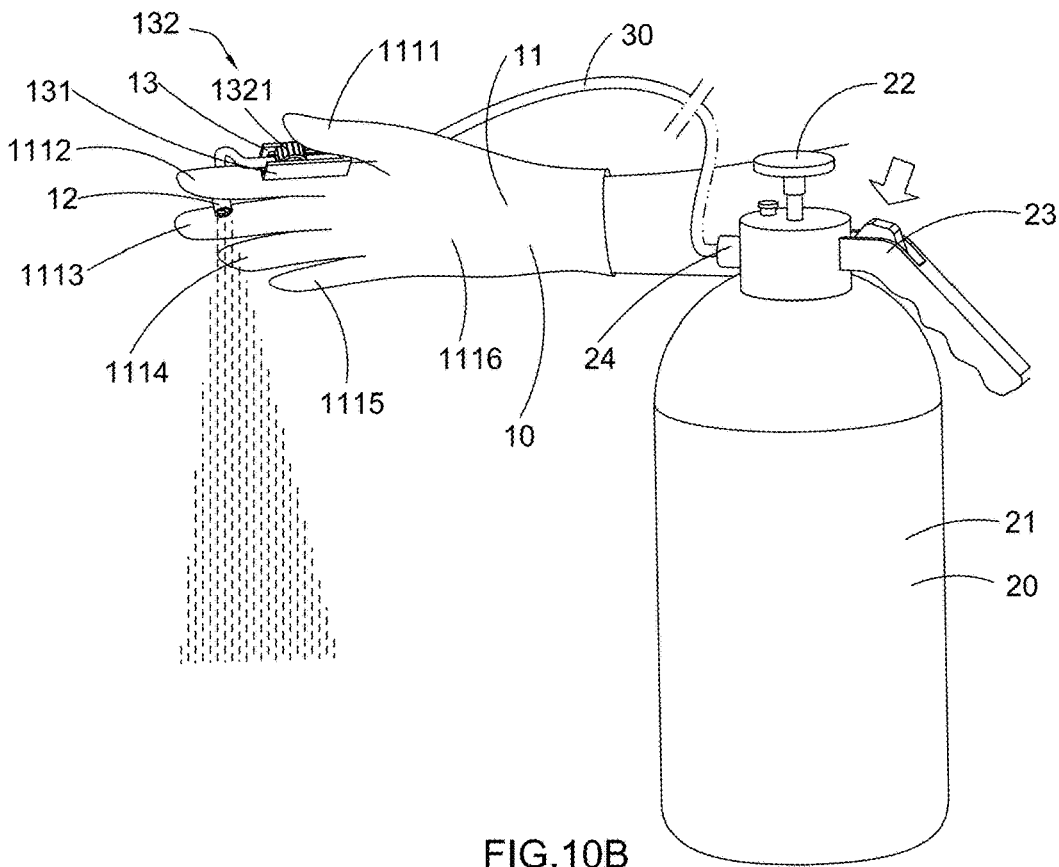

The washing and cleaning method of the pet's paw may further comprise a step of adjusting the water pressure, in this embodiment, by using the thumb of the user's wearing hand to toggle the control wheel 1321 of the switch assembly 13 of the hand-wearable paw washing device 10, the pressure of the water flow ejected from the water outlet of the nozzle 1211 of the spraying head 12 can be adjusted, as shown in FIG. 10A and FIG. 10B of the drawings.

When the control element 231 of the switch element 23 is configured to need to be continuously pressed to maintain its open state, such as the structure shown in FIGS. 8 to 10B, in the cleaning step of the pet paw, the user can use the free hand to operate the control element 231 of the switch element 23 on the water storing container 20, and the wearing hand operates the switch assembly 13 to control the washing operation of the pet's paw.

When the control element 231 of the switch element 23 is configured to have the structure of an on-off valve and can automatically maintain its open state or closed state, for example, pressing the control element 231 once can cause the switch element 23 to automatically switch to open, and if the control element 231 is pressed again, the switch element 23 can be automatically switched to the off state and maintain at the off state. At this time, in the washing and cleaning step of the pet's paw, the user can hold the pet with one free hand, and operate the control element 231 of the switch element 23 of the water storing container 20 through the wearing hand wearing the hand-wearable paw washing device 10, and the thumb of the wearing hand can be used to operate the control wheel 1321 of the switch assembly 13 to control the washing and cleaning operation of the pet's paw. In other words, the user can control the opening and closing of the water delivering pipe 24 of the water storing container 20 of the pet paw washing arrangement and the opening and closing of the spraying head 12 through the single-hand operation of the wearing hand. The opening and closing of the water feeding pipeline 122 and the adjustment of the water pressure are achieved by the wearing hand. The user's other free hand can comfort the pet, and can pick up the pet to prevent the cleaned paw from touching the ground again and getting dirty.

It can be understood that, after cleaning one paw of the pet, the user can use the hand-wearable paw washing device 10 to continue cleaning the next paw of the pet until all of the paws of the pet are cleaned, and each paw of the pet is rinsed with clean water, so that the multiple paws of the pet can be cleaned more easily. When switching to the next paw for cleaning, the user can also temporarily turn off the switch assembly 13 through the thumb of the wearing hand of the hand-wearable paw washing device 10 and wait for the user's wearing hand to hold the next paw. When the next paw of the pet is ready for washing, the thumb of the wearing hand is used to turn on the switch assembly 13, so that the control operation of the switch assembly 13 can be completed with one hand, which is more convenient.

In addition, the pet paw washing arrangement of the present invention is convenient to store and carry, and is equipped with a water source, so that the pet paw washing arrangement of the present invention is suitable for cleaning the pet's paw before the pet entering the room from the outdoors, such as at the door of the house. In addition, the paw's pet can be cleaned by the pet paw washing arrangement before the pet enters a vehicle, so that the pet's paw will not contaminate the vehicle, such as a car, a ship, and the like. After the user has cleaned all of the pet's paws, the user can further dry the water on the pet's paws with a clean towel or paper towel, or put clean foot covers on the pet's paws, and then allow the pet to enter indoor environment or the vehicle.

As shown in FIGS. 12A to 12D, a pet paw washing arrangement according to a first alternative mode of the above mentioned first preferred embodiment of the present invention is illustrated. In this embodiment, the pet paw washing arrangement comprises the hand-wearable paw washing device 10, the water storing container 20 and the water supply pipeline 30. In this embodiment, there is no switch element 23 provided on the water storing container 20, and the hand-wearable paw washing device 10 is provided with the switch assembly 13.

The connecting head 1212 of the nozzle assembly 121 of the spraying head 12 of the hand-wearable paw washing device 10 and the water feeding pipeline 122 can be embedded in the glove 111 to expose only the nozzle 1211 of the nozzle assembly 121 of the spraying head 12 and the control wheel 1321 of the switch assembly 13. In other words, the glove 111 has a multi-layer structure, and these components can be embedded in the multi-layer structure of the glove to avoid contact with the outside world, so that the hand-wearable paw washing device 10 is more concise and this structure can enhance its aesthetic appearance.

Correspondingly, in this embodiment of the present invention, the following steps may be included in the washing method for cleaning the pet's paw by using the pet paw washing arrangement.

In the pressurizing step of the water storing container 20, the switch assembly 13 of the hand-wearable paw washing device 10 is kept in a closed state, and the air pressure in the water storing container 20 is increased by the pressurizing assembly 22.

Figure 12A:
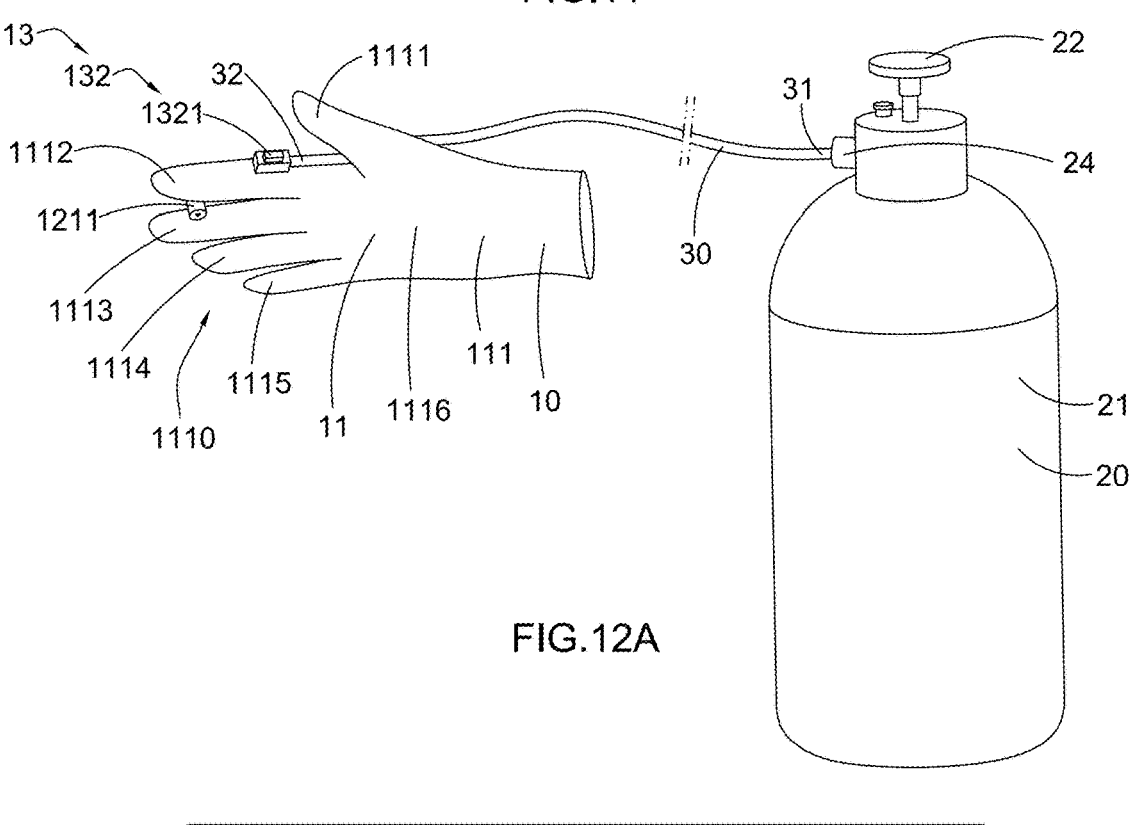
FIG. 12A is a perspective view of a pet paw washing arrangement according to a first alternative mode of the above first preferred embodiment of the present invention.
Figure 12B:
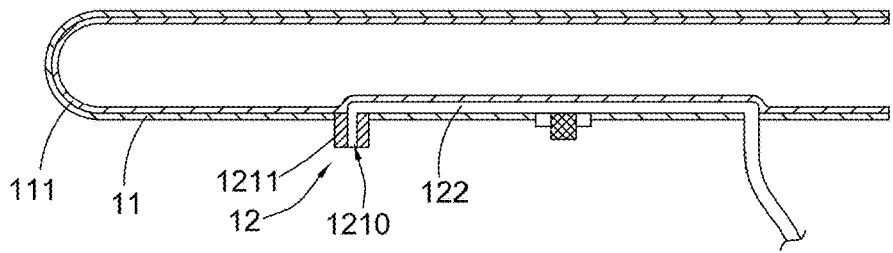
FIG. 12B is a sectional view of a hand-wearable paw washing device of the pet paw washing arrangement according to the first alternative mode of the above first preferred embodiment of the present invention.
Figures 12C, 12D:
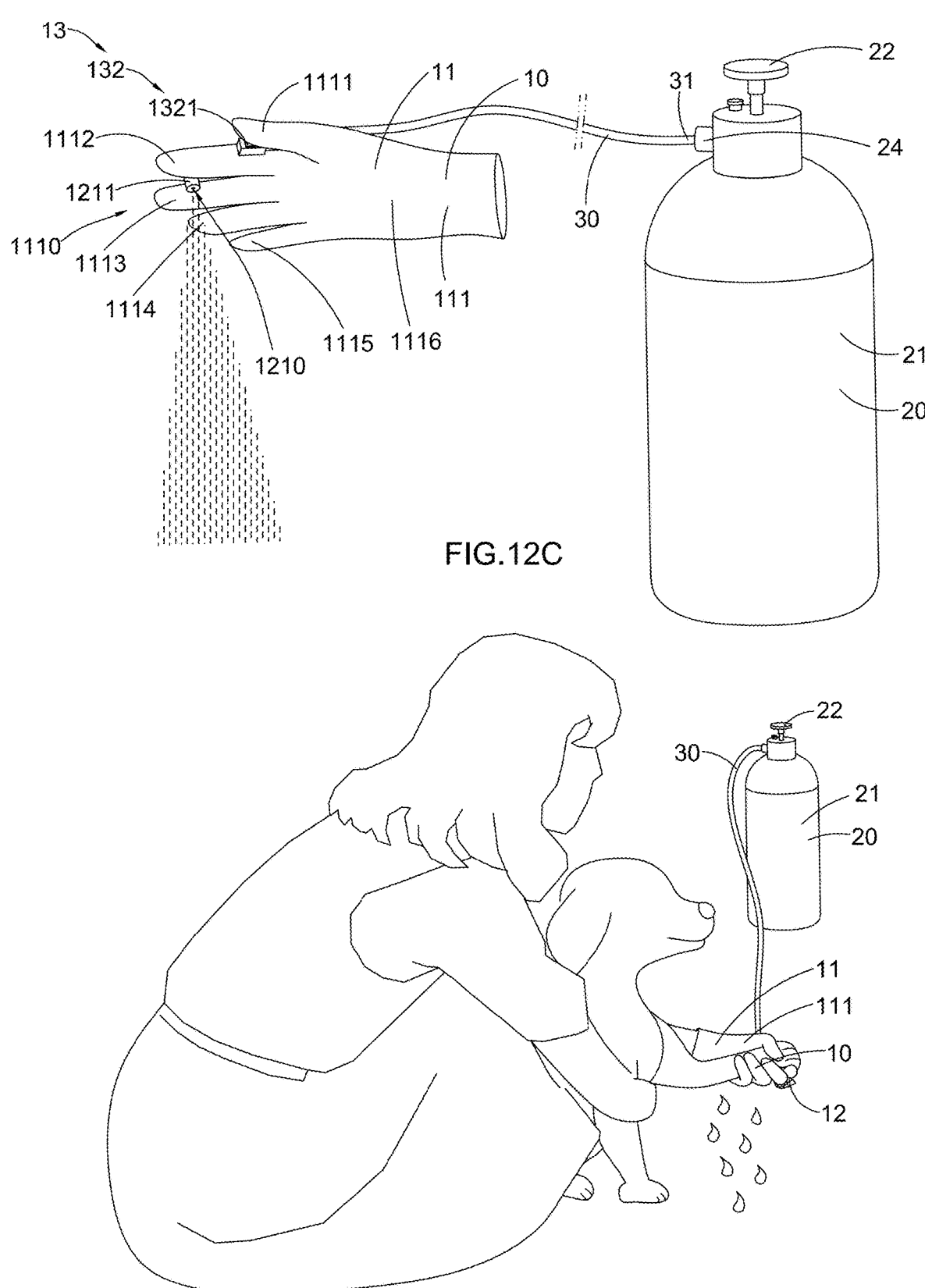
FIG. 12C is a perspective view illustrating the hand-wearable paw washing device of the pet paw washing arrangement being in an operation state according to the first alternative mode of the above first preferred embodiment of the present invention.
FIG. 12D is a perspective view illustrating the pet paw washing arrangement being in an operation state to washing and cleaning the pet's paw according to the first alternative mode of the above first preferred embodiment of the present invention.

Referring to FIGS. 12C and 12D, in the washing and cleaning step of the pet's paw, the user holds a paw of the pet through the wearing hand wearing the hand-wearable paw washing device 10, and the user can hold the pet by a free hand, and use the thumb of the wearing hand of the user to operate the control wheel 1321 of the switch device 13 of the hand-wearable paw washing device 10 to turn on the switch assembly 13 from its off state. An then, the water storing container 20 after the pressurization step automatically feeds water to the spraying head 12 of the hand-wearable paw washing device 10 through the water supply pipeline 30 for washing the pet's paw, and by rotating the control wheel 1321 of the switch assembly of the hand-wearable paw washing device 10, the pressure of the water flow ejected from the water outlet 1210 of the nozzle 1211 of the spraying head 12 can be adjusted.

Figure 13:
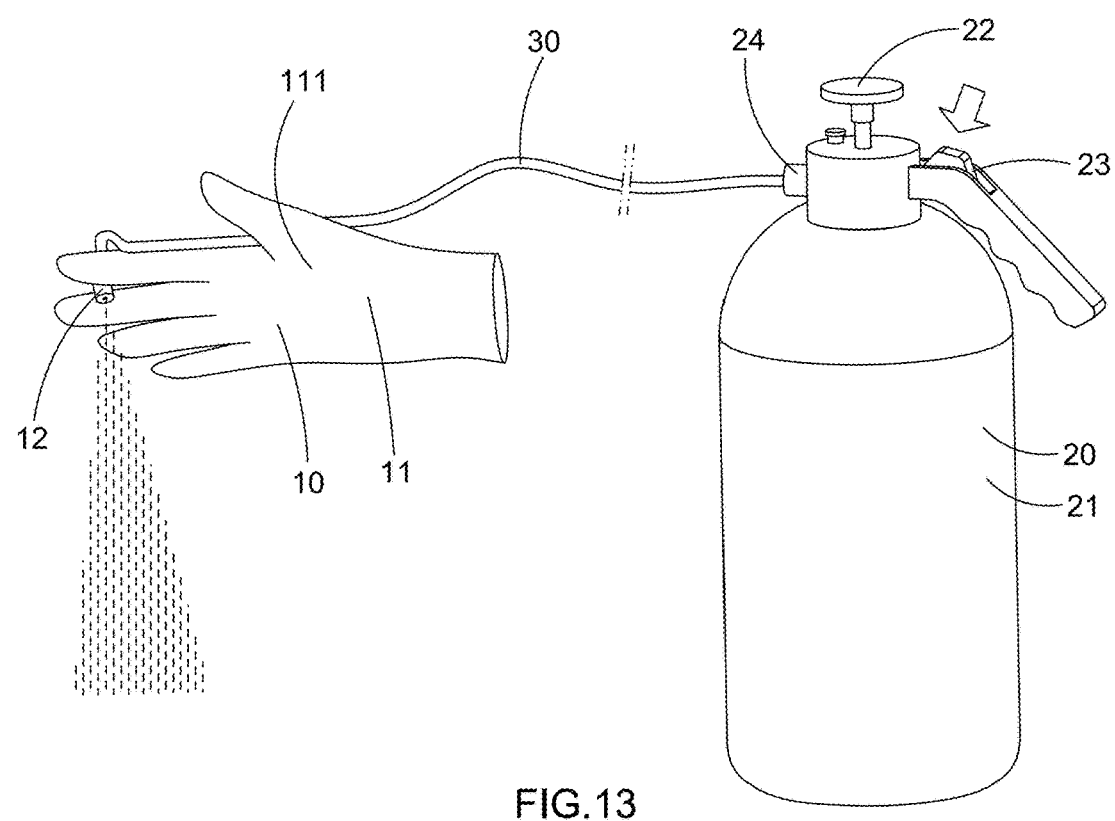
FIG. 13 is a perspective view of a pet paw washing arrangement according to a second alternative mode of the above first preferred embodiment of the present invention.

As shown in FIG. 13, a pet paw washing arrangement according to a second alternative mode of the above mentioned first preferred embodiment of the present invention is illustrated, in this embodiment, the pet paw washing arrangement comprises the hand-wearable paw washing device 10, the water storing container 20 and the water supply pipeline 30. In this embodiment, the water storing container 20 is provided with the switch element 23 and the hand-wearable paw washing device 10 is not provided with the switch assembly 13.

In this embodiment of the present invention, in the washing and cleaning method for cleaning the pet's paw using the pet paw washing arrangement, during the pressurizing step of the water storing container 20, the switch element 23 of the water storing container 20 is kept in a closed state, and the air pressure in the storing cavity 213 of the water storing container 20 is increased by the pressurizing assembly 22.

In the washing and cleaning step of the pet's paw, the user holds one paw of the pet with the wearing hand on which the hand-wearable paw washing device 10 is worn, and the user can use a free hand to operate the switch element 23 of the water storing container 20 to switch it from the closed state to the open state. An then, the water storing container 20 after the pressurization step automatically feeds water to the hand-wearable paw washing device 10 through the water supply pipe 30, so that the spraying head 12 is used to rinse the pet's paw.

Figure 14:
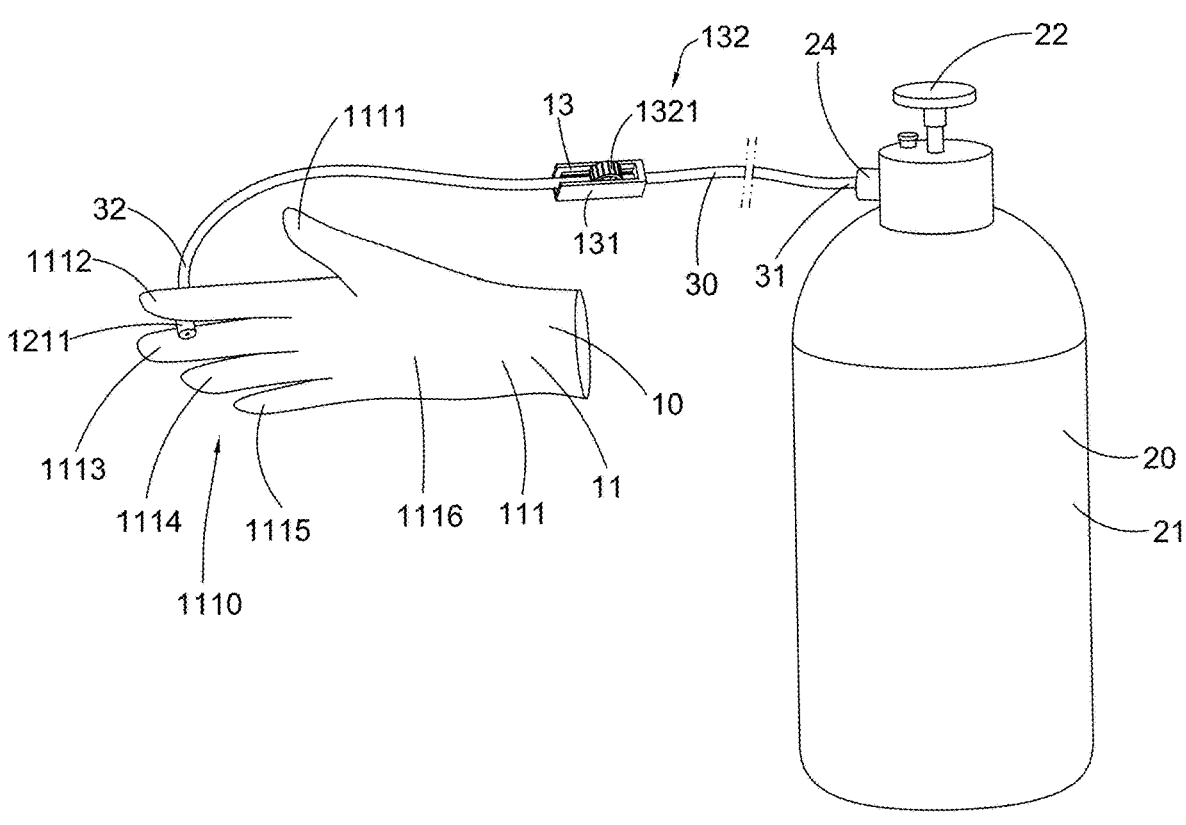
FIG. 14 is a perspective view of a pet paw washing arrangement according to a third alternative mode of the above first preferred embodiment of the present invention.

As shown in FIG. 14 of the drawings, a pet paw washing arrangement according to a third alternative mode of the above mentioned first preferred embodiment of the present invention is illustrated. In this embodiment, the pet paw washing arrangement comprises the hand-wearable paw washing device 10, the water storing container 20 and the water supply pipeline 30. In this embodiment, the water storing container 20 is not provided with the switch element 23, the hand-wearable paw washing device 10 is not provided with the switch assembly 13, and the switch assembly 13 is provided on the water supply pipeline 30. The hand-wearable paw washing device 10 comprises the wearing body 10 and the spraying head 12. The water inlet end 31 of the water supply pipeline 30 is connected to the water delivering pipe 24 of the water storing container 20, and the water outlet end 32 of the water supply pipeline 30 is connected to the nozzle 1211 of the nozzle assembly 121 of the spraying head 12.

Correspondingly, in this embodiment of the present invention, the following steps may be included in the washing and cleaning method for cleaning the pet's paw by using the pet paw washing arrangement.

During the pressurizing step of the water storing container 20, the switch assembly 13 provided on the water supply pipeline 30 is kept in a closed state, and the air pressure in the storing cavity 213 of the water storage container 20 is increased by the pressurizing device 22.

In the washing and cleaning step of the pet's paw, the user holds a paw of the pet through the wearing hand wearing the hand-wearable paw washing device 10, and the user can use a free hand to operate the control wheel 1321 of the switch assembly 13 on the water supply pipeline 30 to switch it from the closed state to the open state. An then, the water storing container 20 after the pressurization step automatically feeds water to the spraying head 12 of the hand-wearable paw washing device 10 through the water supply pipeline 30 for washing the pet's paw, and the control wheel 1321 of the switch assembly 13 can be operated by the free hand to adjust the pressure of the water flow ejected from the water outlet 1210 of the nozzle 1211 of the spraying head 12.

Referring to FIGS. 15A to 15D, a pet paw washing arrangement according to a fourth alternative mode of the above mentioned first preferred embodiment of the present invention is illustrated. In this embodiment, the pet paw washing arrangement comprises the hand-wearable paw washing device 10, the water storing container 20 and the water supply pipeline 30. In this embodiment, the difference is the nozzle arrangement 121 of the spraying head 12 of the hand-wearable paw washing device 10.

More specifically, the nozzle assembly 121 comprises a nozzle 1211 and a connecting head 1212 which comprises a water outlet head 12123 disposed on the second connecting duct 12122, and a plurality of outlets 12124 is formed along the circumferential direction of the water outlet head 12123, the nozzle 1211 and the second connecting duct 12122 are screwed with each other, and an inner cavity 12125 is formed between the nozzle 1211 and the water outlet head 12123 of the connecting head 1212.

Correspondingly, the water entering the connection head 1212 enters the inner cavity 12125 from the plurality of outlets 12124 of the water outlet head 12123 of the second connecting duct 12122, and then enters the nozzle 1211 from the inner cavity 12125, and finally water is ejected from the water outlet 1210 of the nozzle 1211.

Figure 15A:
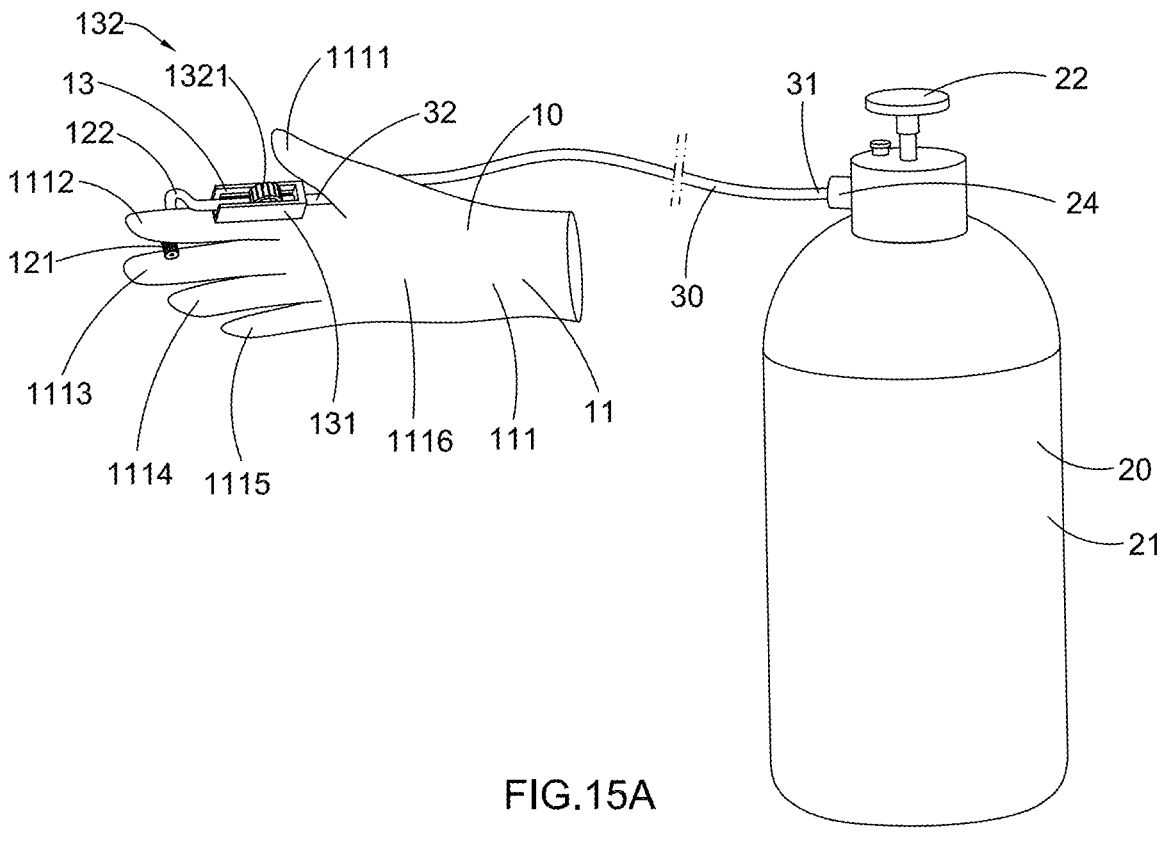
FIG. 15A is a perspective view of a pet paw washing arrangement according to a fourth alternative mode of the above first preferred embodiment of the present invention.
Figure 15B:
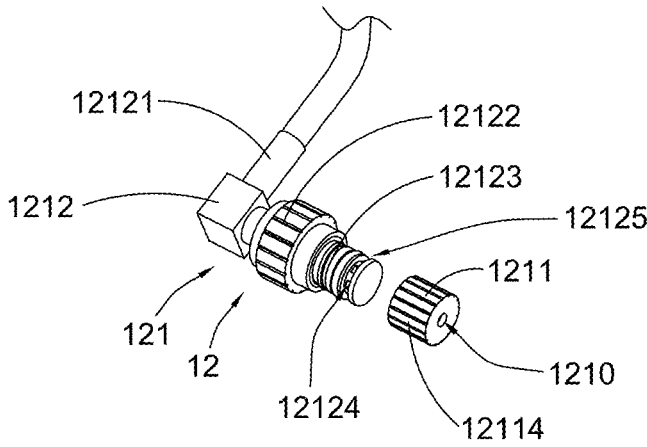
FIG. 15B is an enlarged exploded view of a spraying head of the hand-wearable paw washing device of the pet paw washing arrangement according to the fourth alternative mode of the above first preferred embodiment of the present invention.
Figure 15C:
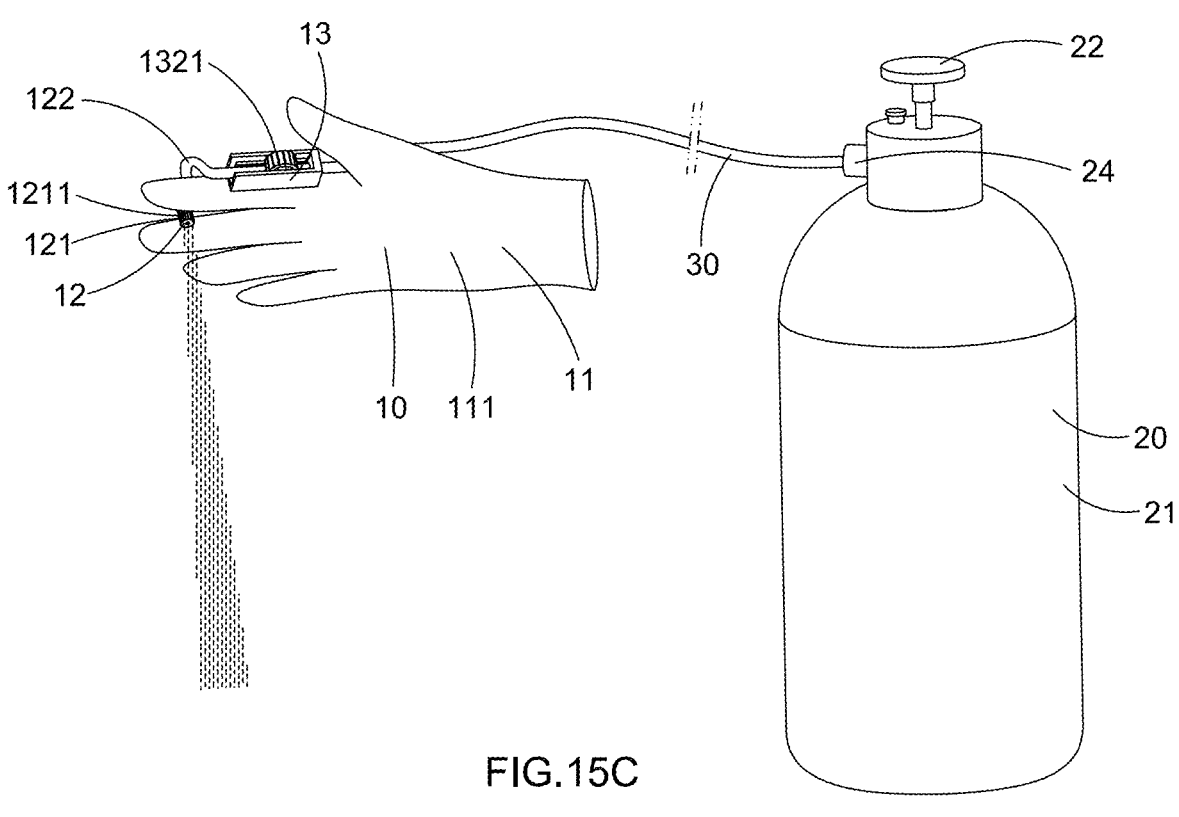
FIGS. 15C and 15D are respectively perspective views illustrating a nozzle of the spraying head of the hand-wearable paw washing device of the pet paw washing arrangement being rotated to adjust water ejection patterns according to the fourth alternative mode of the above first preferred embodiment of the present invention.
Figure 15D:
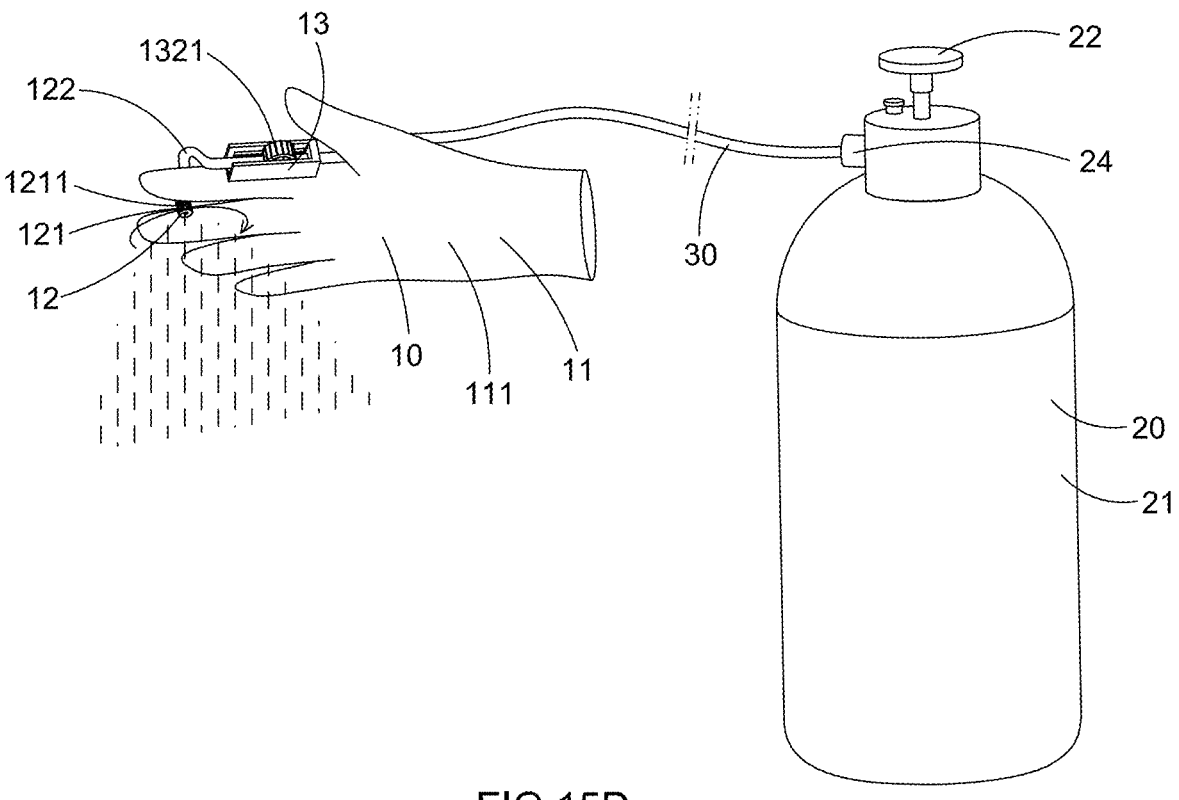

In this embodiment, a plurality of threads 12114 may be provided on the surface of the nozzle 1211 to facilitate the user to rotate the nozzle 1211 to adjust the volume of the inner cavity 12125. The structure of the spraying head 12 makes the water rotate at a high speed in a small cavity with an adjustable volume. When the inner cavity 12125 is relatively small, the rotational speed at the water outlet 1210 of the nozzle 1211 is high, the centrifugal force generated by the rotation of the water is greater than the surface tension of the water, and the water is sprayed a mist shape, as shown in the FIG. 15C. When the inner cavity 12125 is enlarged to a certain extent, and the eject speed of the water outlet 1210 is decreased, the water is sprayed out as a water column in a straight line, as shown in FIG. 15D. In other words, in this embodiment, the water outlet pressure and water outlet pattern from the water outlet 1210 can be adjusted by adjusting the rotational position of the nozzle 1211.

Figure 16:
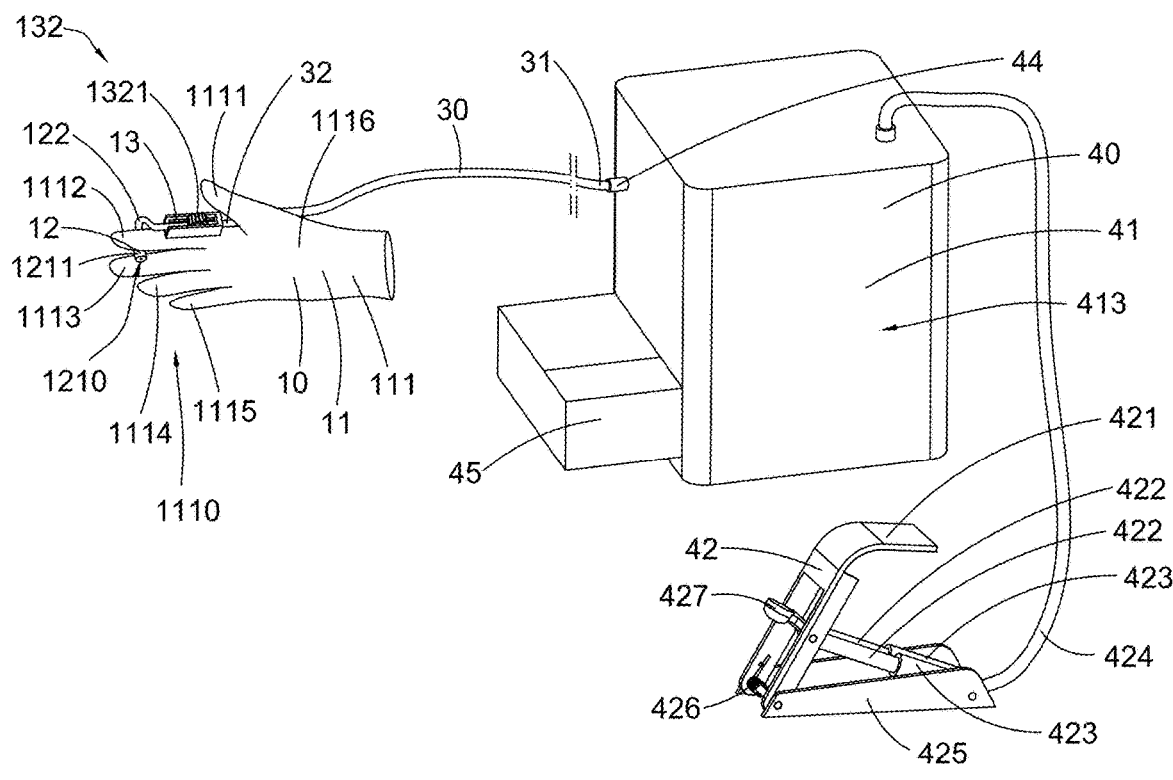
FIG. 16 is a perspective view of a pet paw washing arrangement according to a second preferred embodiment of the present invention.
Figure 17:
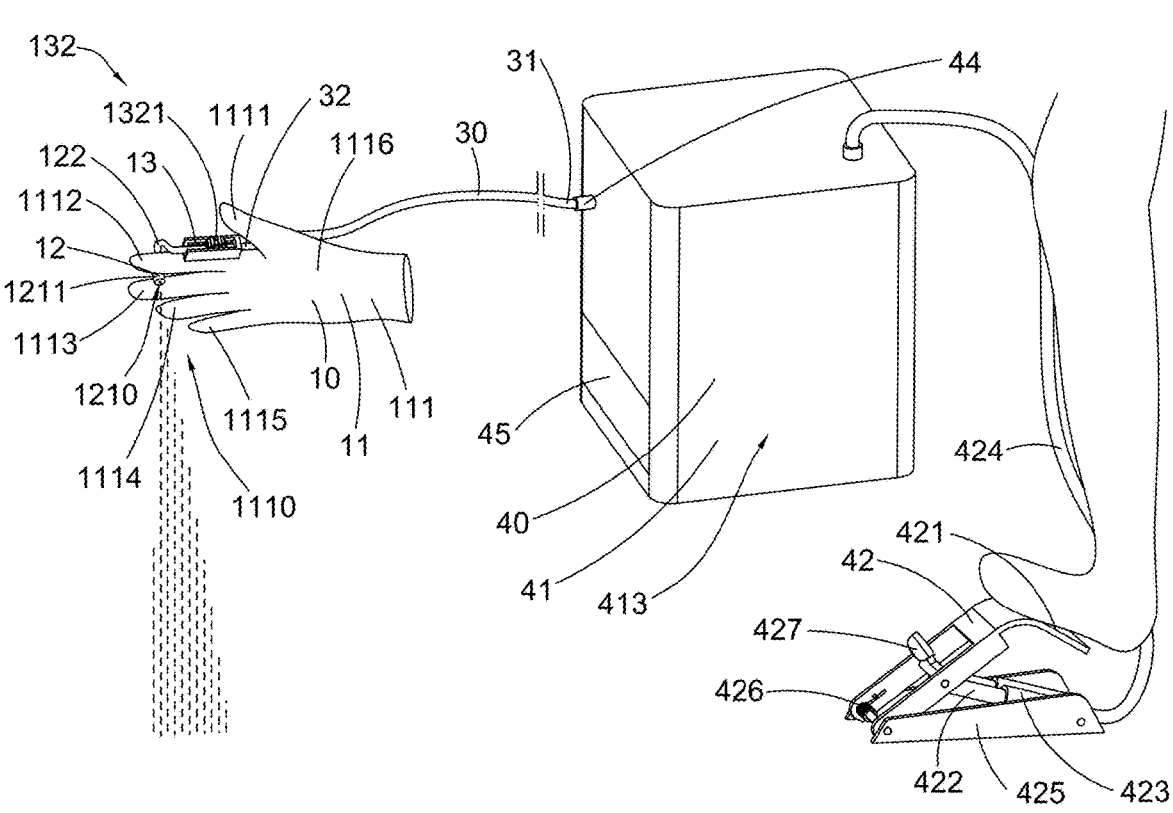
FIG. 17 is a perspective view illustrating a water storing container of the pet paw washing arrangement being an operation state according to the above second preferred embodiment of the present invention.

As shown in FIG. 16 and FIG. 17, a pet paw washing arrangement according to a second preferred embodiment of the present invention is illustrated. The pet paw washing arrangement comprises the above mentioned hand-wearable paw washing device 10, the above mentioned water supply pipeline 30 and a water storing container 40, wherein the hand-wearable paw washing device 10 10 is used to be worn on the user's hand, the water storing container 40 is used to store water or a cleaning solution formed by mixing cleaning agents and water, and water in the water storing container 40 can be supplied to the hand-wearable paw washing device 10 through the water supply pipeline 30, so that the user can rinse and clean the pet's paw through the hand-wearable paw washing device 10.

Similarly, the hand-wearable paw washing device 10 comprises the wearing body 11, the spraying head 12 and the switching assembly 13, the wearing body 11 in this embodiment comprises the glove 111 which is suitable for wearing on the user's hand, the spraying head 12 is connected to the wearing body 11 to eject out water for washing and washing the pet's paw, and the switch assembly 13 switches between on and off states to control the water ejecting operation of the spraying head 12.

In this embodiment, the water storing container 40 comprises a water storage tank 41, a foot pedaling pressurizing assembly 42 and a water delivering pipe 44. The water inlet end 31 at one end of the water supply pipeline 30 is connected to the water delivering pipe 44 of the water storing container 40, and the water outlet end 32 at the other end is connected to the water feeding pipeline 122 of the spraying head 12 of the hand-wearable paw washing device 10. The water storing tank 41 has a storing cavity 413 for storing water. The foot pedaling pressurizing assembly 42 can be used to increase the air pressure in the storing cavity 413 when the user's foot is stepped on the foot pedaling pressurizing assembly 42.

In other words, in this embodiment of the present invention, the user can increase the air pressure in the storing cavity 413 by stepping on it with his or her foot. More specifically, as an example, the foot pedaling pressurizing assembly 42 comprises a foot pedal 421, one or more piston assemblies 422, one or more cylinders 423, an intake pipe 424, a bracket 425, a reset assembly 426 and an air pressure gauge 427. The foot pedal 421 is pivotally connected to the bracket 425 and can be automatically reset under the action of the reset assembly 426 such as a torsion spring. When the foot pedal 421 is stepped on by the foot of the user, each piston assembly 422 is driven to slide in the corresponding cylinder 423, thereby pumping air into the intake pipe 424, so that air enters the water storing tank 41 from the intake pipe 424, and thus the air pressure in the storing cavity 413 of the water storage tank 41 is increased. The air pressure gauge 427 is used to detect the air pressure in the air intake pipe 424, so that when the air pressure in the air intake pipe 424 reaches a predetermined pressure value, the operation of filling air into the water storage tank 41 through the foot pedaling pressurizing assembly 42 is stopped.

In addition, as shown in FIG. 16, the water storing container 40 may further comprises a water basin 45 detachably arranged in the water storing tank 41, so that the water in the water storing tank 41 can be poured into the water basin 45, and the pet can drink the water in the water basin 45.

Correspondingly, in this embodiment of the present invention, the following steps may be included in the washing and cleaning method for cleaning the pet's paw by using the pet paw washing arrangement.

In the pressurizing step of the water storing container 40, the switch assembly 13 of the hand-wearable paw washing device 10 is kept in a closed state, and the air pressure in the water storing container 40 is increased by operating on the foot pedaling pressurizing assembly 42 by a foot of the user, as shown in FIG. 17.

In the washing and cleaning step of the pet's paw, the user holds one paw of the pet with the wearing hand on which the hand-wearable paw washing device 10 is worn, the user can hold the pet with one free hand, and use the the thumb of the wearer's hand to operate the control wheel 1321 of the switch device 13 of the hand-wearable paw washing device 10 to switch the switch assembly 13 from the off state to the on state. After the pressurization step, the water is in the water storing container 40 is automatically feed to the spraying head 12 of the hand-wearable paw washing device 10 through the water supply pipeline 30 to rinse the pet's paw, and the pressure of the water flow ejected from the water outlet 1210 of the nozzle 1211 of the spraying head 12 can be adjusted. And when the pressure of the water flow ejected from the water outlet 1210 is insufficient, the user can continue to step on the foot pedal 421 of the pressurizing device 42 with his or her foot, so as to regain a relative high pressure in the water storing tank 41 of the water storing container 40, so that the water in the water storing tank 41 is continuously delivered to the nozzle 1211 of the spraying head 12 through the water supply pipeline 30.

Figure 18A:
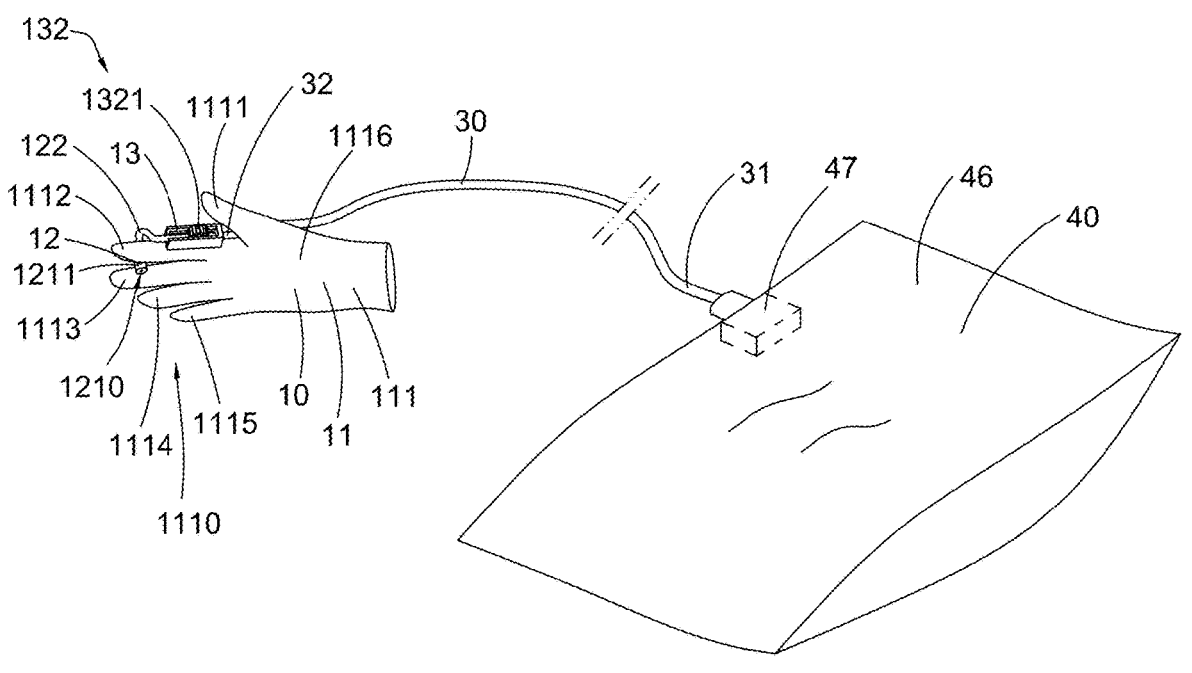
FIG. 18A is a perspective view of a pet paw washing arrangement according to a third preferred embodiment of the present invention.

As shown in FIG. 18A, a pet paw washing arrangement according to a third preferred embodiment of the present invention is illustrated. The pet paw washing arrangement comprises the above mentioned hand-wearable paw washing device 10, the above-mentioned water supply pipeline 30 and a water storing container 40. In this embodiment, the water storing container 40 comprises a flexible water storing bag 46. The water supply pipeline 30 is connected to the water storing bag 46 and the hand-wearable paw washing device 10. The flexible water storing bag 46 is suitable for being stepped on by the user's foot to cause a deformation of the flexible water storing bag 46, so that the water in the water storing bag 46 is delivered to the spraying head 12 of the hand-wearable paw washing device 10 through the water supply pipeline 30, so that water can be ejected from the water outlet 1210 of the nozzle 1211 for the user to clean the pet's paw. According to this preferred embodiment, the water storing container 40 may further comprise a water pump 47 for automatically supplying water in the flexible water storing bag 46 to the nozzle 1211 when the water pump 47 is switched on.

Figure 18B:
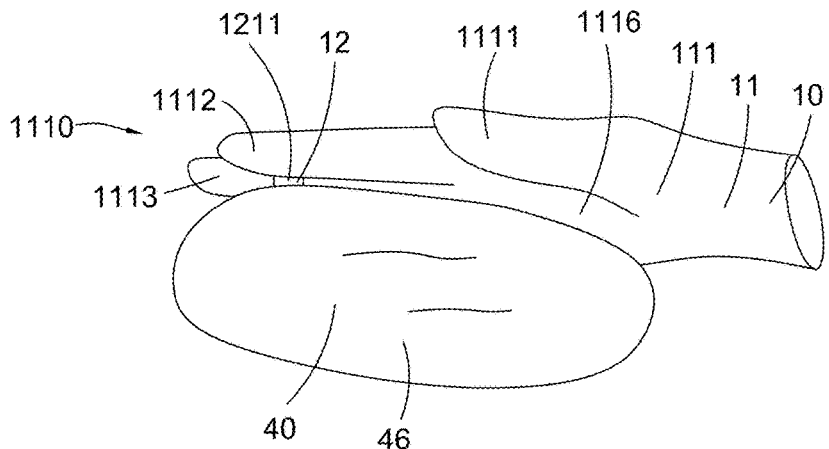
FIG. 18B is a perspective view of a pet paw washing arrangement according to an alternative mode of the above third preferred embodiment of the present invention

As shown in FIG. 18B, a pet paw washing arrangement according to an alternative mode of the above third preferred embodiment of the present invention is illustrated. The pet paw washing arrangement comprises the above mentioned hand-wearable paw washing device 10, and a water storing container 40. In this embodiment, the water storing container 40 comprises a flexible water storing bag 46 which is connected to the spraying head 12 of the hand-wearable paw washing device 10 and can be pressed by a wearing hand of the user which is wearing the hand-wearable paw washing device 10, so that the water in the water storing bag 46 is delivered to the spraying head 12 of the hand-wearable paw washing device 10, so that water can be ejected from the water outlet 1210 of the nozzle 1211 for the user to clean the pet's paw.

Figure 19:
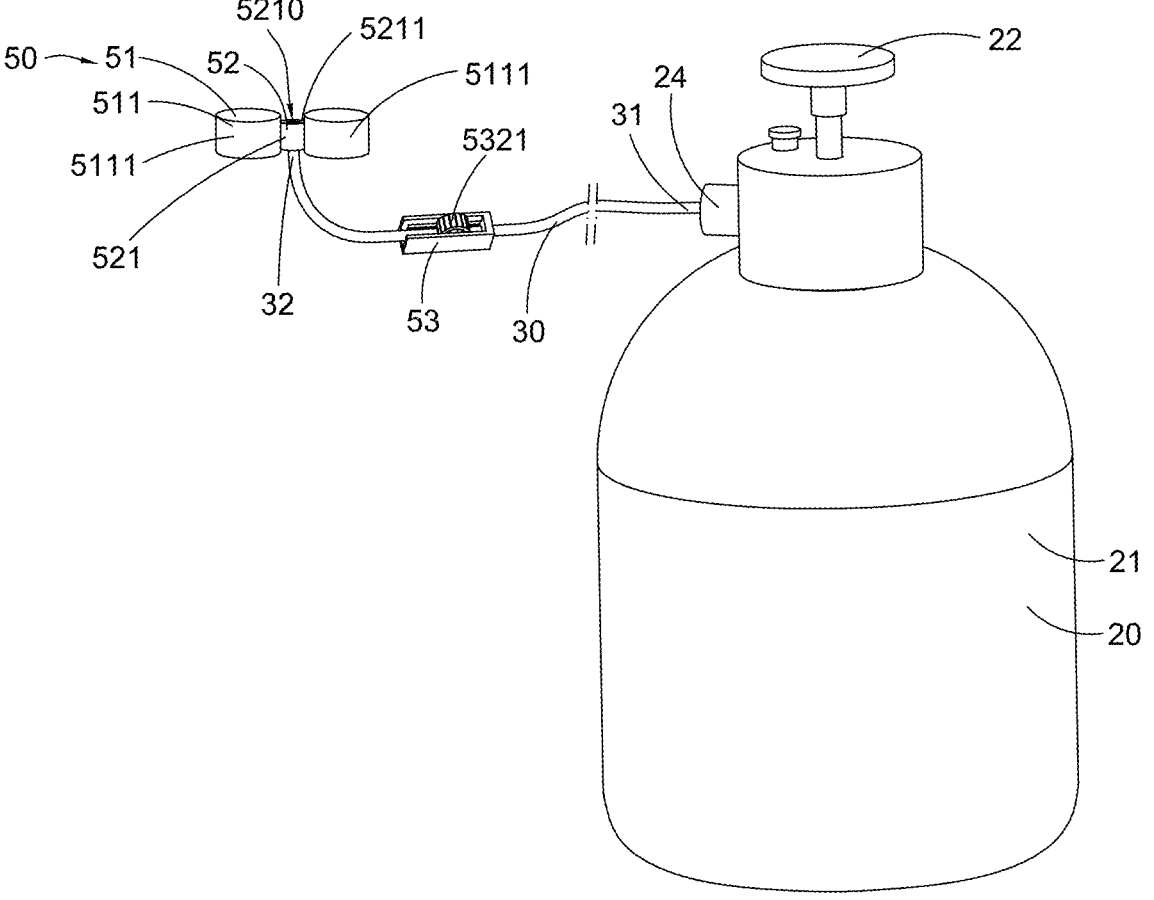
FIG. 19 is a perspective view of a pet paw washing arrangement according to a fourth preferred embodiment of the present invention.
Figures 20, 21:
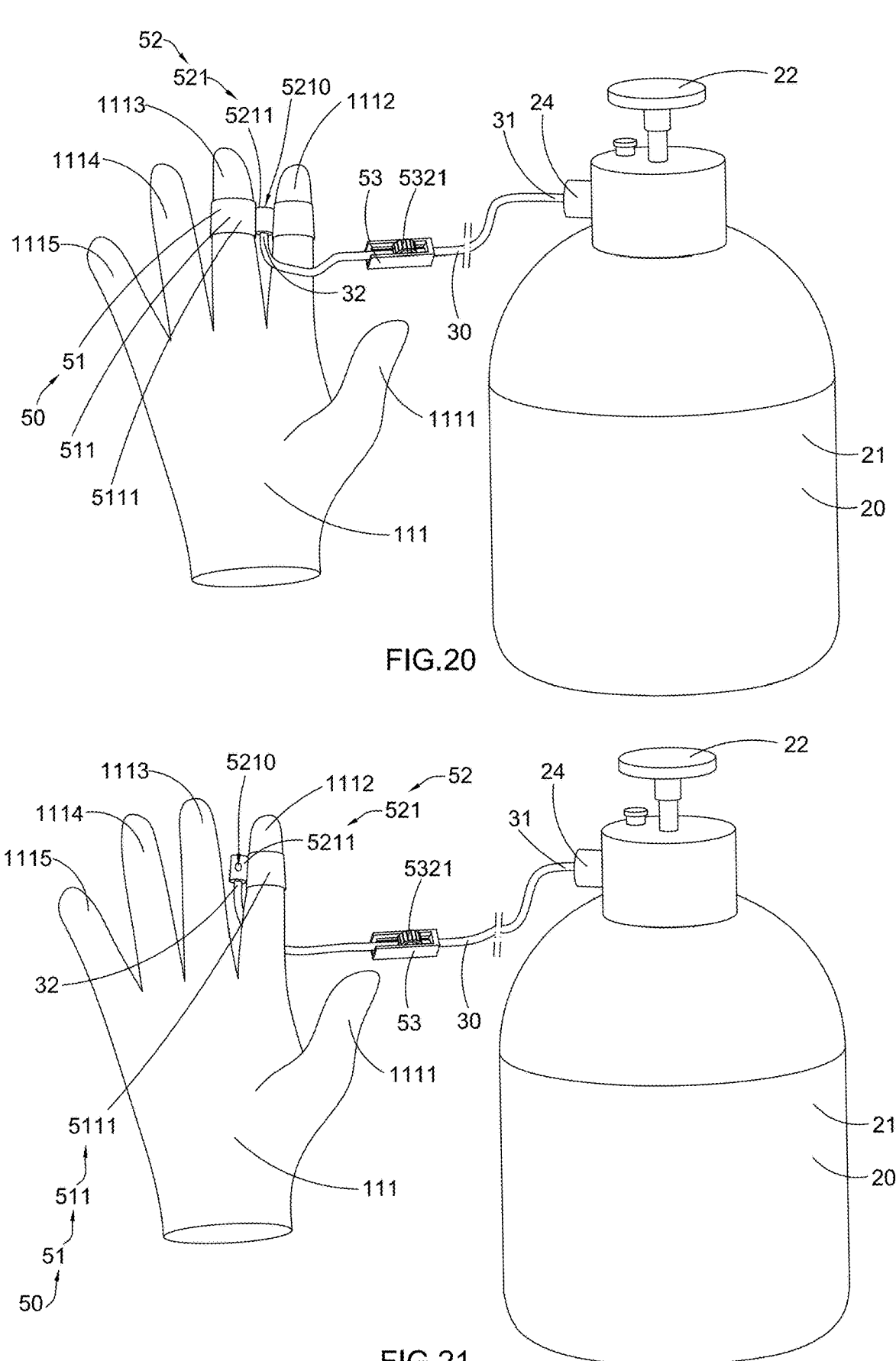
FIG. 20 is a perspective view illustrating a hand-wearable paw washing device of the pet paw washing arrangement being worn on a glove according to the above fourth preferred embodiment of the present invention.
FIG. 21 is a perspective view of a pet paw washing arrangement according to a first alternative mode of the above fourth preferred embodiment of the present invention.

As shown in FIGS. 19 to 20, a pet paw washing arrangement according to a fourth preferred embodiment of the present invention is illustrated, the pet paw washing arrangement comprise a hand-wearable paw washing device 50, the above-mentioned water supply pipeline 30 and the above mentioned water storing container 20. The hand-wearable paw washing device 50 is used to be worn on the user's hand, the water storing container 20 is used to store water or a cleaning solution formed by mixing cleaning agents and water, and the water storing container 20 is used for feeding water to the hand-wearable paw washing device 50 through the water supply pipeline 30, so that the user can use the hand-wearable paw washing device 50 to clean the pet's paw The hand-wearable paw washing device 50 comprises a wearing body 51, a washing head 52 and a switch assembly 53, the wearing body 51 in this embodiment comprises one or more ring-shaped wearing elements 511. In this embodiment, the ring-shaped wearing elements can be implemented as two finger rings 5111, which are suitable to be worn on two fingers of the user, and the spraying head 52, similar in structure to the above-mentioned spraying head 12, is connected to the finger rings 5111 and can be located between the finger rings 5111 for ejecting water for washing and washing the pet's paw. The switch assembly 53, which is similar in structure to the above mentioned switch assembly 13, is arranged on the water supply pipeline 30. By operating the control wheel 5321 of the switch assembly 53, the switch assembly 53 can be switched between on and off states to control the water ejection operation of the spraying head 52.

Preferably, the two finger rings 5111 can be worn on the user's index finger and middle finger, and the switch assembly 53 is located between the user's thumb and index finger, so as to facilitate the user to operate the control wheel 5321 of the switch assembly 53 through the thumb.

In this embodiment, the spraying head 52 comprises a nozzle assembly 521 which comprises a nozzle 5211 connected to the water supply pipeline 30. The nozzle assembly 521 of the spraying head 52 may not have the connecting head 1212, the finger rings 5111 and the nozzle 5211 are assembled together in such a way that when the two finger rings 5111 are worn on the user's index finger and middle finger, the nozzle 5211 can be positioned between the user's index finger and middle finger to eject water forward along the length of fingers of the user. In other words, the two finger rings 5111 can be worn on the user's fingers along the length direction of the fingers. At this time, the nozzle 5211 connected to the finger rings 5111 can be extended in a direction parallel to the fingers, and the water outlet 5210 of the nozzle 5211 can eject water in a direction parallel to the fingers.

As shown in FIG. 20, the wearing body 51 is also used to attach the hand-wearable paw washing device 50 to a glove 111. In other words, the finger rings 5111 can be assembled to the glove 111. For example, the two finger rings 5111 are respectively sleeved on the index finger wearing portion 1112 and the middle finger wearing portion 1113 of the glove 111.

As shown in FIG. 21, a pet paw washing arrangement according to a first alternative mode of the above mentioned fourth preferred embodiment of the present invention is illustrated to comprise a hand-wearable paw washing device 50, the above-mentioned water supply pipeline 30 and the above mentioned water storing container 20. The hand-wearable paw washing device 50 is used to be worn on the user's hand, and the water storing container 20 is used to store water or a cleaning solution formed by mixing cleaning agents and water. The water storing container 20 delivers water to the hand-wearable paw washing device 50 via the water supply pipeline 30, so that the user can rinse and wash the pet's paw through the hand-wearable paw washing device 50.

The hand-wearable paw washing device 50 comprise the wearing body 51, the spraying head 52 and the switch assembly 53. The wearing body 51 in this embodiment function as an add-on structure that can be attached to a glove 111. For example, the wearing body 51 comprises a ring-shaped wearing element 511, which is a finger ring 5111, which is suitable for being worn the glove 111. In this embodiment the glove 111 is embodied as an independent component which can be a variety of traditional gloves with waterproof properties and can be prepared by the user. The spraying head 52, similar in structure to the above mentioned spraying head 12, is connected to the finger ring 5111 to eject out water for washing and cleaning the pet's paw.

The switch assembly 53 is similar in structure to the above mentioned switch assembly 13 and is able to switch between on and off states to control the water ejection operation of the spraying head 52.

When in use, one wearing hand of the user can wear one glove 111, and then the hand-wearable paw washing device 50 is assembled on the glove 111 through the wearing body 51, such as the finger ring 511. For example, it can be worn on the index finger wearing portion 1112 of the glove 111, and the switch assembly 53 is located between the thumb wearing portion 1111 and the index finger wearing part 1112, so that it is convenient for the user to use the thumb received in the thumb wearing portion 1111 to operate the control wheel 5321 of the switch assembly 53.

In addition, in the example shown in FIG. 21, the finger ring 5111 is implemented as an integral annular part, in a possible alternative mode, the wearing body 51 can also be implemented as a clamping device, for example, two semi-ring members can form a ring member and can be clamped on the user's finger or on the finger wearing portion 1110 of the glove 111.

Figure 22:
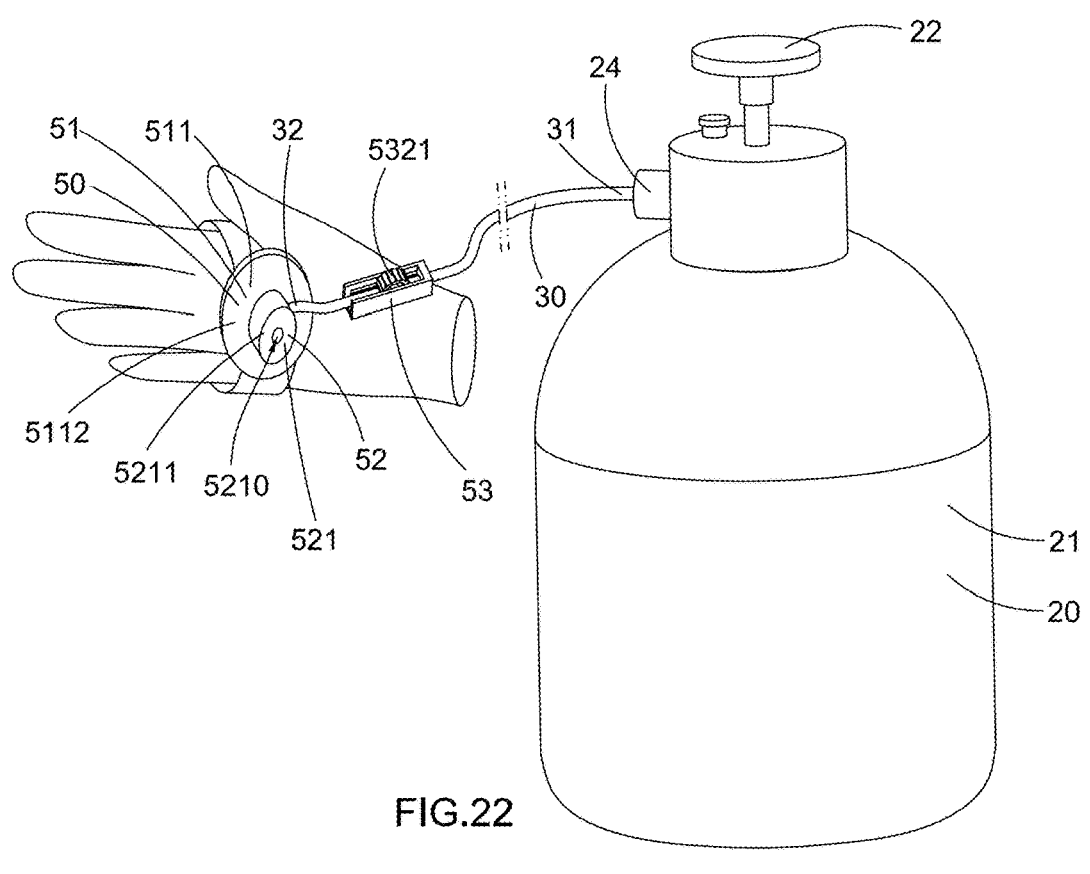
FIG. 22 is a perspective view of a pet paw washing arrangement according to a second alternative mode of the above fourth preferred embodiment of the present invention.

As shown in FIG. 22, a pet paw washing arrangement according to a second alternative mode of the above mentioned fourth preferred embodiment of the present invention is illustrated to comprises a hand-wearable paw washing device 50, the above-mentioned water supply pipeline 30 and the above mentioned water storing container 20. In this embodiment, the hand-wearable paw washing device 50 comprises the wearing body 51, the spraying head 52 and the switch assembly 53, and the wearing body 51 in this embodiment is implemented to comprises a ring-shaped element 511 which can be an annular hand band 5112 that can be worn directly on the user's hand, or can be used as an attachment for attaching the hand-wearable paw washing device 50 to a glove 111 on the palm body wearing portion 1116 of the glove 111. The annular hand band 5112 can be connected to the switch assembly 53 or the spraying head 52. As an example, the annular hand band 5112 can be connected to the nozzle 5211 of the spraying head 52.

Figure 23:
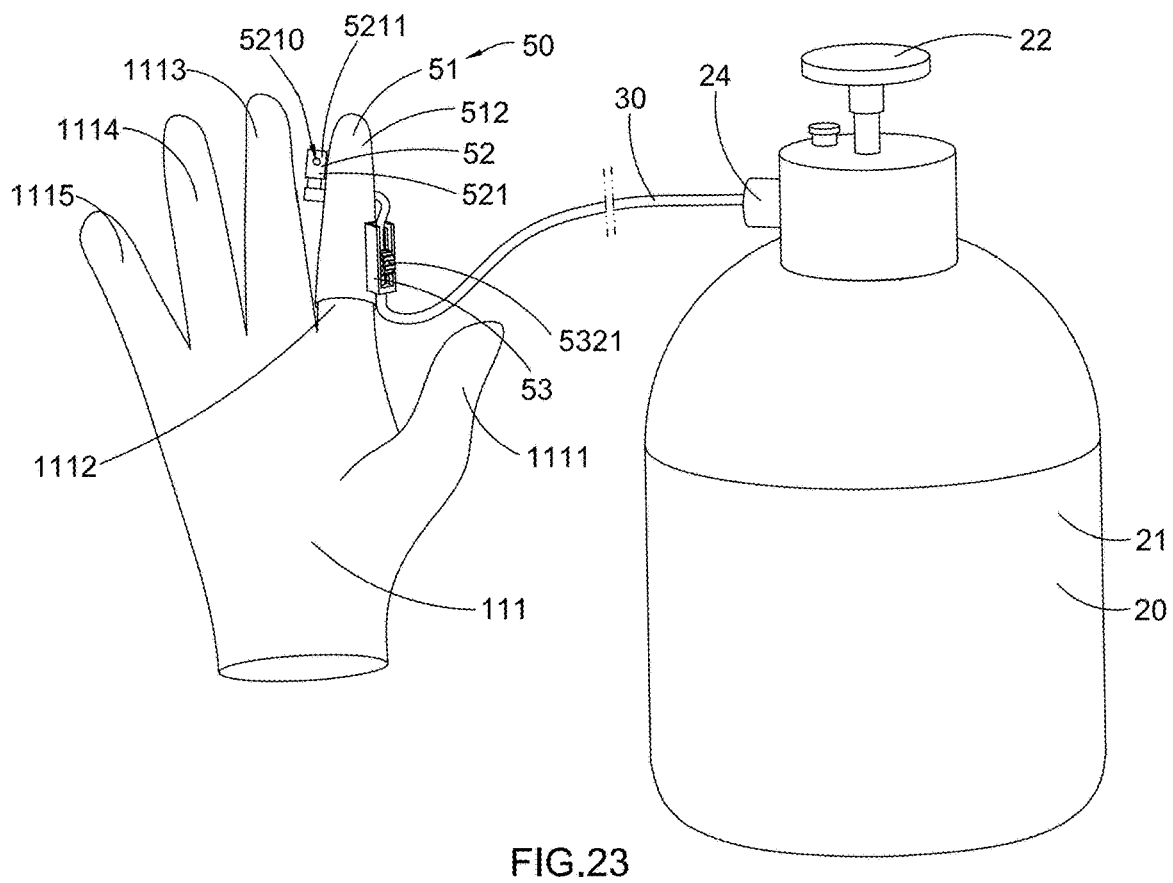
FIG. 23 is a perspective view of a pet paw washing arrangement according to a third alternative mode of the above fourth preferred embodiment of the present invention.

As shown in FIG. 23, a pet paw washing arrangement according to a third alternative mode of the fourth preferred embodiment of the present invention is illustrated to comprise a hand-wearable paw washing device 50, the above mentioned water supply pipeline 30 and the above mentioned water storing container 20. In this embodiment, the hand wearable paw washing device 50 comprises the wearing body 51, the spraying head 52 and the switch assembly 53, and the wearing body 51 in this embodiment is implemented as a cap wearing element 512 that can be worn on one or more of the user's fingers, either directly on the user's finger, or as an attachment for attaching the hand-wearable paw washing device 50 to a glove 111, for example the cap wearing element 512 can be worn on the index finger wearing portion 1112 of the glove 111, so that the switch assembly 53 connected to the cap wearing element 512 located between the thumb wearing portion 1111 and the index finger wearing portion 1112 of the glove 111 to facilitate the user's control operation.

Referring to FIGS. 24 to 30 of the drawings, a pet pet paw washing arrangement according to a fifth preferred embodiment of the present invention is illustrated to comprises a paw washing device 810 and a water storage container 820, wherein the water storage container 820 is used to supply water to the paw washing device 810, so that the user can use the paw washing device 810 to wash the pet paw.

Figure 24:
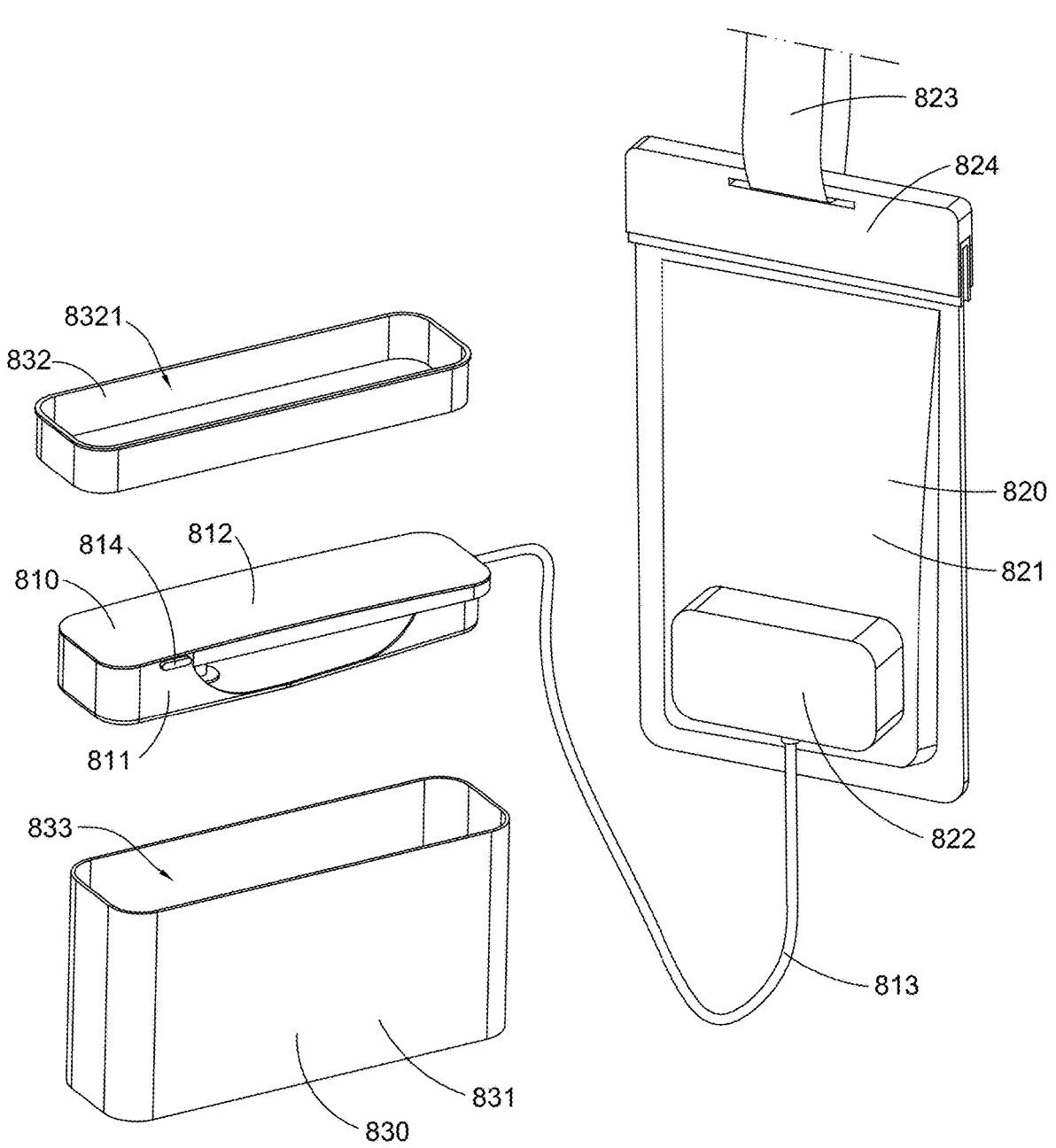
FIG. 24 is a perspective view of a pet paw washing arrangement according to a fifth preferred embodiment of the present invention.
Figure 25:
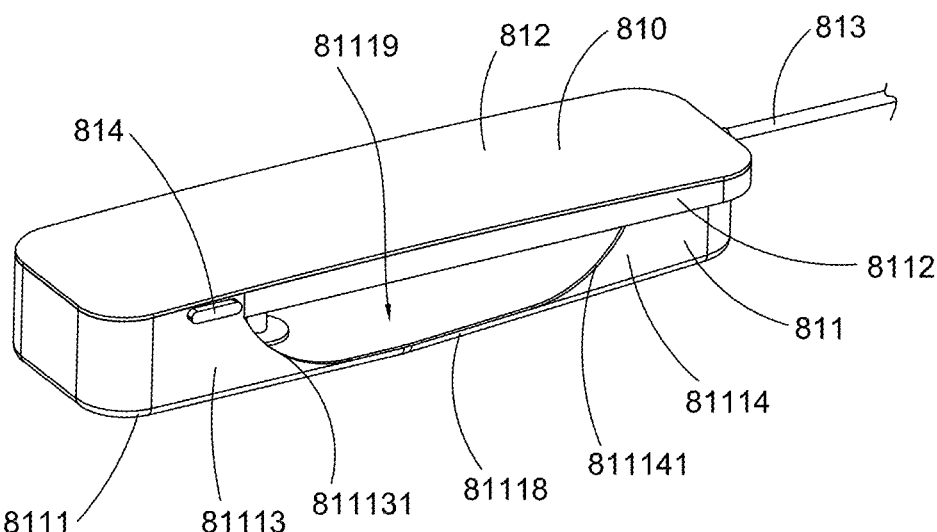
FIG. 25 is a perspective view of a paw washing device of the pet paw washing arrangement according to the above fifth preferred embodiment of the present invention.

The water storage container 820, which is a container capable of storing water, can be made of a hard material such as plastic or metal, or mainly a flexible water bag made of flexible material. In this embodiment, as shown in FIG. 24, the water storage container 820 is implemented as a flexible water bag for easy storage and transportation. It can be understood that the water stored in the water storage container 820 can be clean pure water or water with added cleaning agent.

The paw washing device 810 comprises a water spraying assembly 811, a holding element 812 for a user to hold thereon, and a water feeding pipeline 813. The water feeding pipeline 813 is connected to the water storage container 820, so that water in the water storage container 820 can be supplied to the water spraying assembly 811 through the water feeding pipeline 813 to wash the pet paw. The water spraying assembly 811 is installed on the holding element 812 which can be embodied as a panel, and the holding element 812 is made of a relatively hard material, so as to make it convenient for the user to hold and use the paw washing device 810 by hand. The water feeding pipeline 813 can be connected and communicated with the water spraying assembly 811 to supply water to the water spraying assembly 811. It is understood that in another alternative mode, the paw washing device 810 may not be equipped with the protective holding element 812.

In this embodiment, the water spraying assembly 811 comprises a paw washing head 8111 and a base 8112. The paw washing head 8111 is connected to the base 8112 and has a water outlet surface 81110 with one or more water outlets 81111. Water can be sprayed out from the water outlets 81111 to wash and rinse the pet paw.

The base 8112 is used to connect and install the water feeding pipeline 813. More specifically, an end of the water feeding pipeline 813 is installed to the base 8112. The base 8112 forms a water supply channel inside, and the water supply channel is communicated to the paw washing head 8111 of the water spraying assembly 811, so that the water feeding pipeline 813 can be directly installed and connected to the base 8112. Alternatively, the water feeding pipeline 813 can be extended into the base 8112, and within the base 8112, the end of the water feeding pipeline 813 is connected and communicated to the paw washing head 8111 of the water spraying assembly 811. It can be understood that the base 8112 is used to connect and install the water feeding pipeline 813, so that the base 8112 can position and fix the water feeding pipeline 813, so as to prevent unnecessary shaking and entanglement of the water feeding pipeline 813 after the water feeding pipeline 813 is pumped in with water, and prevent adversely affect to the use, and make the entire paw washing device more concise and beautiful.

Figure 26:
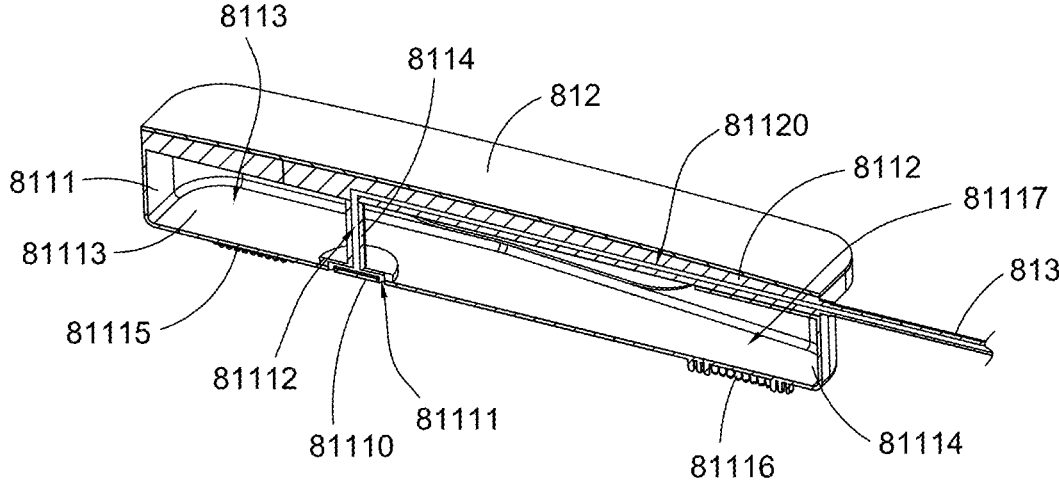
FIG. 26 is a sectional view of the paw washing device of the pet paw washing arrangement according to the above fifth preferred embodiment of the present invention.

In this embodiment illustrated in FIG. 26, the base 8112 can internally form a water supply channel 81120, and an end of the water feeding pipeline 813 is connected to the base 8112. The paw washing head 8111 and the holding element 812 are respectively connected to the opposite sides of the base 8112. The paw washing head 8111 internally forms a water inlet channel 81112 which is communicated to the water supply channel 81120, and the water outlet 81111 is communicated to the water inlet channel 81112. In this way, water from the water storage container 820 enters the water supply channel 81120 through the water feeding pipeline 813 and reaches the water outlet 81111 through the water inlet channel 81112 of the paw washing head 8111. For example, in the embodiment illustrated in FIG. 26, a water guiding component 8114, which is formed between the base 8112 and the paw washing head 8111, internally forms the water inlet channel 81112 and guides the water to reach the water outlet 81111.

Figure 27:
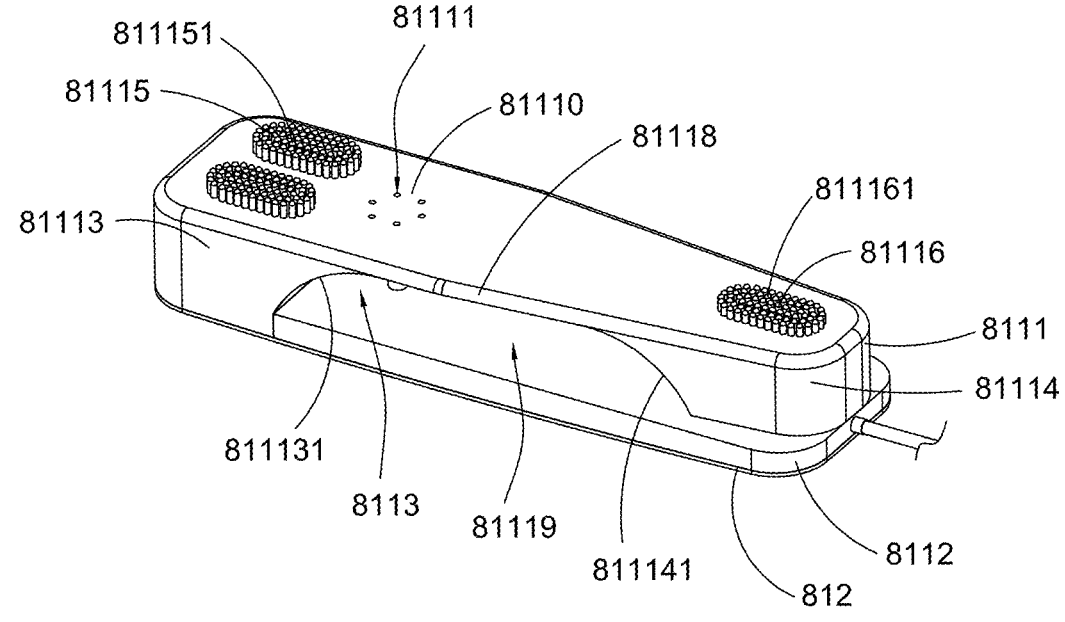
FIG. 27 is another perspective view of the paw washing device of the pet paw washing arrangement according to the above fifth preferred embodiment of the present invention, illustrating its water outlet surface.
Figure 28:
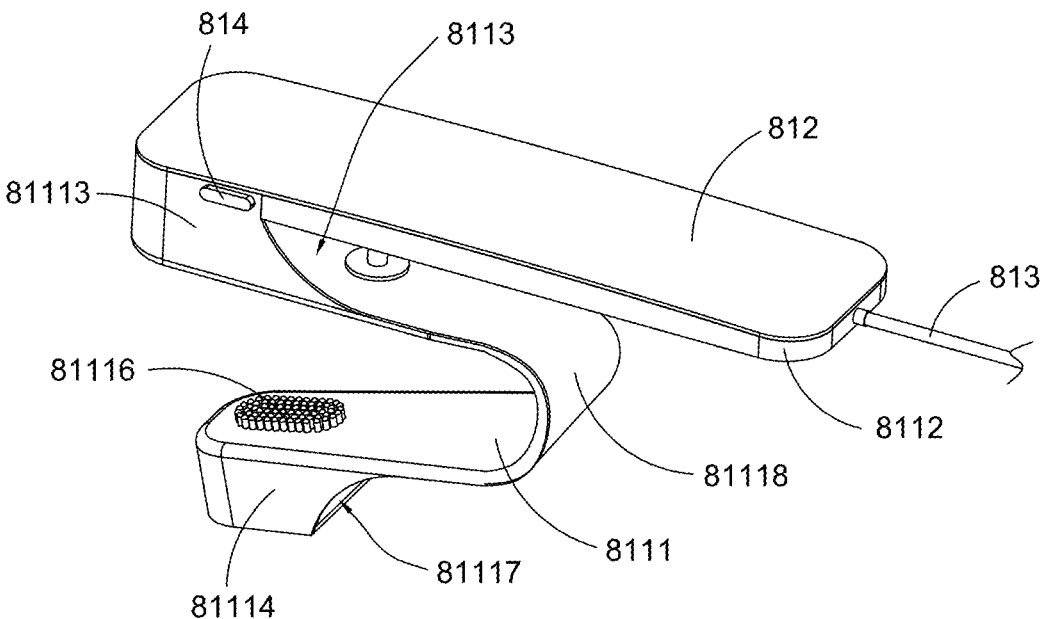
FIG. 28 is another perspective view of the paw washing device of the pet paw washing arrangement according to the above fifth preferred embodiment of the present invention, illustrating that its end portion is bendable.
Figure 29:
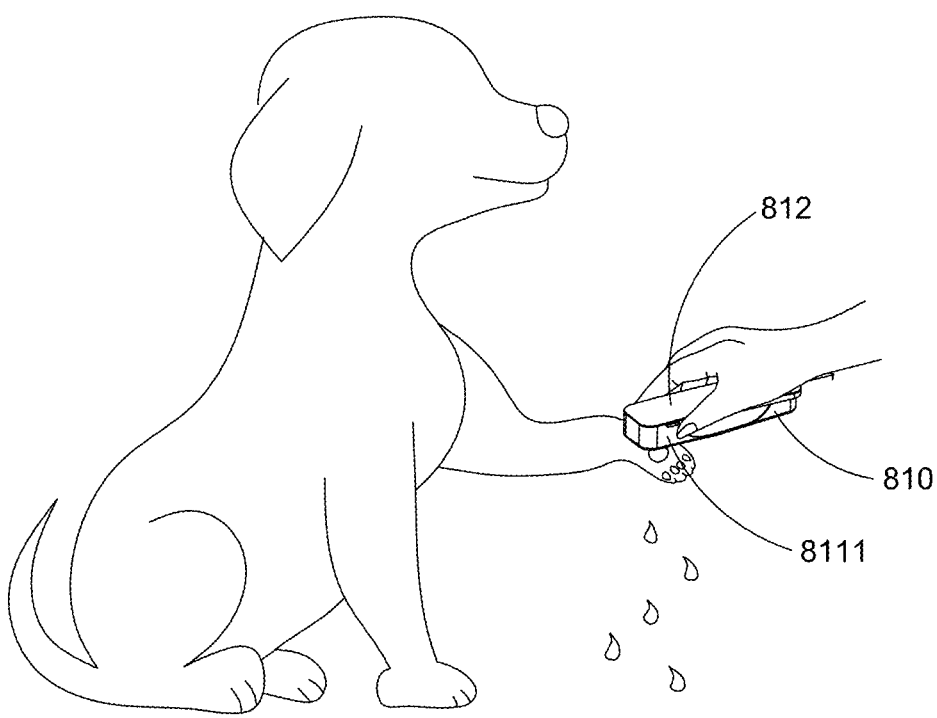
FIG. 29 is a schematic view illustrating a handheld usage scenario of the paw washing device of the pet paw washing arrangement according to the above fifth preferred embodiment of the present invention.
Figure 30:
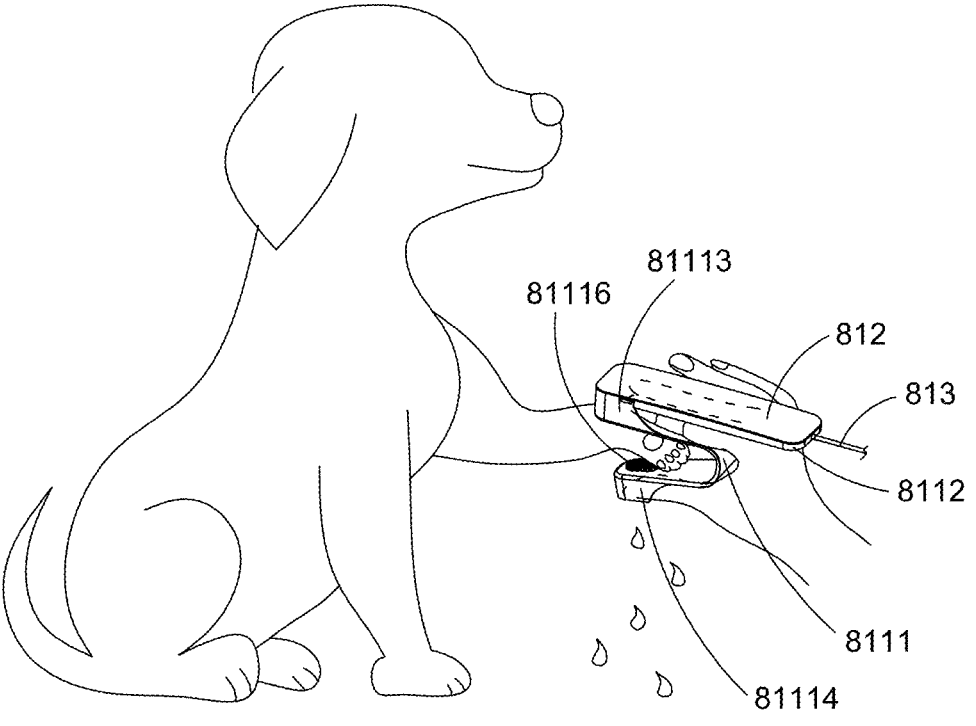
FIG. 30 is a schematic view illustrating a finger-wearing usage scenario of the paw washing device of the pet paw washing arrangement according to the above fifth preferred embodiment of the present invention.
Figure 31:
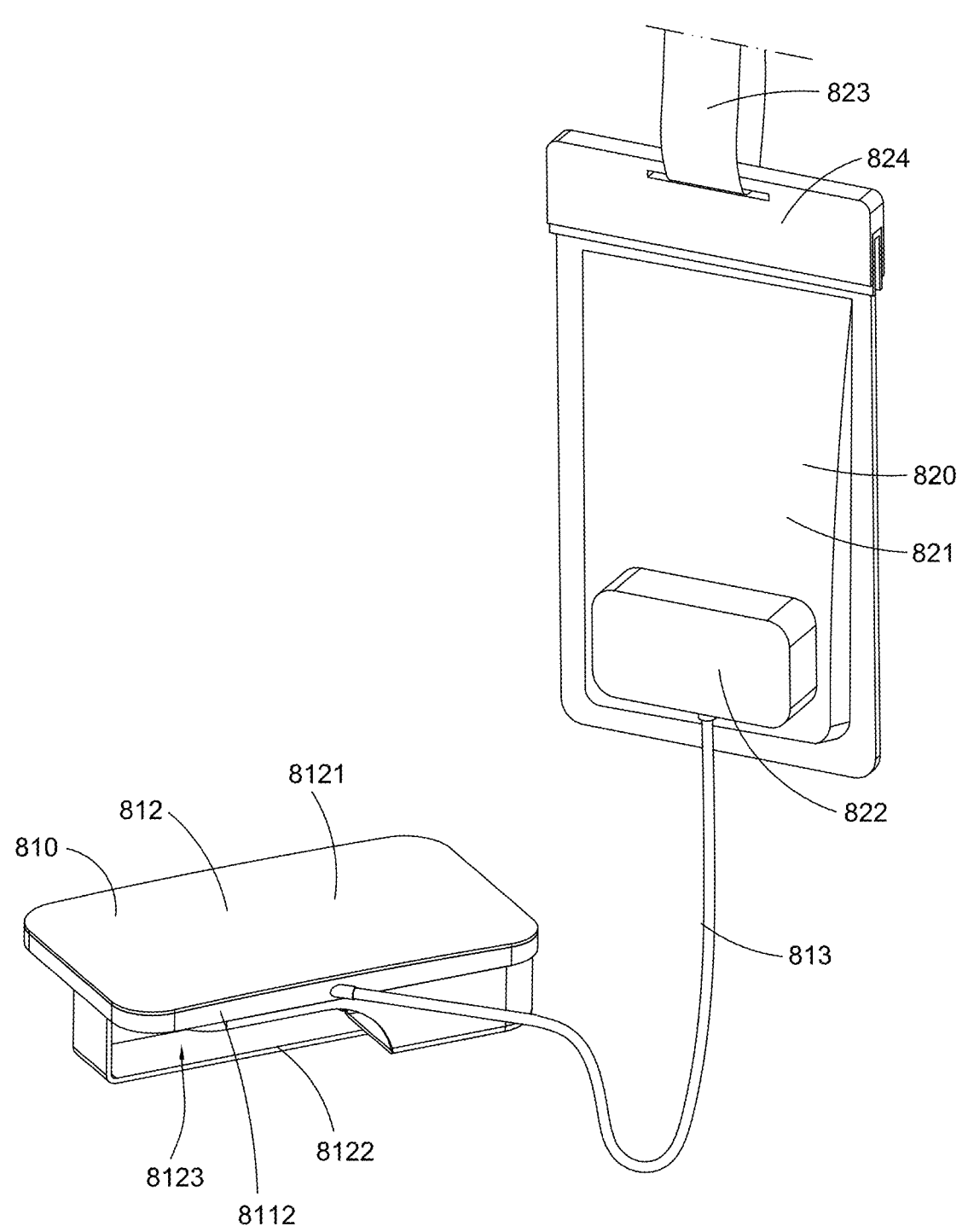
FIG. 31 is a perspective view of the pet paw washing arrangement according to an alternative mode of the above fifth preferred embodiment of the present invention.
Figure 32:
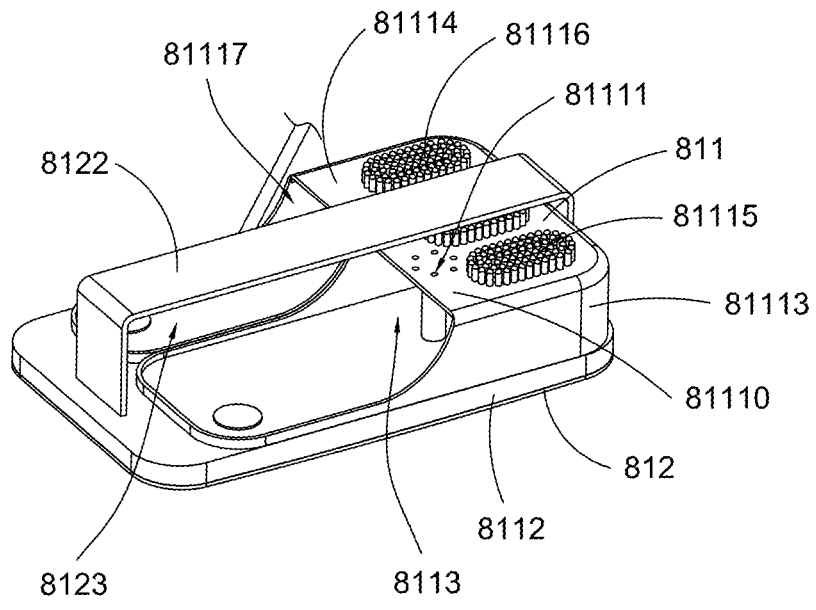
FIG. 32 is a perspective view of the paw washing device of the pet paw washing arrangement according to the above alternative mode of the above fifth preferred embodiment of the present invention, illustrating its water outlet surface.
Figure 33:
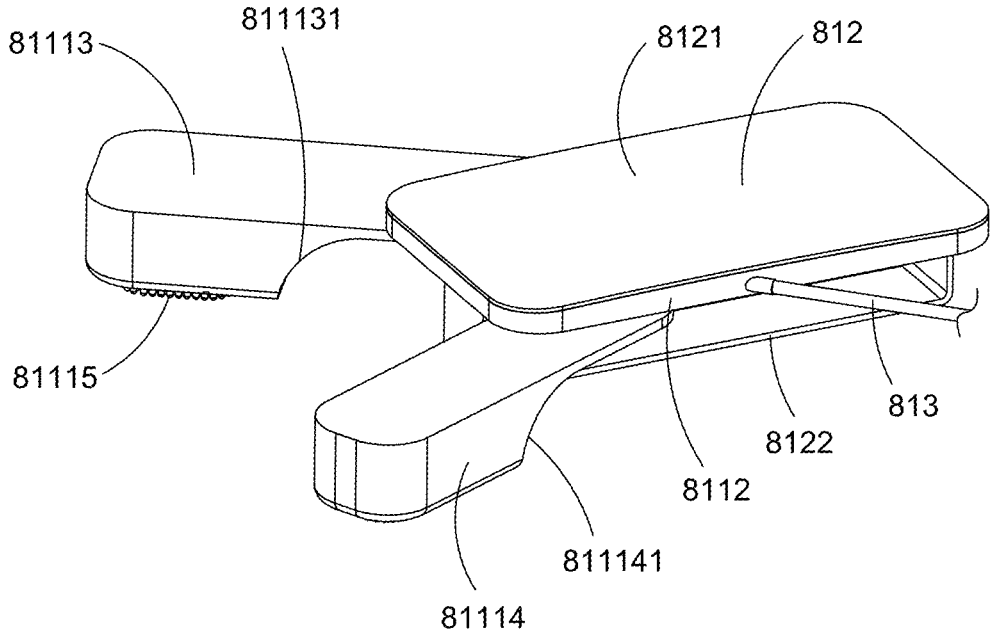
FIG. 33 is a perspective view of the paw washing device of the pet paw washing arrangement according to the above alternative mode of the above fifth preferred embodiment of the present invention when it is in use.
Figure 34:
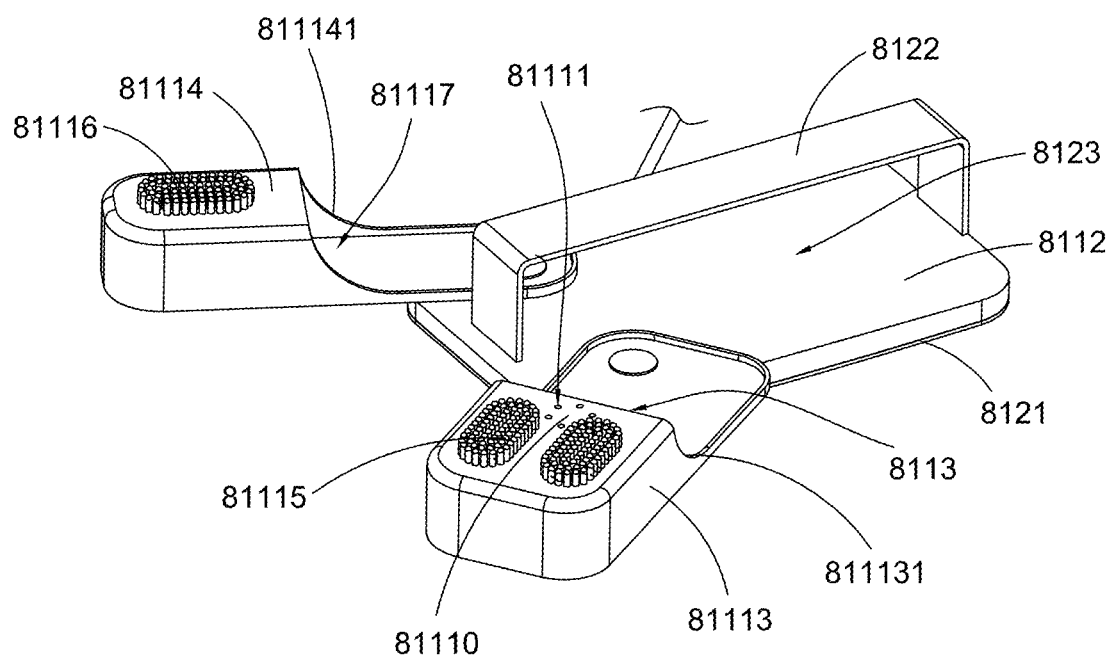
FIG. 34 is a perspective view of the paw washing device of the pet paw washing arrangement being in a use state according to the above alternative mode of the fifth preferred embodiment of the present invention.

As shown in FIGS. 27 and 28, a wearing chamber 8113 is formed between the paw washing head 8111 and the base 8112. At least one finger of the user is suitable for extending into the wearing chamber 8113, thereby wearing the paw washing head 8111 on the user's finger. As shown in FIG. 30, two fingers of the user, such as the index finger and middle finger, can be inserted into the wearing chamber 8113 to wear the paw washing head 8111 on the user's index finger and middle finger. In addition, the water guiding component 8114 is made of flexible material, and when the user's index finger and middle finger are extended into the wearing chamber 8113, the water guiding component 8114 is located between the user's index finger and middle finger and can be pressed by the user to adjust the water pressure.

As shown in FIGS. 25 to 28, the paw washing head 8111 comprises a first end portion 81113 and a second end portion 81114. The wearing chamber 8113 is formed between the first end portion 81113 of the paw washing head 8111 and the base 8112, and the first end portion 81113 has a plurality of water outlets 81111 arranged in a circular direction, such as six water outlets 81111. The first end portion 81113 is also provided with a first brush 81115 protruded from its outer side surface, and the second end portion 81114 is provided with a second brush 81116 protruded from its outer side surface. The second end portion 81114 forms a wearing cavity 81117 facing the base 8112, so that the second end portion 81114 can form a finger sleeve.

The second end portion 81114 of the paw washing head 8111 is fitted to the base 8112 or removably connected to the base 8112, such as by being bonded to the base 8112 with a weak adhesive layer. Therefore, when the water spraying assembly 811 is used in a handheld manner, the second end portion 81114 of the paw washing head 8111 can be detachably connected to the base 8112, allowing the user to hold the holding element 812 and position the water outlet 81111 of the first end portion 81113 of the paw washing head 8111 towards the pet paw for cleaning. When the paw washing device 810 is used in a finger-wearing manner, the user can detach the second end portion 81114 of the paw washing head 8111 from the base 8112, and then insert multiple fingers into the wearing chamber 8113 and the wearing cavity 81117, thereby wearing the paw washing head 8111 on multiple fingers. For example, the wearing chamber 8113 of the first end portion 81113 of the paw washing head 8111 is inserted with the user's index and middle fingers, while the wearing cavity 81117 of the second end portion 81114 of the paw washing head 8111 is inserted with the user's thumb, thus allowing the paw washing head 8111 to be worn on the user's three fingers.

To facilitate the user's fingers to reach into the paw washing head 8111, a connecting portion 81118, which is formed between the first end portion 81113 and the second end portion 81114 of the paw washing head 8111, is spaced apart from the base 8112, thereby forming an opening 81119 on each side to facilitate the user's finger operation. When the user wears the paw washing head 8111 on multiple fingers, the user's other fingers can be extended out from the opening 81119, and the first end portion 81113 has an inner edge 811131, and the second end portion 81114 has an inner edge 811141, and the inner edges 811131 and 811141 can be clamped between the roots of the user's adjacent fingers, thereby facilitating the user to securely position and grip the paw washing head 8111.

It can be understood that the paw washing head 8111 is made of a flexible material such as silicone or thermoplastic polyurethane elastomer (TPU) material, which has a soft touch and can be bent, thereby enhancing the comfort of the user's pet. When the user uses it in a finger-wearing manner, as shown in FIG. 30, the user's different fingers are respectively worn on the first end portion 81113 and the second end portion 81114 of the paw washing head 8111. The back of the user's fingers is attached to the inner side of the base 8112, and the user's fingers can move flexibly to respectively drive the first end portion 81113 and the second end portion 81114 of the paw washing head 8111 to move, thereby adjusting the position and water spraying direction of the water outlet 81111, and adjusting the position and scrubbing direction of the first brush 81115 and the second brush 81116. As shown in FIG. 30, the water outlet 81111 can spray water towards the bottom side of the pet paw, and the pet paw can be rubbed between the first brush 81115 and the second brush 81116.

In this embodiment shown in FIG. 27, the first brush 81115 may comprise multiple regions, such as two regions, and each region comprises a plurality of first protrusions 811151 which are spaced from each other to form a protrusion array for serving the purpose of brushing and scrubbing the pet paw. Similarly, the second brush 81116 may comprise one or more regions, and each region comprises a plurality of second protrusions 811161 which are spaced from each other to form a protrusion array for serving the purpose of brushing and scrubbing the pet paw.

It can be understood that the water outlet 81111 in this embodiment is formed at a flat water outlet surface of the first end portion 81113 of the paw washing head 8111, and it can also be formed on the first protrusions 811151 in other alternative modes.

It also can be understood that the water feeding pipeline 813 can be connected to the base 8112 adjacent to the first end portion 81113 or the second end portion 81114 of the paw washing head 8111. In the embodiment shown in FIGS. 24 to 28, the water feeding pipeline 813 is connected to the base 8112 adjacent to the second end portion 81114 of the paw washing head 8111. Water from the water feeding pipeline 813 enters the first end portion 81113 after being guided into the base 8112, and is sprayed out from the water outlet 81111.

The water spraying assembly 811 further comprises a water control switch 814 provided on the paw washing head 8111 or the base 11. In the embodiment shown in FIGS. 25 to 28, the water control switch 814 is set on a side of the paw washing head 8111 of the water spraying assembly 811, such as an outer side of the first end portion 81113 of the paw washing head 8111, so that when the user's fingers are holding the paw washing head 8111, the user's other fingers, such as the ring finger or thumb, can conveniently operate the water control switch 814 to close or open the water spray operation of the paw washing head 8111. In addition, the entire operation process can be completed with one hand, so that the user's other hand can be freed to hold the pet and calm it down. Furthermore, it can be understood that the water control switch 814 can provide the function of closing or opening the water spray operation of the paw washing head 8111, and can also be implemented to further adjust the water pressure reaching the water outlet 81111, so as to achieve the adjustable water flow pressure directed to the pet paw.

The water storage container 820 comprises a container body 821, a controller 822, and a strap 823. In this embodiment, the container body 821 is a flexible water bag, and the strap 823 is installed on the container body 821 for the user's fingers to hold or the strap 823 can be positioned on the shoulder of the user for carrying. The controller 822 is installed on the container body 821 to control the water supply operation of the water storage container 820. The size of the container body 821 can be designed as needed, for example, its volume can be 1-5 L. The strap 823 can be constructed as adjustable in length, for example, the length can be 50-150 cm.

The water storage container 820 has an opening for filling water into the water storage container 820, and a sealing device such as a sealing plug is provided to seal the opening. In this embodiment, the water storage container 820 further comprises a strap support 824 which is detachably installed on the container body 820 to install the strap 823 and can be implemented as a sliding mechanism to close the water bag after filling water into the container body 821.

The water feeding pipeline 813 is connected to the controller 822 which comprises a control switch, a control circuit, a power module, a water pump, and a housing. The housing can be welded to the container body 821 by high-frequency welding. When the controller 822 is in the working state, the water pump pumps water from the container body 821 into the water feeding pipeline 813, which is further transported to the paw washing head 8111 through the water feeding pipeline 813. The water is sprayed from the water outlet 81111 to clean the pet paw.

The pet paw washing arrangement further comprises a packaging box 830 which comprises a box body 831 and a cover body 832. A storage cavity 833 is formed inside the packaging box 830 to store the paw washing device 810 and the water storage container 820 for facilitating transportation. It is worth mentioning that the strap 823, the container body 821, and the water feeding pipeline 813 are all made of flexible materials, which can be rolled up for easy storage and organization. The box body 831 can be made of metal, plastic, or cardboard material, and can be coated with a waterproof layer on an inner surface thereof.

The cover body 832 can also be made of various rigid materials. In this embodiment, it can be made of metal or plastic material, and in this embodiment, it has a groove 321 on its top side. Therefore, when the user carries the paw washing device device and there is water stored in the water storage container 820, the user can also pump the water in the water storage container 820 into the groove 8321 of the cover body 832 for the pet to drink.

As shown in FIGS. 31 to 35, a paw washing device device according to an alternative mode of the preferred embodiment of the present invention is illustrated to comprise a paw washing device 810 and a water storage container 820. The paw washing device 810 comprises a water spraying assembly 811, a holding element 812, and a water feeding pipeline 813. The water feeding pipeline 813 is connected to the water storage container 820, so that the water in the water storage container 820 can be supplied to the water spraying assembly 811 through the water feeding pipeline 813 for washing the pet paw. The water spraying assembly 811 is installed on the holding element 812, and the holding element 812 is made of a relatively rigid material, so that it is convenient for the user to hold and for the user to use the paw washing device 810 by hand. The water feeding pipeline 813 can be connected and communicated with the water spraying assembly 811 to supply water to the water spraying assembly 811.

The water spraying assembly 811 comprises a paw washing head 8111 and a base 8112, wherein the paw washing head 8111 is connected to the base 8112, and the paw washing head 8111 has a water outlet surface 81110 with one or more water outlets 81111 through which water can be sprayed to wash the pet paw.

In this embodiment, the paw washing head 8111 comprises a first end portion 81113 and a second end portion 81114 which are pivotally connected to the base 8112. The first end portion 81113 forms a wearing chamber 8113 with a finger sleeve, and at least one finger of the user can be inserted into the wearing chamber 8113 to wear the first end portion 81113 on the user's finger. The first end portion 81113 has a plurality of water outlets 81111 for spraying water to the pet paws. The first end portion 81113 is also provided with a first brush 81115 with an array of first protrusions 811151 on its outer side surface, and the second end portion 81114 is provided with a second brush 81116 with an array of second protrusions 811161 on its outer side surface. The second end portion 81114 forms a wearing cavity 81117 on the side away from the base 8112, thus forming a finger sleeve as well.

The holding element 812 comprises a cover plate 8121 and a bracket 8122, and the base 812 of the water spraying assembly 811 is fitted to the cover plate 8121. A storing cavity 8123 is formed between the cover plate 8121 and the bracket 8122. The first end portion 81113 and the second end portion 81114 of the paw washing head 811 can be rotated into or out of the storing cavity 8123, making the structure of the paw washing device 810 more compact.

Of course, in other alternative modes, the first end portion 81113 and the second end portion 81114 of the paw washing head 811 may also slide out or pop out of the holding element 812. The present invention is not limited in this regard.

During use, the first end portion 81113 and the second end portion 81114 of the paw washing head 811 can be rotated out of the storing cavity 8123. The user can hold the holding element 812 and their fingers can fit into the storing cavity 8123 to clean the pet paw using the paw washing device 810, or the user's fingers can be worn on the paw washing head 811 to clean the pet paw.

Figure 35:
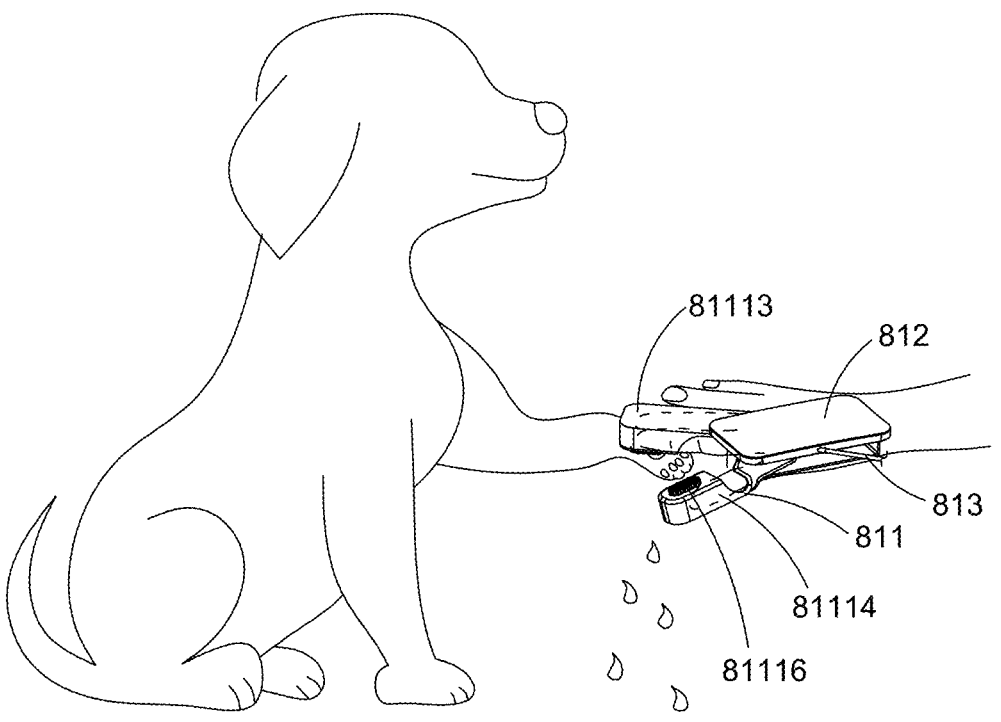
FIG. 35 is a schematic view illustrating a finger-wearing scene of the paw washing device of the pet paw washing arrangement according to the above alternative mode of the fifth preferred embodiment of the present invention.
Figure 36:
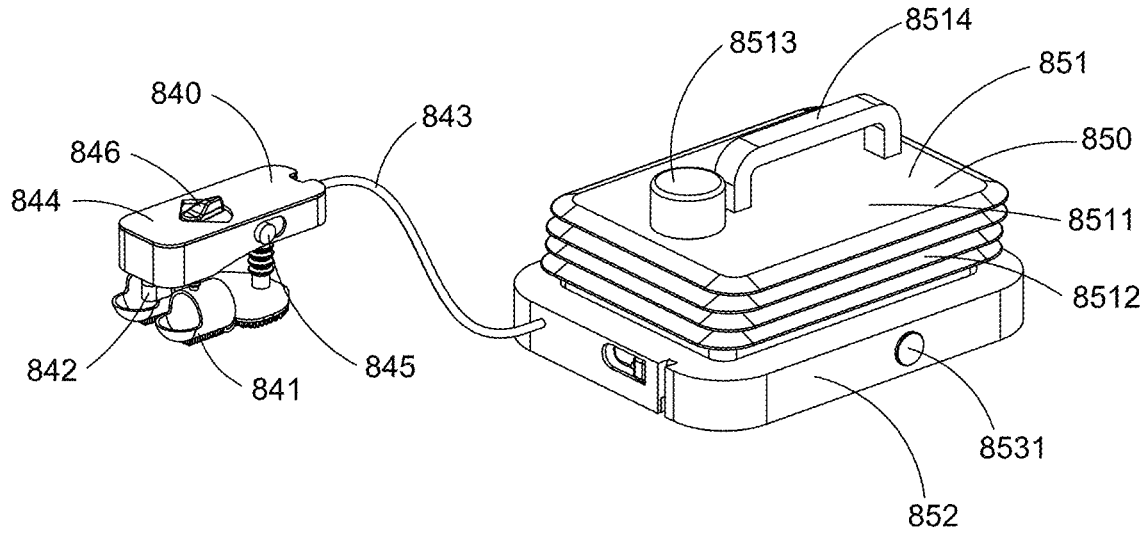
FIG. 36 is a perspective view of a pet paw washing arrangement according to a sixth preferred embodiment of the present invention.

It can be understood that the paw washing head 8111 is made of a flexible material such as silicone or thermoplastic polyurethane elastomer (TPU). As shown in FIG. 35, the user's different fingers are respectively worn on the first end portion 81113 and the second end portion 81114 of the paw washing head 8111. The user's fingers can move flexibly to respectively drive the first end portion 81113 and the second end portion 81114 of the paw washing head 8111, thereby adjusting the position and direction of the water outlet 81111, and adjusting the position and scrubbing direction of the first brush 81115 and the second brush 81116. As shown in FIG. 35, the water outlet 81111 can spray water towards the bottom side of the pet paw, and the pet paw can be scrubbed between the first brush 81115 and the second brush 81116.

It can be understood that in this embodiment, the water feeding pipeline 813 can be connected to the first end portion 81113 of the paw washing head 8111 or the base 8112, and ensure that the water supply between the water feeding pipeline 813 and the first end portion 81113 is not affected while the first end portion 81113 is rotating, so that the water from the water feeding pipeline 813 can be guided into the first end portion 81113 and sprayed out from the water outlet 81111 to clean the pet paw.

When using the pet paw washing arrangement of the present invention, water can be filled into the container body 821 of the water storage container 820, so that the user can carry the water-filled water storage container 820 and the paw washing device 810 with them. When the pet needs to enter an indoor environment or a transportation means from outdoors, the water storage container 820 and the paw washing device 810 are connected through the water feeding pipeline 813. Then, the user can clean the pet paws one by one by using the following handheld paw washing operation and finger wearing method.

During the handheld paw washing operation, the user holds the holding element 812 of the paw washing device 810 and starts the controller 822 of the water storage container 820 to pump the water from the container body 821 of the water storage container 820 to the water spraying assembly 811 of the paw washing device 810, and aligns the water outlet 81111 of the paw washing head 8111 with the pet paw, so that the water from the water storage container 820 is sprayed from the water outlet 81111 to wash and rinse the pet paw, and the first brush 81115 can be used to brush the pet paw.

In the process of cleaning the pet paw in the finger-wearing mode, the first end portion 81113 and the second end portion 81114 of the paw washing head 8111 are worn on different fingers of the user. The controller 21 of the water storage container 820 is started to pump water from the container body 821 of the water storage container 820 to the water spraying assembly 811 of the paw washing device 810 through the paw washing head 8111. The water from the water storage container 820 is sprayed out from the water outlet 81111 of the first end portion 81113 of the paw washing head 8111 to wash and rinse the pet paw, and the user can manipulate the wearing fingers to use the first brush 81115 and the second brush 81116 on the first end portion 81113 and the second end portion 81114 to brush and scrub the pet paw.

Referring to FIGS. 36 to 48 of the drawings, a pet pet paw washing arrangement according to a sixth preferred embodiment of the present invention is illustrated to comprise a paw washing device 840 and a water storage container 850, wherein the water storage container 850 is used to supply water to the paw washing device 850, so that the user can use the paw washing device 840 to clean the pet paw. It should be understood that when water supply is available in a using scenario, only the paw washing device 840 can be provided and the water storage container 850 may be omitted.

The paw washing device 840 comprises a wearing body 841, a spraying head 842, and a water feeding pipeline 843. The water feeding pipeline 843 is connected to the water storage container 850, so that water in the water storage container 850 can be supplied to the spraying head 842 through the water feeding pipeline 843 to wash and rinse the pet paw.

The wearing body 841 comprises one or more finger wearing components 8411 each of which has a wearing channel 84110. In this embodiment, the wearing body 841 comprises two finger wearing components 8411 through which the index finger and middle finger of the wearer's wearing hand can be worn by extending into the corresponding wearing channels 84110. In an alternative mode, The wearing body 841 comprises five finger wearing components 8411 which are connected to form a glove. Each wearing channel 84110 has an inlet at a first end thereof and an outlet at an opposite second end thereof, or the second end is a sealing end.

The spraying head 842 has one or more water outlets 8420 which are located near the finger wearing components 8411, so that water can be discharged near the finger wearing components 8411 to wash the pet paw. The fingers wearing components 8411 can move flexibly, so as to allow them to scrub the pet paw and quickly clean the pet paw. In addition, the spraying head 842 is configured to move synchronously with the fingers wearing the finger wearing components

8411 when the wearing hand of the user is moving, making it convenient to adjust the position of the spraying head 842 and further adjust the water outlet positions of the water outlets 8420.

That is to say, the water outlet 8420 of the spraying head 842 sprays water outward around the finger wearing component 8411, making it convenient for the user to wear the fingers on the finger wearing component 8411 to further wash the pet paw with running water, so as to clean the difficult-to-clean positions between the adjacent two paws of the pet. The water outlet 8420, which can be similar to the fifth embodiment mentioned above, may be located at an inner side of the end portion with bristles, and the water outlet surface 81110 having the water outlet 81111 can be integrally formed with the paw washing head 8111. The water outlet 8420 can be coplanar with the bottom surfaces 84111 of the finger wearing components 8411, and can be located in front of or behind the bottom surfaces 84111 of the finger wearing components 8411. When one or more fingers of the user, such as the index finger and middle finger, are worn on the corresponding finger wearing components 8411, the water outlet 8420 can be located in front of, behind, or beside the fingers worn by the user.

In this embodiment, two finger wearing components 8411 are spacedly arranged and the water outlet 8420 of the spraying head 842 is located between the two finger wearing components 8411. When the user's index finger and middle finger are worn on the corresponding finger wearing components 8411, the water outlet 8420 can spray water between the two finger wearing components 8411, that is, between the user's index finger and middle finger, towards the pet paw.

In the present invention, the water outlet 8420 of the spraying head 842 is not located near the user's palm as the palm attachable shower in the prior art, but rather near the position of the finger wearing components 8411. Therefore, after the water is discharged from the water outlet 8420, it is convenient for the user to further wash the pet paws with running water using the user's fingers.

The wearing body 841 further comprises a scrubbing component 8412 which is connected to the finger wearing components 8411 and can be embodied as a palm wearing portion. The scrubbing component 8412 and the finger wearing component 8411 can both be made of flexible materials, such as rubber, silicone, film, fabric, cloth, foam, sponge, and other materials, to facilitate the flexible operation of the user's fingers. The scrubbing component 8412 includes a base layer 84121 and a brush layer 8413 attached to the base layer 84121. The brush layer 8413 includes a plurality of bristles which are spaced from each other, so that when the user wears the scrubbing component 8412 on the hand, the palm of the user corresponds to the scrubbing component 8412, making it convenient for the user's palm to drive the scrubbing component 8412 to scrub the pet paw.

Each finger wearing component 8411 is also provided with a brush layer 8413 on its bottom surface 84111, so that when the user wears the finger wearing component 8411 on their fingers, the user's fingers, such as the index finger and middle finger, can move flexibly, thereby driving the brush layer 8413 to scrub the pet paw.

The spraying head 842 can be independent from the wearing body 841 and connected by assembly. It can also be integrally formed with the wearing body 841, similar to the first embodiment mentioned above in which the water outlet 8420 can be formed in the wearing body 841. In this embodiment, the spraying head 842 is shown as connected to the wearing body 841, and the water outlet 8420 is not formed in the wearing body 841.

It can be understood that in another alternative mode, the wearing body 841 may not comprise the finger wearing component 8411. The wearing body 841 can be worn on the user's palm, and the user can wear the wearing body 841 after wearing a glove. The position of the water outlet 8420 of the spraying head 842 is near the user's fingers after the user wears the wearing body 841, thereby achieving the purpose of washing and rinsing with water and scrubbing the pet paw with fingers.

In this embodiment, the paw washing device 840 further comprises a housing component 844. The spraying head 842 is connected to the housing component 844, and the water feeding pipeline 843 has a portion which is extended into the housing component 844 and communicated with the spraying head 842, so that water from the water storage container 850 can be conveyed to the spraying head 842 via the water feeding pipeline 843 and sprayed out from the spraying head 842.

Figure 41:
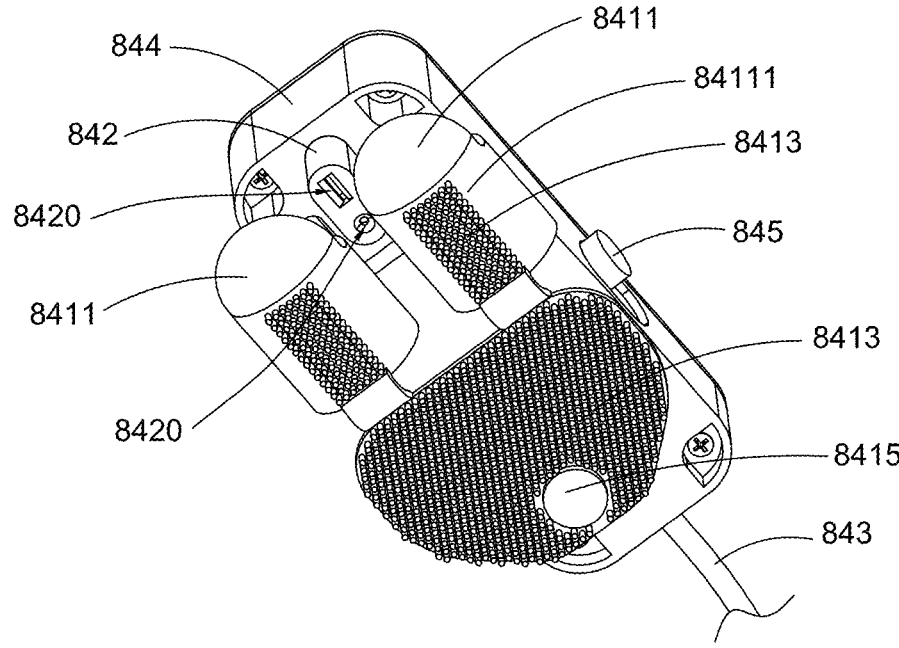
FIG. 41 is an enlarged perspective view of the paw washing device of the pet paw washing arrangement according to the above sixth preferred embodiment of the present invention in an overhead view.
Figure 43:
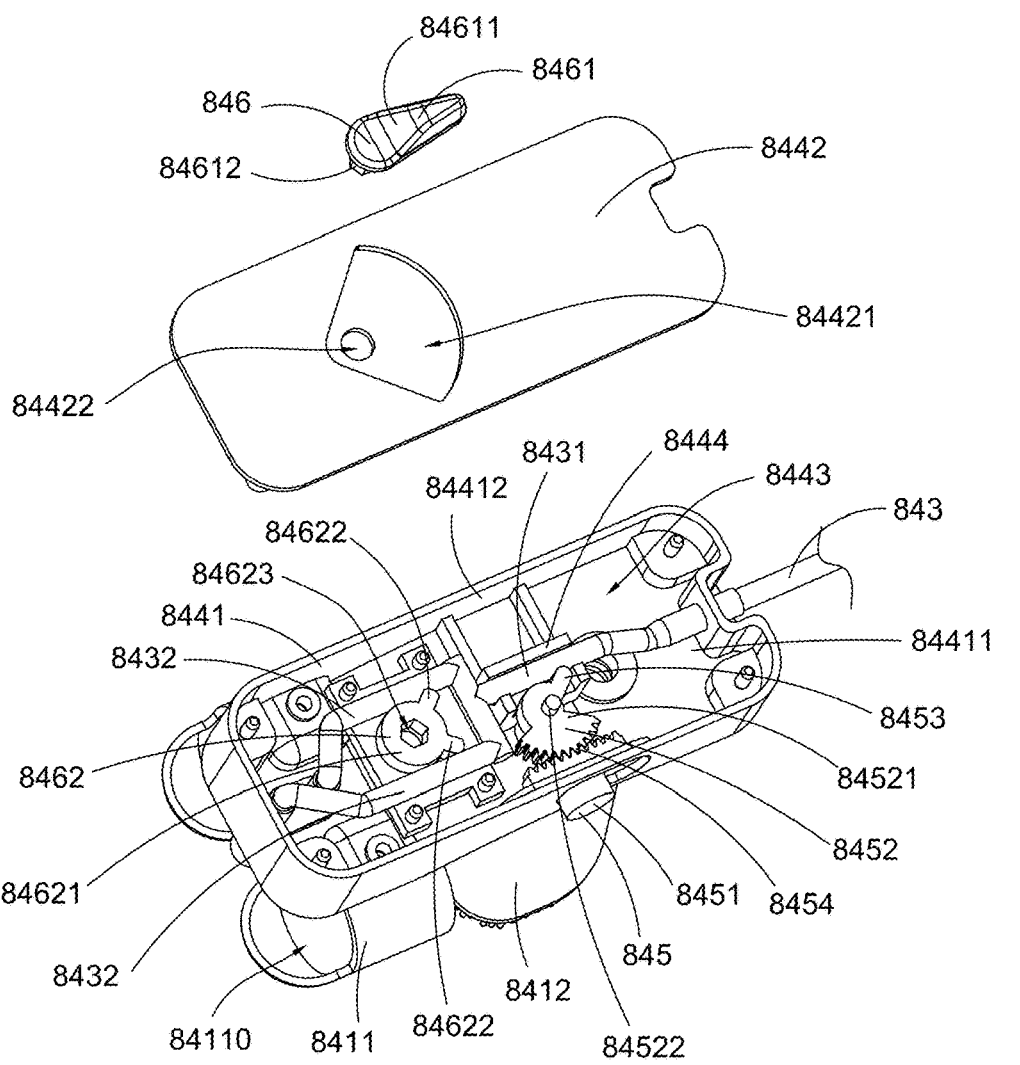
FIG. 43 is an enlarged exploded view of the paw washing device of the pet paw washing arrangement according to the above sixth preferred embodiment of the present invention.

Referring to FIG. 41 and FIG. 43, the spraying head 842 can be protruded from the housing component 844, and the water outlet 8420 is connected to the water feeding pipeline 843. The water feeding pipeline 843 comprises a water delivery pipeline 8431 which is located inside the housing component 844 and is communicated to the water outlet 8420 of the spraying head 842, so that the water from the water storage container 850 can be conveyed from the water feeding pipeline 843 to a water delivery pipeline 8431 located inside the housing component 844 and sprayed out from the water outlet 8420 of the spraying head 842.

As shown in FIG. 43, the paw washing device 840 comprises a water control switch 845 which is assembled on the housing component 844 to control the water feeding pipeline 843 to spray water from the water outlet 8420 of the spraying head 842. The water control switch 845 can be various devices that can control the flow of water, such as stop valve, butterfly valve, diaphragm valve, ball valve, and plug valve.

In this embodiment of the present invention, the water delivery pipeline 8431 of the water feeding pipeline 843 is a flexible tube, and the water control switch 845, when operated, controls the delivery of water to the water outlet 8420 by squeezing the water delivery pipeline 8431.

The water control switch 845 can be a knob that can be pushed and rotated to change the state of squeezing the water delivery pipeline 8431, so that the water delivery pipeline 8431 is shifted between a closed or open state. And when the rotation degree is different, the water flow volume in the water delivery pipeline 8431 can also be adjusted.

As shown in FIG. 43, in this embodiment of the present invention, the water control switch 845 comprises a control member 8451, a driving member 8452, and a biasing member 8453. The control member 8451 can be operated by the user, and the driving member 8452 is driven by the control member 8451 to drive the biasing member 8453, so that the biasing member 8453 can be driven to move closer to the water delivery pipeline 8431 for squeezing the water delivery pipeline 8431 or to move away from the water delivery pipeline 8431, thereby controlling the water flow of the water delivery pipeline 8431.

As shown in FIGS. 39 to 46, the housing component 844 comprises a base support 8441 and a cover lid 8442 coupled to the base support 8441 to define a receiving cavity 8443. An end portion of the water feeding pipeline 843 passes through the base support 8441 and is accommodated in the receiving cavity 8443. In this embodiment, the housing component 844 can serve as a carrier for the spraying head 842, and can be used to install the water control switch 845 and the pipeline component.

The base support 8441 of the housing component 844 comprises a bottom plate 84411 and a surrounding wall 84412 connected to the bottom plate 84411 to form the receiving cavity 8443 together with the cover lid 8442. The housing component 844 also comprises a retaining wall 8444 which is extended from the bottom plate 84411 or the surrounding wall 84412. The water delivery pipeline 8431 is located between the retaining wall 8444 and the biasing member 8453, so that when the biasing member 8453 is driven to move, the water delivery pipeline 8431 of the water feeding pipeline 843 is squeezed and released between the fixed retaining wall 8444 and the movable biasing member 8453, thereby controlling the water passage of the water delivery pipeline 8431 and further adjusting the water flow rate.

A wearing space 8414 is formed between the base support 8441 and the wearing body 841. When the user's fingers, such as the index finger and middle finger, are worn on the finger wearing components 8411, and the palm is located in the wearing space 8414. As a result, the user's hand is held between the wearing body 841 and the housing component 844 for facilitating the guiding of the paw washing device 840 for cleaning operations.

Each of the finger wearing components 8411 comprises a ring-shaped wearing part 84112 and a connecting member 84113. The ring-shaped wearing part 84112 forms the wearing channel 84110, and the connecting member 84113 is connected to the ring-shaped wearing part 84112 and fixedly connected to the base support 8441 of the housing component 844, thereby keeping each of the finger wearing components 8411 in place and allowing the finger wearing components 8411 to move and deform under the guidance of the fingers.

The wearing body 841 further comprises a positioning pin 8415 which connects the scrubbing component 8412 to the base support 8441 of the housing component 844. The positioning pin 8415 also serves to position the user's fingers. Specifically, when the user's index finger and middle finger are worn into the corresponding finger wearing components 8411, the positioning pin 8415 is positioned between the index finger and middle finger and reaches the roots of the index finger and middle finger, so that the user's index finger and middle finger grip the positioning pin 8415, so as to allow the two fingers to firmly hold the paw washing device 840.

Similarly, in another alternative mode, the scrubbing component 8412 can also be constructed with a similar structure to the scrubbing end structure in the first embodiment mentioned above, so that it can be worn on the user's thumb and bent to face the bottom surface 84111 of the finger wearing component 8411, thereby allowing the pet paw to be clamped between the scrubbing component 8412 and the bottom surface 84111 of the finger wearing component 8411 for scrubbing.

The housing component 844 has a retaining groove 8445 in the surrounding wall 84412 of the base support 8441. The control member 8451 is slidably disposed in the retaining groove 8445 and is protruded out from the surrounding wall 84412 of the base support 8441 for user operation. The control member 8451 and the driving member 8452 engage with each other through corresponding engaging teeth 8454. The driving member 8452 comprises a driving body 84521 and a rotating axle 84522. The rotating axle 84522 is located on the bottom plate 84411 of the base support 8441, and the driving body 84521 is rotatably mounted on the rotating axle 84522. The biasing member 8453 is extended integrally from the driving body 84521 and faces the water delivery pipeline 8431.

As shown in FIG. 43, when the control member 8451 is driven to slide rightward in the retaining groove 8445, the driving member 8452, which is engaged with the control member 8451 through the engaging teeth 8454, is driven to rotate counterclockwise, thereby driving the biasing member 8453 to squeeze the water delivery pipeline 8431 towards the retaining wall 8444, so as to reduce the water flow in the water delivery pipeline 8431 until the water supply to the water outlet 8420 of the spraying head 842 is cut off.

When the control member 8451 is driven to slide leftward in the retaining groove 8445, the driving member 8452, which is engaged with the control member 8451 through the engaging teeth 8454, is driven to rotate clockwise, causing the biasing member 8453 to move in the direction away from the retaining wall 8444, thereby increasing the water volume in the water delivery pipeline 8431 until the water delivery pipeline 8431 is released without being squeezed, thus providing maximum water flow to the water outlet 8420 of the spraying head 842.

It can be understood that during the process of supplying water from the water storage container 850 to the spraying head 842, there is water pressure in the water feeding pipeline 843, and the water control switch 845 can adjust the water pressure and water volume of the water delivery pipeline during operation. The paw washing device 840 may not be equipped with the water control switch 845, and the structure for controlling water flow on and off can be provided in a local part of the water feeding pipeline 843 or on the water storage container 850.

It is worth mentioning that in this embodiment of the present invention, the control member 8451 is mounted on a side of the housing component 844, and when the user's index finger and middle finger are worn on the corresponding finger wearing components 8411, the user's thumb can conveniently control the control member 8451, allowing the paw washing device 840 to be operated with one hand for controlling the water flow.

Figure 42:
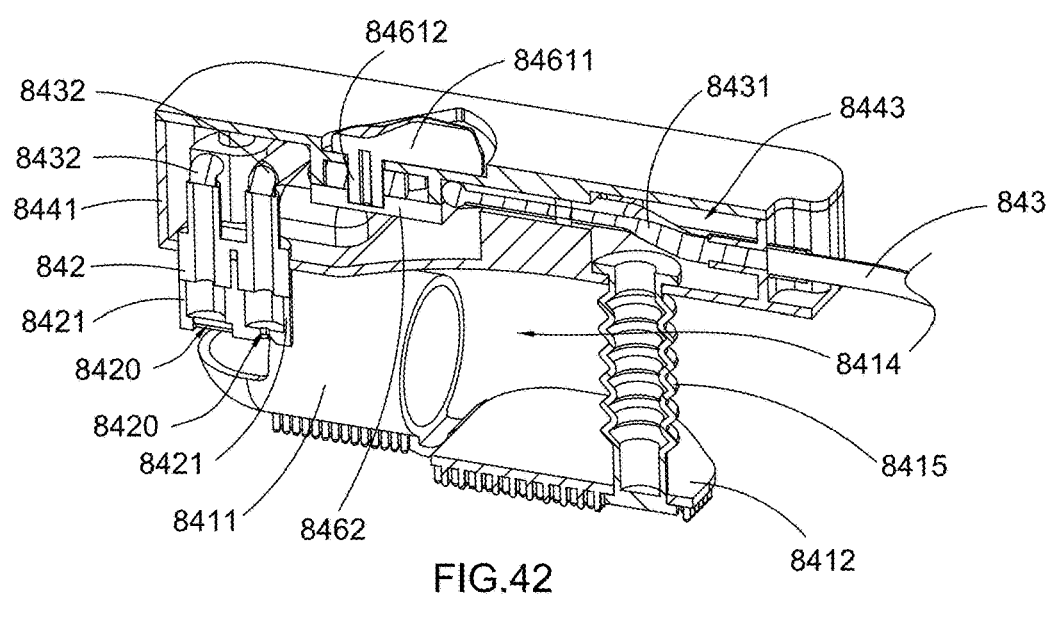
FIG. 42 is an enlarged perspective view of the paw washing device of the pet paw washing arrangement after being cut open in the middle according to the above sixth preferred embodiment of the present invention.

As shown in FIGS. 41 and 42, the spraying head 842 can have a plurality of water outlets 8420. Accordingly, the spraying head 842 can comprise a plurality of nozzles 8421, each of which has one water outlet 8420. For example, the spraying head 842 comprises two nozzles 8421 and is used to provide different water spray patterns. For example, one water outlet 8420 can be a circular hole, thus providing a columnar water spray pattern, and another water outlet 8420 can be a slit shape, thus providing a fan-shaped water spray pattern. In another alternative modes, one of the nozzles 8421 can also be equipped with an atomization device which disperses the water flow into small water droplets mist through the nozzle hole.

Correspondingly, the water feeding pipeline 843 further comprises two water guiding pipelines 8432, which are connected and communicated with the water delivery pipeline 8431. The two water guiding pipelines 8432 are respectively connected to two nozzles 8421, so as to supply water to two water outlets 8420 through the two water guiding pipelines 8432 respectively.

The paw washing device 840 further comprises a selecting switch 846 which is used to control the water delivery pipeline 8431 and the corresponding water outlet 8420 for water spraying operation. In other words, by operating the selecting switch 846, a suitable water outlet 8420 can be chosen to clean the pet paw with the desired water spraying pattern. The water column spraying pattern has a stronger impact force, while the fan-shaped water mist has a larger cleaning area.

The selecting switch 846 can also comprise one or more valve components, such as stop valve, butterfly valve, diaphragm valve, ball valve, rotary valve, etc. In this embodiment, the water guiding pipeline 8432 is also a flexible pipe. The selecting switch 846 closes the corresponding water guiding pipeline 8432 by squeezing it.

As shown in FIGS. 43 to 46, the selecting switch 846 comprises a control part 8461 and a driving part 8462. The control part 8461 comprises a knob 84611 and a connecting arm 84612. The driving part 8462 comprises a driving part body 84621 and two pressing parts 8462 which are extended from the driving part body 84621. The connecting arm 84612 is operatively connected to the driving part body 84621, for example, the driving part body 84621 has a hexagonal driving hole 84623, and the connecting arm 84612 is hexagonal in shape and is placed in the driving hole 84623. The driving part 8462 is movably disposed between the two water guiding pipelines 8432. When the knob 84611 of the control part 8461 is rotated, the connecting arm 84612 is driven to rotate, thereby synchronously driving the driving part 8462 to rotate, so that the two pressing parts 8462 are driven to act on one of the water guiding pipelines 8432.

The top of the cover lid 8442 of the housing component 844 has a groove 84421, and the knob 84611 is disposed in the groove 84421. The cover lid 8442 also has a penetrating hole 84422, and the connecting arm 84612 is extended vertically from the knob 84611 and extended into the receiving cavity 8443 of the housing component 844 through the penetrating hole 84422 and is coupled to the driving part 8462.

Figures 44, 45, 46:
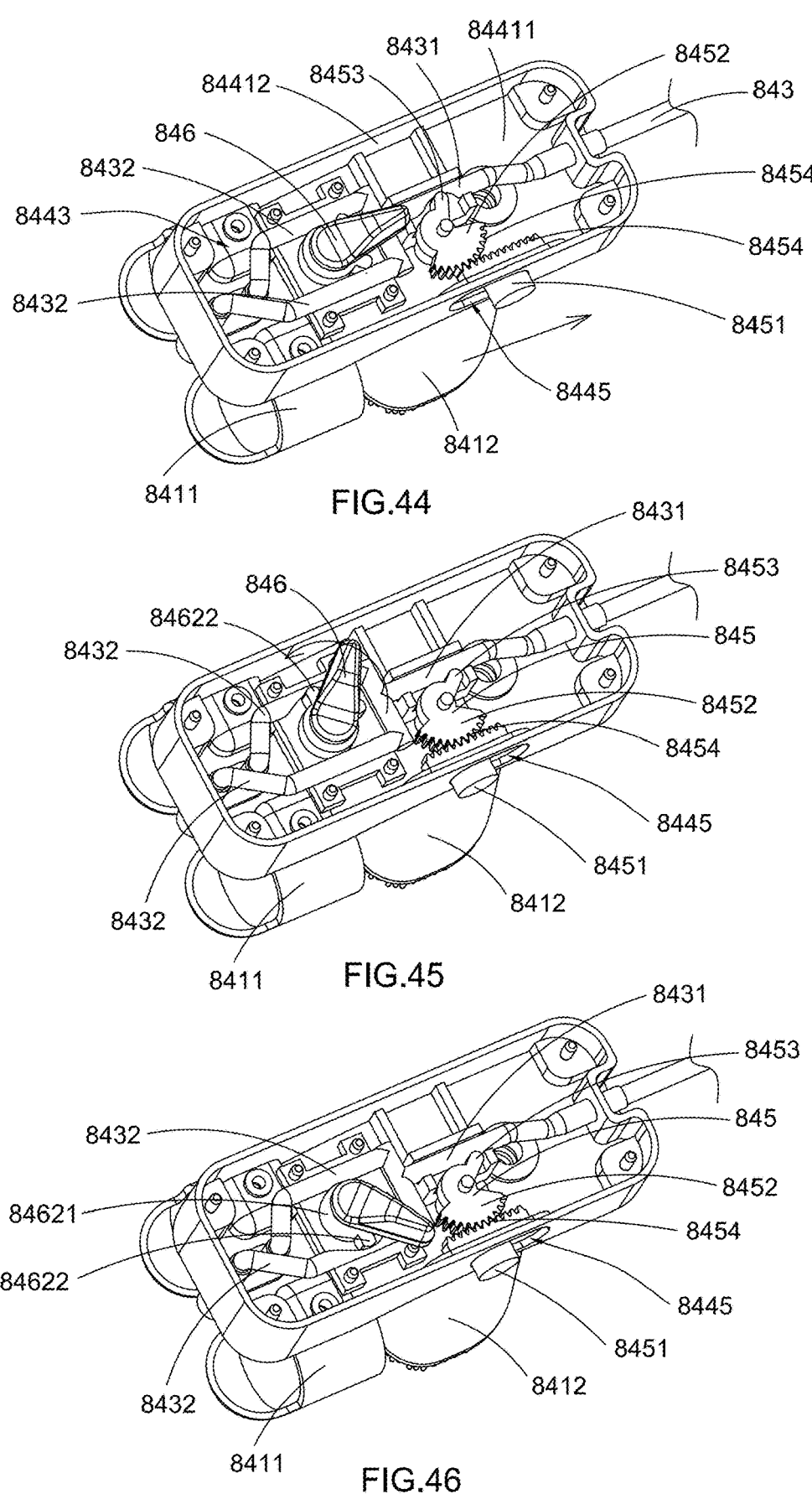
FIG. 44 is a schematic view of the structure of the paw washing device of the pet paw washing arrangement according to the above sixth preferred embodiment of the present invention illustrating the water control switch being operated.
FIGS. 45 and 46 are schematic views of the paw washing device of the pet paw washing arrangement according to the above sixth preferred embodiment of the present invention, wherein the selecting switch is operated to select different water spray patterns.

As shown in FIG. 45, when the knob 84611 is rotated counterclockwise, the driving part body 84621 of the driving part 8462 is driven to rotate counterclockwise, so that the left pressing part 8462 presses against the left water guiding pipeline 8432 to close the water supply of the left water guiding pipeline 8432. At this time, the right pressing part 8462 is away from the right water guiding pipeline 8432, so that the right water guiding pipeline 8432 is in an open state, allowing the corresponding nozzle 8421 to be supplied with water.

As shown in FIG. 46, when the knob 84611 is rotated clockwise, the driving part body 84621 of the driving part 8462 is driven to rotate clockwise, so that the right pressing part 8462 presses against the right water guiding pipeline 8432 to close the water supply of the right water guiding pipeline 8432. At this time, the left pressing part 8462 is away from the left water guiding pipeline 8432, so that the left water guiding pipeline 8432 is shifted from a closed state to an open state, allowing the corresponding nozzle 8421 to be supplied with water.

The water storage container 850 is a container that can store water, which can be a water storage tank made of rigid materials such as plastic or metal, or mainly a water storage bag made of flexible materials. In this illustrated embodiment, the water storage container 850 comprises a container body 851 which can be implemented as a flexible water storage bag for easy storage and transportation. It should be understood that the water stored in the water storage container 820 can be clean pure water or water with an added cleaning agent.

As shown in FIGS. 36 to 39, in this embodiment, the container body 851 comprises a top cover 8511 and a plurality of annular foldable segments 8512 which are interconnected to form a water storage cavity 8510, and the plurality of annular foldable segments 8512 form a foldable structure with fold lines formed at the connections between adjacent annular foldable segments 8512, and the edges of the adjacent annular foldable segments 8512 are spaced apart from each other. The foldable segments 8512 can be folded along the thickness direction when not filled with water, thereby reducing the size of the entire device in the storage and transportation state.

The container body 851 further comprises a water filling assembly 8513 which is provided on the top cover 8511 and comprises a sealing cover body and a water filling nozzle for filling water into the container body 851. The container body 851 also comprises a handle 8514 which is connected to the top cover 8511 for convenient gripping by the user to carry the pet paw washing arrangement.

The container body 851 can be equipped with a pressurization device, so that the water pressure in the water storage cavity 8510 increases, thereby allowing water to be automatically supplied from the container body 851 to the paw washing device 840 through the spraying head 842. The pressurization device can be a manual pressurization device or an electric pressurization device.

Figure 39:
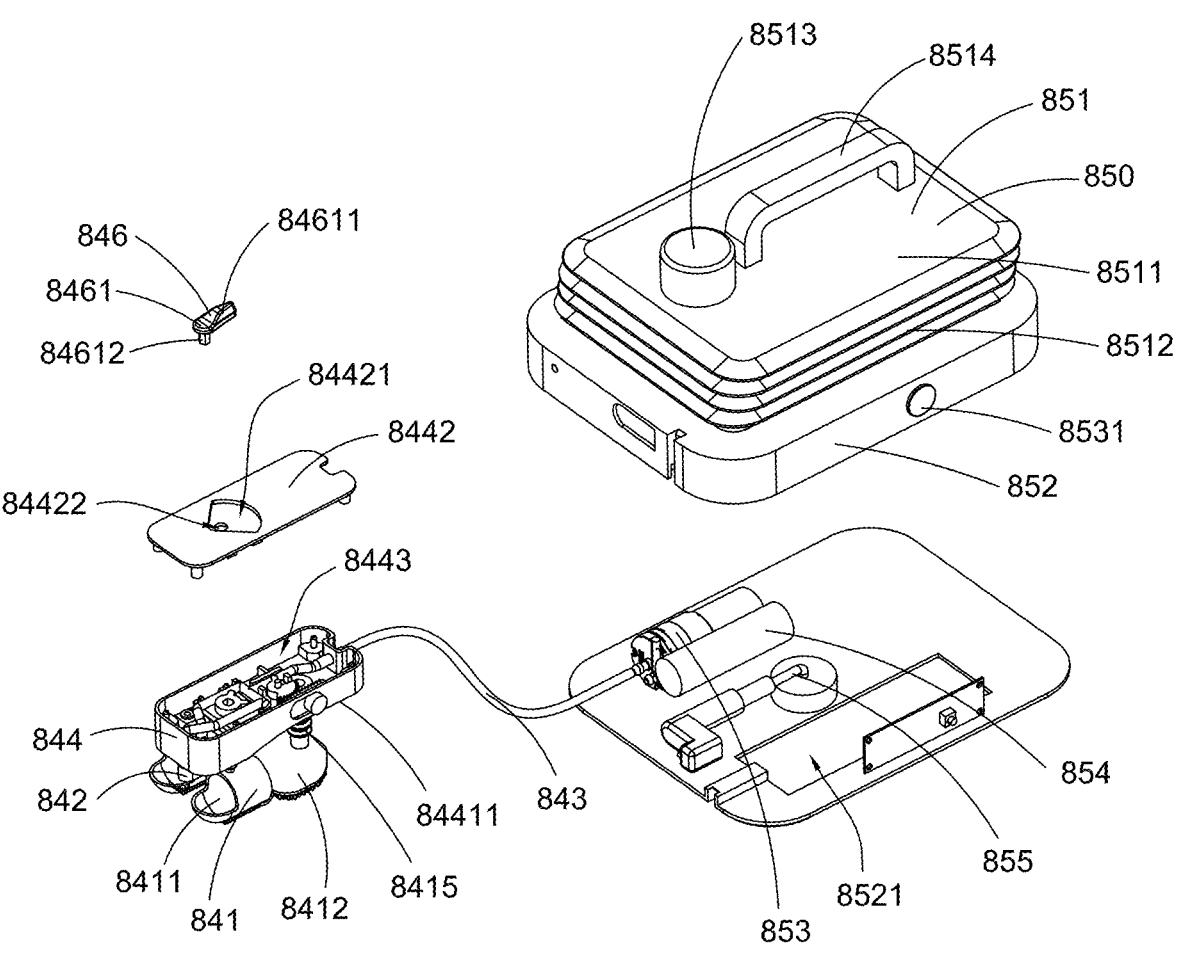
FIG. 39 is an exploded view of the pet paw washing arrangement according to the above sixth preferred embodiment of the present invention.
Figure 40:
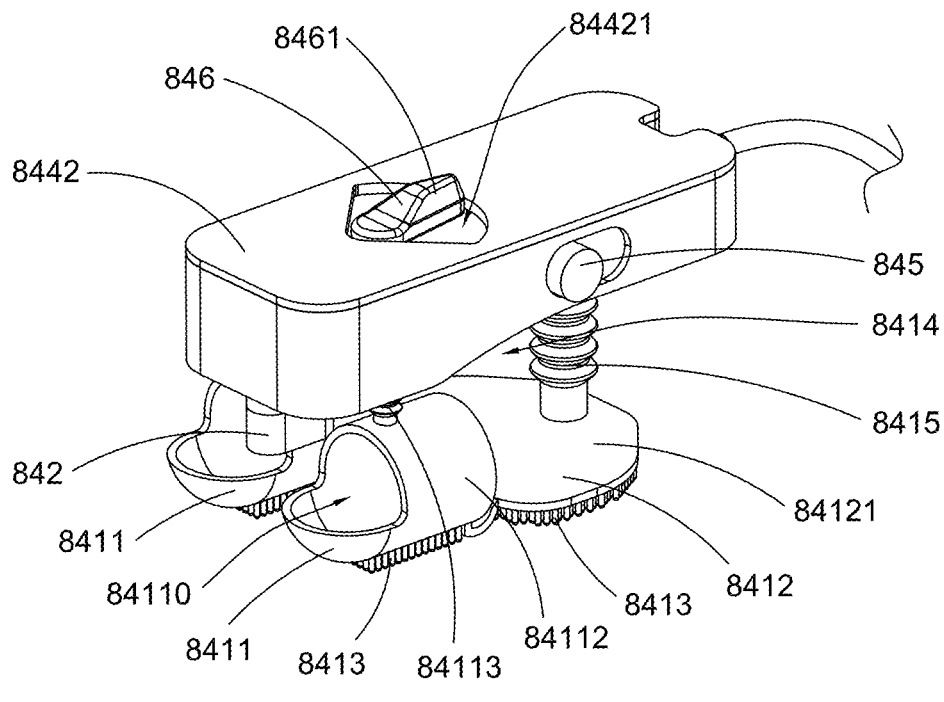
FIG. 40 is an enlarged perspective view of a paw washing device of the pet paw washing arrangement according to the above sixth preferred embodiment of the present invention.

Referring to FIG. 39, in this embodiment of the present invention, the water storage container 850 comprises a bottom shell 852, a water pump 853, and a power module 854. The power module 854 can comprise a rechargeable battery and is electrically connected to the water pump 853. The water pump 853 and the power module 854 are installed on the bottom shell 852, and the bottom shell 852 is connected to the container body 851 to serve as a base for the water storage container 850. When the water pump 853 is turned on, it can pump water from the container body 41 into the water feeding pipeline 843, and then deliver the water to the spraying head 842 through the water feeding pipeline 843, and water is sprayed out from the water outlet 8420. The water pump 853 is correspondingly provided with a switch 8531, which is installed on a side wall of the bottom shell 852, so that the user can control the opening and closing of the water pump 853.

The water storage container 850 may also comprise a detergent supply device 855 which stores detergent and detergent stored in the detergent supply device 855 can be added into the water storage cavity 8510 of the container body 851 by being operated, such as by pressing, so as to clean the pet paw with water containing the detergent.

Figure 37:
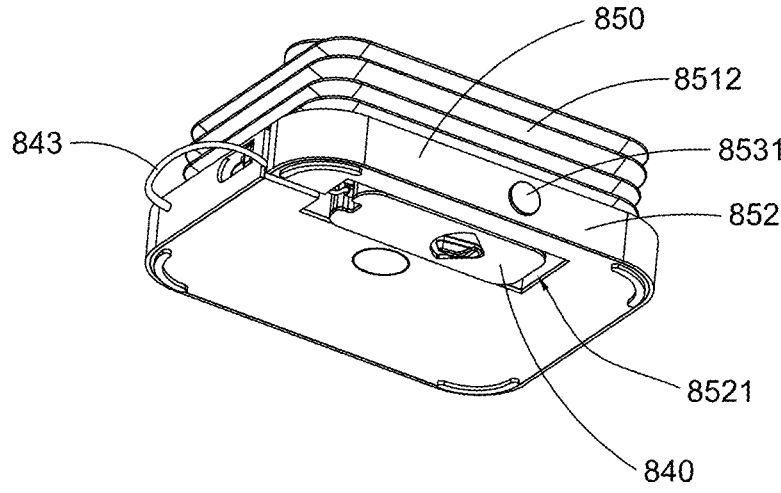
FIG. 37 is a perspective view of the pet paw washing arrangement according to the above sixth preferred embodiment of the present invention, wherein the pet paw washing arrangement is in a storage state.
Figure 38:
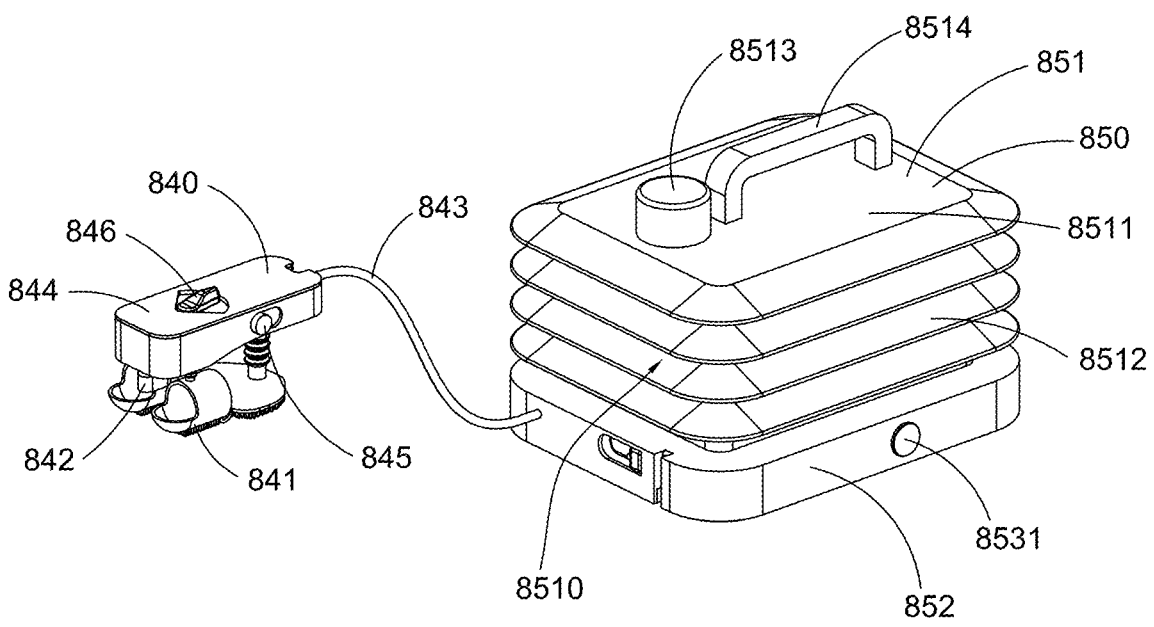
FIG. 38 is a perspective view of the pet paw washing arrangement according to the above sixth preferred embodiment of the present invention, wherein the water storage container in the pet paw washing arrangement is filled with water and ready for use.

As shown in FIG. 37, the bottom of the bottom shell 852 also has a positioning groove 8521. When the paw washing device 840 is not in use, it can be placed in the positioning groove 8521 of the water storage container 850, thereby further facilitating the storage and transportation of the pet paw washing arrangement.

Figure 49:
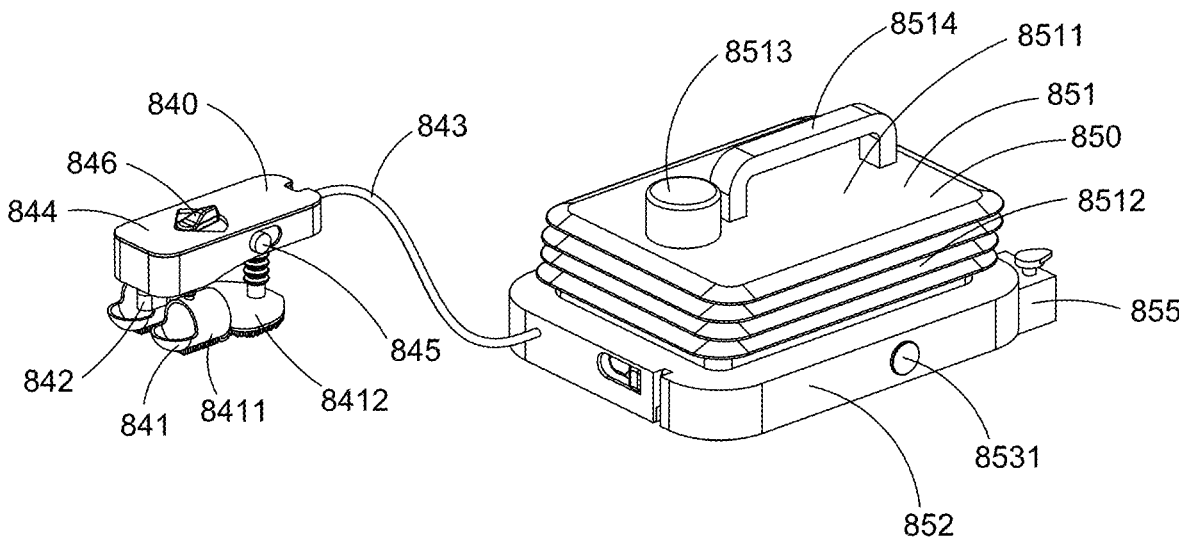
FIG. 49 is a perspective view of a pet paw washing arrangement according to an alternative mode of the above sixth preferred embodiment of the present invention.

As shown in FIG. 49, according to an alternative mode of the second embodiment of the present invention, the water storage container 850 can also comprise a detergent supply device 855 which can be mounted on the outside of the container body 851, so that the detergent supply device 855 is externally attachable to the container body 851, this arrangement enables the user to access detergent from the detergent supply device 855 as required.

Figure 50:
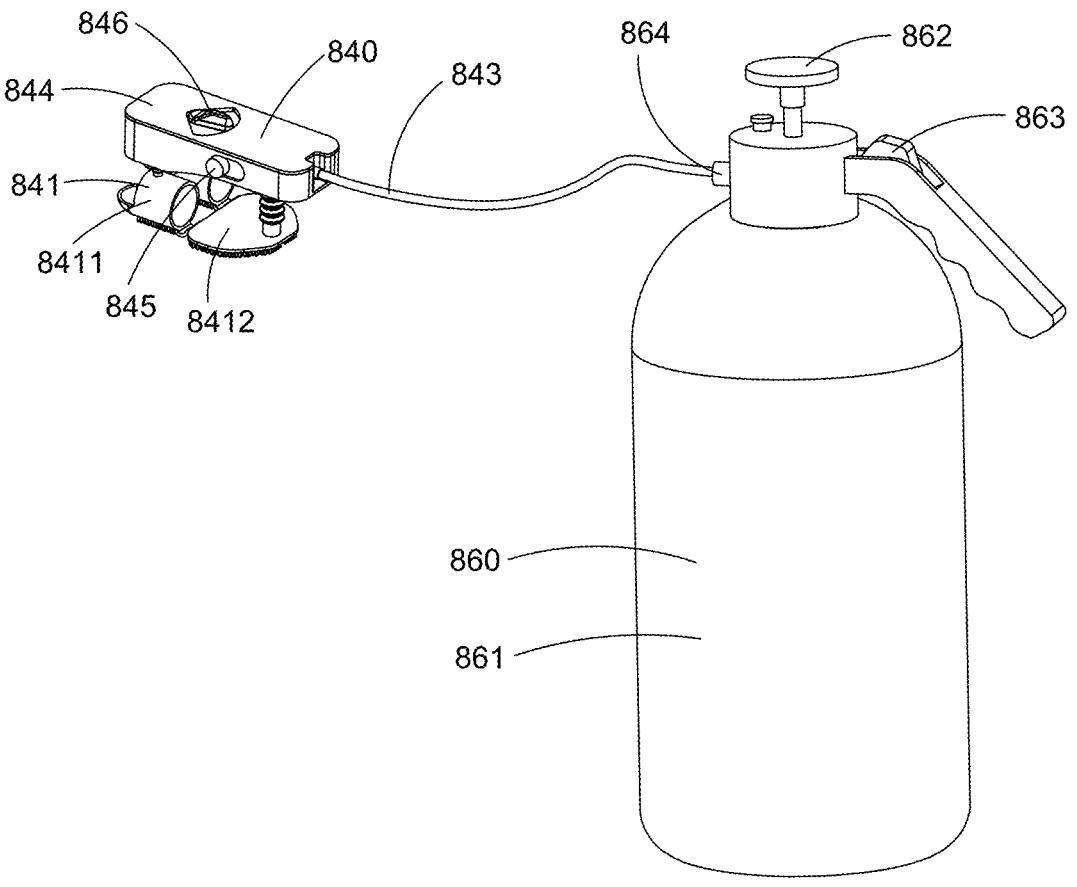
FIG. 50 is a perspective view of a pet paw washing arrangement according to another alternative mode of the above sixth preferred embodiment of the present invention.
Figure 51:
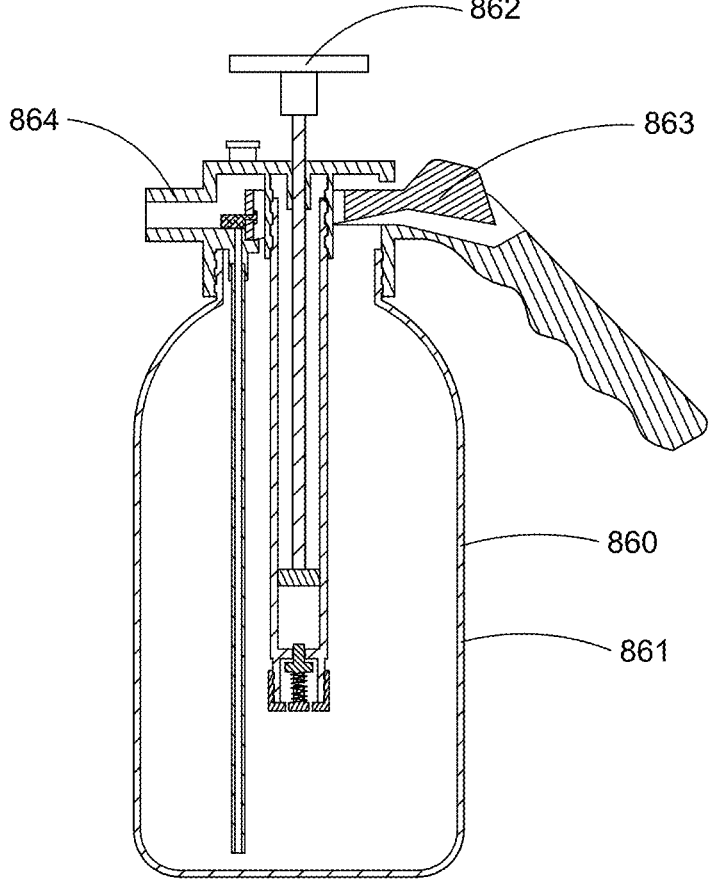
FIG. 51 is a sectional view of the pet paw washing arrangement of the pet paw washing arrangement according to the above another alternative mode of the sixth preferred embodiment of the present invention.

As shown in FIGS. 50 and 51, the pet paw washing arrangement according to another alternative mode of the above sixth preferred embodiment of the present invention comprises a paw washing device 840 and a water storage container 860, wherein the water storage container 860 is used to supply water to the paw washing device 840, so that the user can use the paw washing device 840 to clean the pet paw.

In this embodiment, the water storage container 860 comprises a container body 861, a pressurization device 862, a switch component 863, and a water outlet pipeline 864. One end of the water feeding pipeline 843 is connected to the water outlet pipeline 864 of the water storage container 860, and the other end is connected to the paw washing device 840. The container body 861 comprises a cover body and a container body, which are assembled to form a storage cavity for storing water. The pressurization device 862 is used to pressurize the storage cavity, thereby increasing the air pressure in the storage cavity. The switch component 863 is used to open and close the water outlet operation of the water outlet pipeline 864. The water storage container 860 may also comprise a pressure relief valve, which is provided on the cover body to restore the atmospheric pressure state of the storage cavity of the container body 861 after the water storage container has finished usage.

In other words, in this embodiment of the present invention, the user can increase the air pressure inside the water storage container 860 by manually operating the pressurization device 862, so that the water storage container 860 has a higher air pressure. As a result, when both the switch component 863 of the water storage container 860 and the water control switch 845 of the paw washing device 840 are open, the water in the water storage container 860 will automatically flow from the water storage container 860 through the water feeding pipeline 843 to the spraying head 842 of the paw washing device 840 under the action of the increased air pressure in the storage cavity of the water storage container 860.

Figure 47:
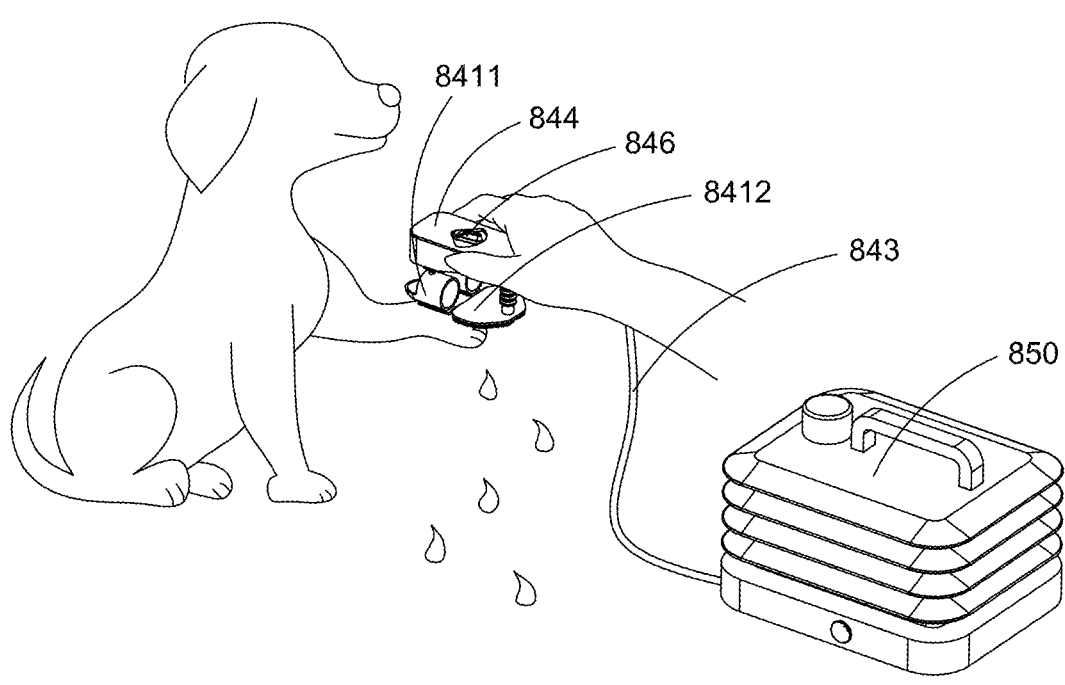
FIG. 47 is a schematic view illustrating the paw washing device of the pet paw washing arrangement being in a handheld use state according to the above sixth preferred embodiment of the present invention.

Referring to the drawings shown, the pet paw washing arrangement of the present invention can provide two modes for cleaning the pet paws. More specifically, as shown in FIG. 47, in this embodiment, the housing component 844 can also serve as a handheld casing which is held by the user, so that the user can hold the paw washing device 840 and align the water outlet 8420 with the pet paw for cleaning.

Figure 48:
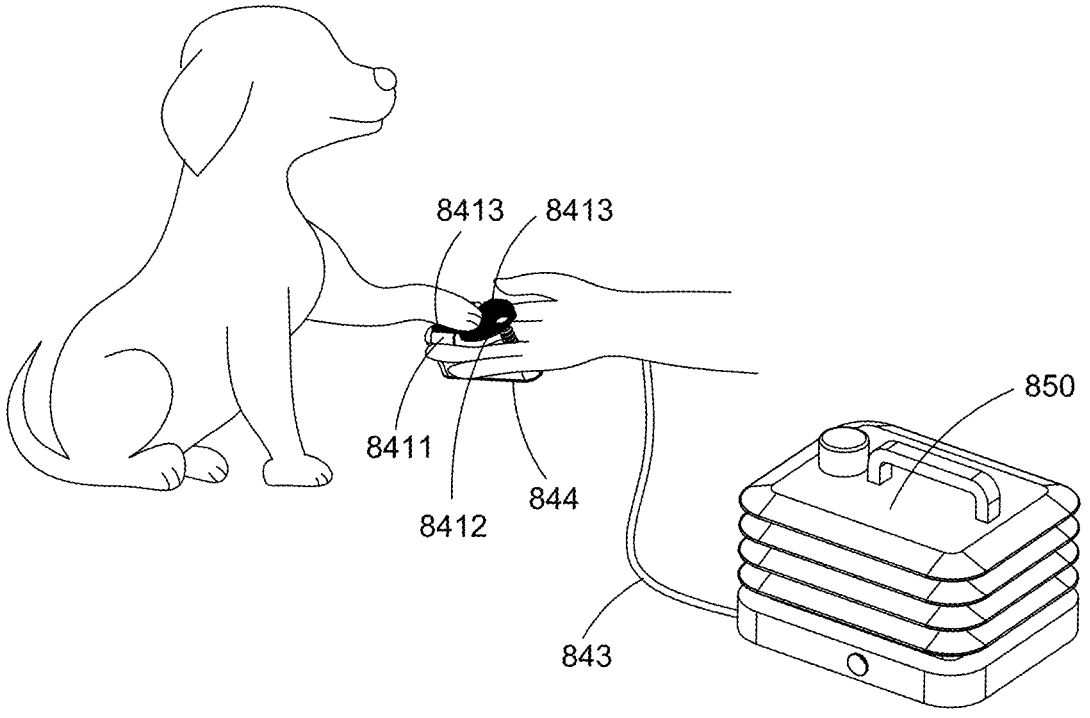
FIG. 48 is a schematic view illustrating the paw washing device of the pet paw washing arrangement being in a hand-worn use state according to the above sixth preferred embodiment of the present invention.

Referring to FIG. 48, the paw washing device 840 can be worn on the hand. Specifically, the index finger and middle finger of the wearing hand can be worn on the corresponding finger wearing components 8411. Then, when cleaning the pet paws, the pet paws are lifted by the wearing hand of the user and can be supported on the wearing body 841. Water is sprayed through the water outlet 8420 of the spraying head 842, and the index finger and middle finger worn on the corresponding finger wearing components 8411 can move flexibly. The brush layers 8413 can be used to further scrub the pet paw in the presence of running water, so that the mud and dirt between the adjacent paws of the pet can be thoroughly cleaned. After washing one paw of the pet, the paw washing device 840 can be conveniently moved to continue cleaning the next paw with clean running water. During the cleaning process, all control operations can be performed by the wearing hand, while the other hand can be used to hold or stroke the pet to calm it down.

It should be noted that, in the apparatus and method of the present application, each component or each step in different embodiments can be decomposed and/or recombined without departing from the principle of the present invention. These disassembly and/or recombination should be regarded as being included in the inventive concept of the present application.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention comprises all modifications encompassed within the spirit and scope of the following claims.

What is claimed is:

1. A pet paw washing arrangement, comprising a pet washing device and a water storage container connected to the pet washing device to supply water to the pet washing device, wherein the pet washing device comprises a paw washing head having a water outlet surface, wherein the water outlet surface is flexible, wherein at least one water outlet is located in the water outlet surface, wherein the pet washing device comprises a water feeding pipeline connected to the water storage container and a water guiding component which is communicated between the at least one water outlet and the water feeding pipeline, wherein when the paw washing head is worn on a hand of a user, the water guiding component is configured to be clamped by two fingers of the hand of the user with an extending direction of the water guiding component being transverse to a finger extending direction of the two fingers, a majority of the water guiding component is behind the hand of the user and extends from behind the hand of the user to front of the hand of the user and to the at least one water outlet.

2. The pet paw washing arrangement, as recited in claim 1, wherein a wearing chamber is configured to allow an index finger and a middle finger of the user to enter, so as to allow the pet washing device to be worn on the index finger and the middle finger of the user, wherein the water guiding component is extended into the wearing chamber in a direction transverse to a finger insertion direction of the index finger and the middle finger, and is configured to be located between the index finger and the middle finger when the pet washing device is worn on the user.

3. The pet paw washing arrangement, as recited in claim 1, wherein the pet washing device has a wearing chamber allowing the two fingers of the user to enter, so as to allow the pet washing device to be worn on the two fingers of the user, wherein the water guiding component is arranged between the wearing chamber and the at least one water outlet, wherein the water guiding component is extended into the wearing chamber in a direction transverse to a finger insertion direction of the two fingers and is made of flexible material to allow the two fingers of the user to press thereon to adjust a water pressure thereof when the water guiding component is configured to be clamped between the two fingers of the user.

4. The pet paw washing arrangement, as recited in claim 1, wherein the paw washing device comprises a water spraying assembly for being worn on one or more fingers of the user and a holding element connected to the water spraying assembly for the user to hold thereof, so as to integrate a handheld paw washing function and a finger-wearable paw washing function, wherein the holding element is rigid and the water spraying assembly is attached to the holding element, wherein in the handheld paw washing function, a first end portion of the water spraying assembly is coplanar with a second end portion of the water spraying assembly, wherein in the finger-wearable paw washing function, the second end portion of the water spraying assembly, which is a flexible end portion detachably connected to the holding element, is folded to align with the first end portion, so as to allow the pet paw to be be located between the first end portion and the second end portion which are configured to be worn on different fingers of the user.

5. The pet paw washing arrangement, as recited in claim 1, wherein the paw washing head comprises a first end portion having the at least one water outlet, wherein the first end portion of the paw washing head is suitable for wearing on one or more fingers of the user, wherein the paw washing head further comprises a rigid holding element and a second end portion which is a flexible end portion detachably attached to the rigid holding element, wherein the first end portion and the second end portion are suitable for being worn on different fingers of the user, wherein in a finger-wearable paw washing function, the second end portion is capable of being folded to be arranged at a position facing toward the first end portion to allow the pet paw to be located between the first end portion and the second end portion.

6. The pet paw washing arrangement, as recited in claim 5, wherein each of the first end portion and the second end portion comprises a brush for brushing the pet paw.

* * * * *